US012116055B2

(12) United States Patent
Di Biase

(10) Patent No.: US 12,116,055 B2
(45) Date of Patent: *Oct. 15, 2024

(54) SHUNT TRUCK POSITIONED TRAILER STAND

(71) Applicant: IDEAL WAREHOUSE INNOVATIONS, INC., Vaughan (CA)

(72) Inventor: Joseph J. Di Biase, Vaughan (CA)

(73) Assignee: IDEAL WAREHOUSE INNOVATIONS, INC., Vaughan (CA)

( * ) Notice: Subject to any disclaimer, the term of this patent is extended or adjusted under 35 U.S.C. 154(b) by 3 days.

This patent is subject to a terminal disclaimer.

(21) Appl. No.: 17/990,999

(22) Filed: Nov. 21, 2022

(65) Prior Publication Data

US 2023/0080663 A1 Mar. 16, 2023

Related U.S. Application Data

(63) Continuation of application No. 16/910,455, filed on Jun. 24, 2020, now Pat. No. 11,535,315.

(60) Provisional application No. 62/965,461, filed on Jan. 24, 2020, provisional application No. 62/865,727, filed on Jun. 24, 2019.

(51) Int. Cl.
*B62D 53/08* (2006.01)
*B62D 53/06* (2006.01)
*B60D 1/14* (2006.01)
*B60D 1/66* (2006.01)
*B62D 35/00* (2006.01)

(52) U.S. Cl.
CPC ......... *B62D 53/0864* (2013.01); *B62D 53/06* (2013.01); *B62D 53/0842* (2013.01); *B60D 1/141* (2013.01); *B60D 1/665* (2013.01); *B62D 35/001* (2013.01); *B62D 53/0821* (2013.01)

(58) Field of Classification Search
CPC ................ B62D 53/0864; B62D 53/06; B62D 53/0842; B62D 35/001; B62D 53/0821; B62D 53/0857; B60D 1/141; B60D 1/665
See application file for complete search history.

(56) References Cited

U.S. PATENT DOCUMENTS

| 6,109,640 A * | 8/2000 | Allen ................... B62D 53/065 280/476.1 |
| 6,481,948 B2 * | 11/2002 | Spears ................... B62D 49/04 414/498 |
| 7,270,201 B1 | 9/2007 | Cryer |

(Continued)

*Primary Examiner* — Kevin Hurley
*Assistant Examiner* — Marlon A Arce
(74) *Attorney, Agent, or Firm* — Tucker Ellis LLP

(57) ABSTRACT

A trailer stand positionable by a shunt truck is disclosed. The trailer stand includes a leg assembly having a front pair of legs and a back pair of legs, the front pair of legs connected by a front cross support and the back pair of legs connected by a back cross support, a wheel assembly having a wheel assembly frame that has a first end and a second end, the first end connected to the back pair of legs, the second end retaining an axle, the axle rotatably retaining at least two wheels, a stepped assembly having a front end, a back end, a top, and a bottom, the front end connected to the front cross support, the back end connected to the back cross support, the top of the stepped assembly providing a plurality of landing areas for an end of the semi-trailer, and a lifting frame.

20 Claims, 45 Drawing Sheets

(56) References Cited

U.S. PATENT DOCUMENTS

| | | | |
|---|---|---|---|
| 8,151,426 B2 * | 4/2012 | Schneider | B62D 63/061 |
| | | | 29/401.1 |
| 8,353,521 B1 * | 1/2013 | Seeley | B62D 53/061 |
| | | | 280/417.1 |
| 10,259,511 B2 | 4/2019 | Sponselee | |
| 11,135,887 B2 | 10/2021 | Aldrich | |
| 11,279,255 B2 | 3/2022 | Ayfield et al. | |
| 11,383,680 B1 | 7/2022 | Thon | |
| 2014/0252752 A1 | 9/2014 | Kimener et al. | |
| 2015/0307143 A1 | 10/2015 | Marcantonio | |
| 2017/0137239 A1 | 5/2017 | Kimener | |
| 2018/0236839 A1 * | 8/2018 | Rasner | B60G 17/019 |

* cited by examiner

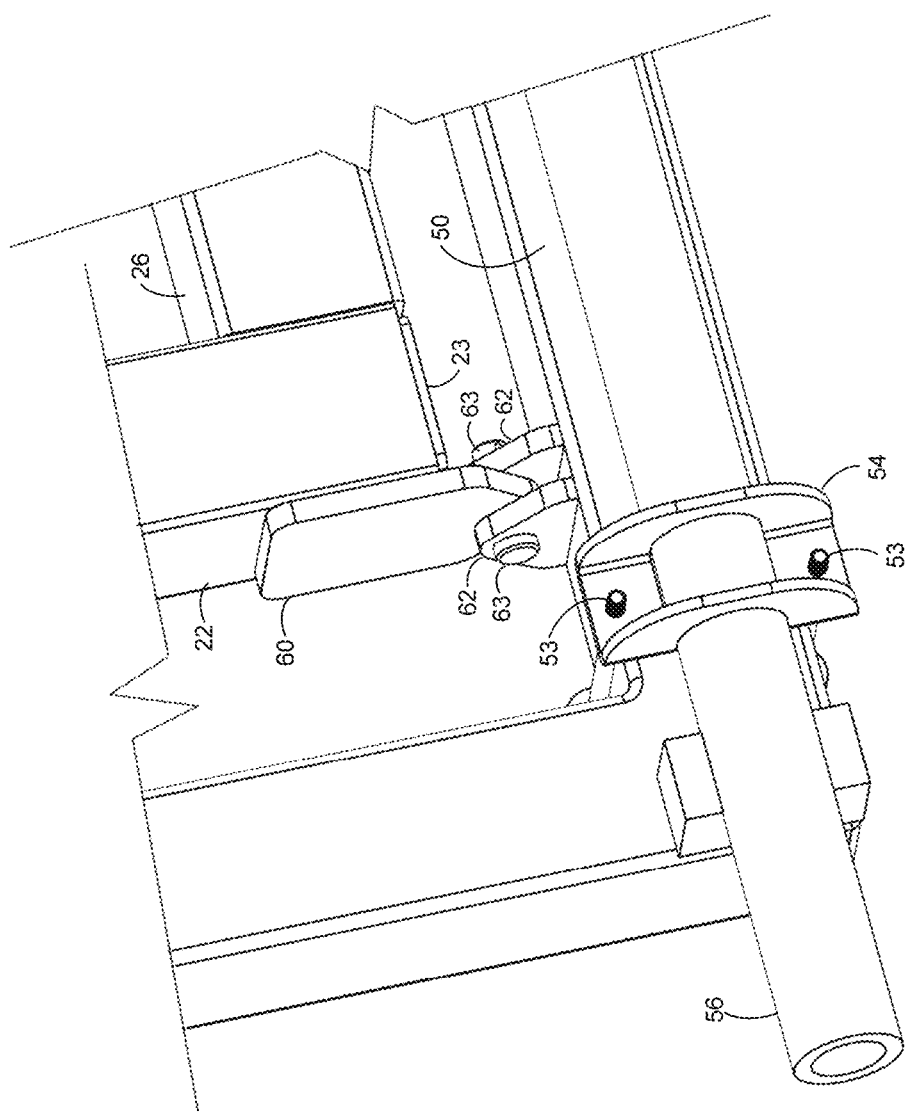

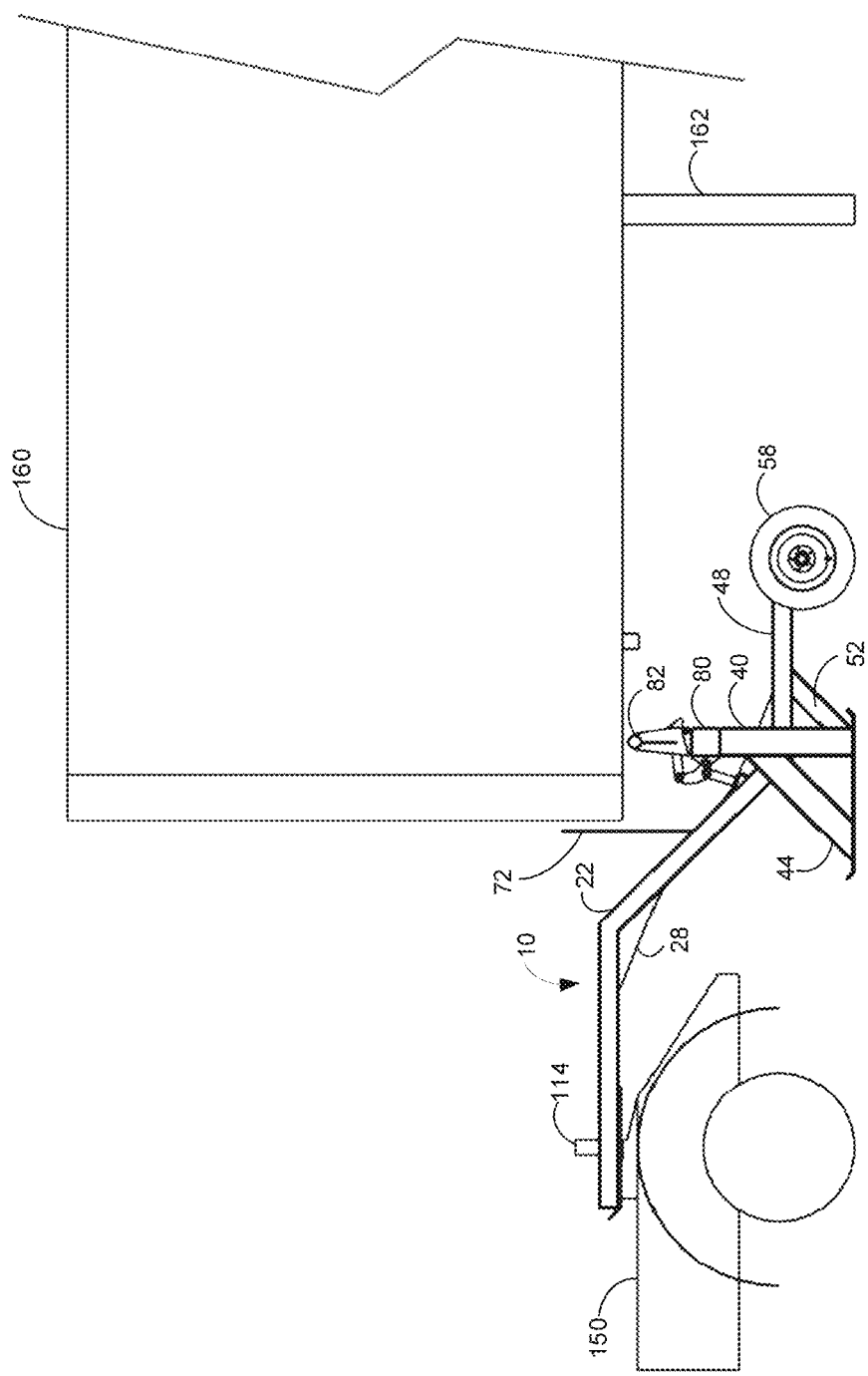

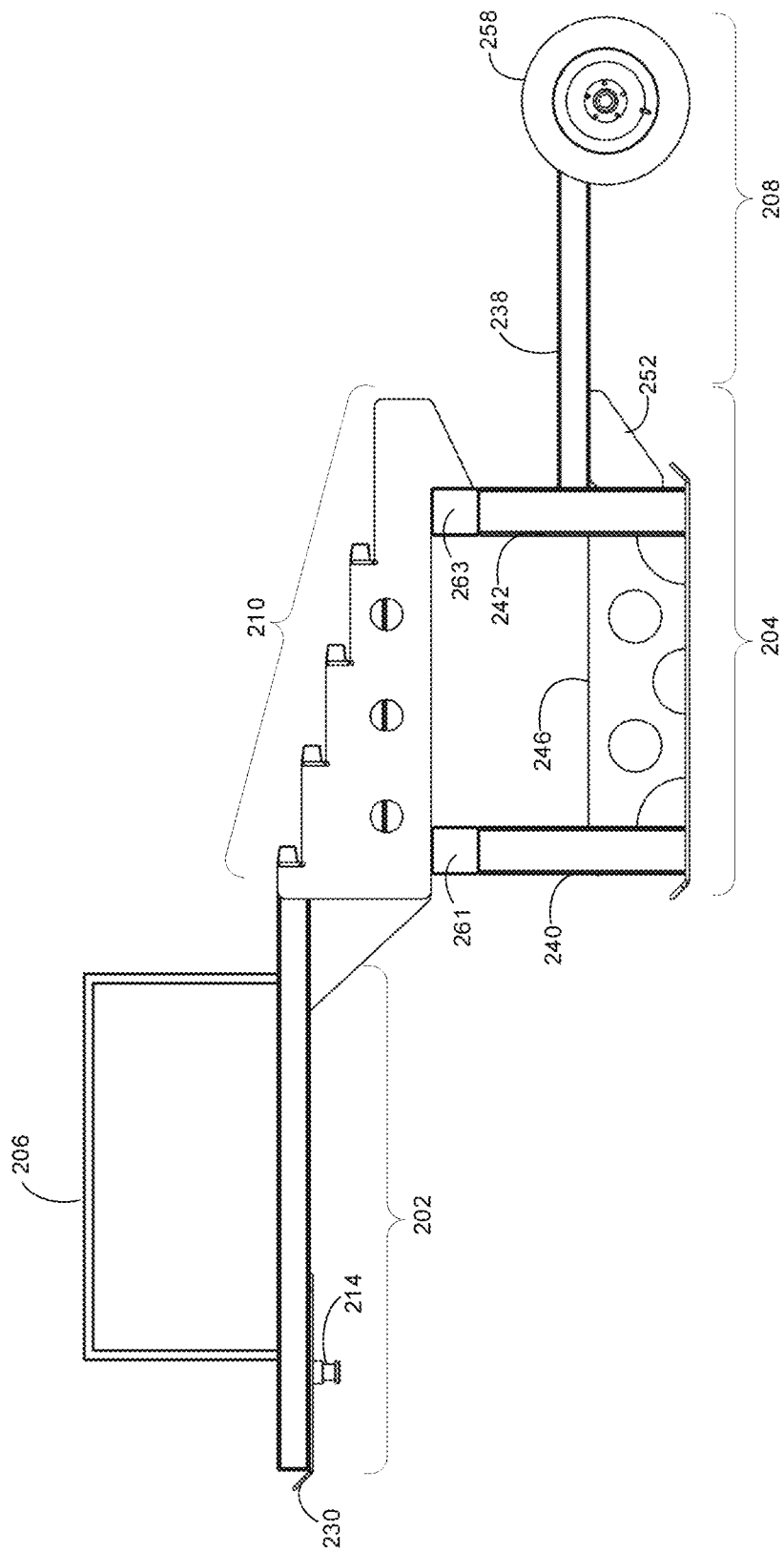

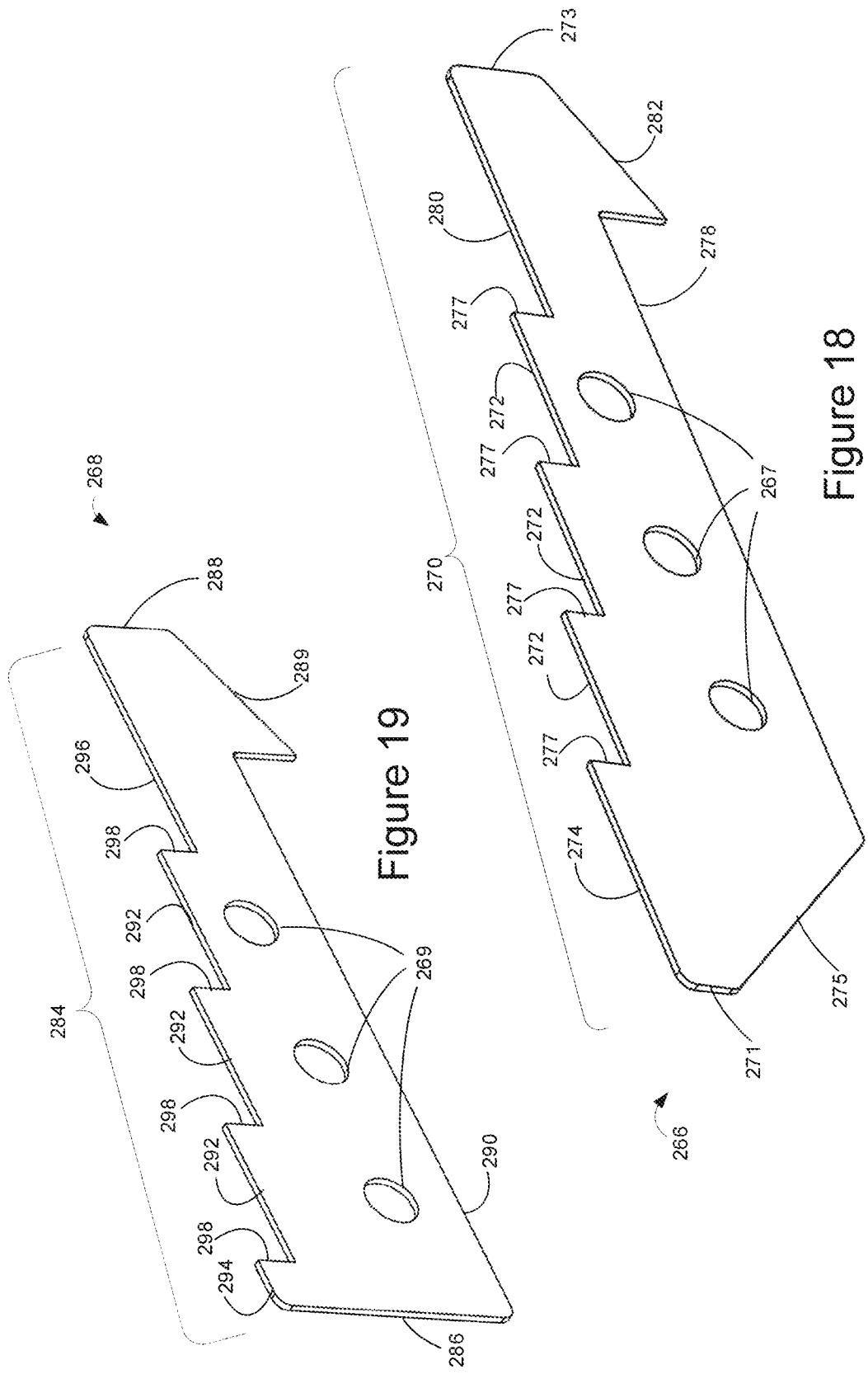

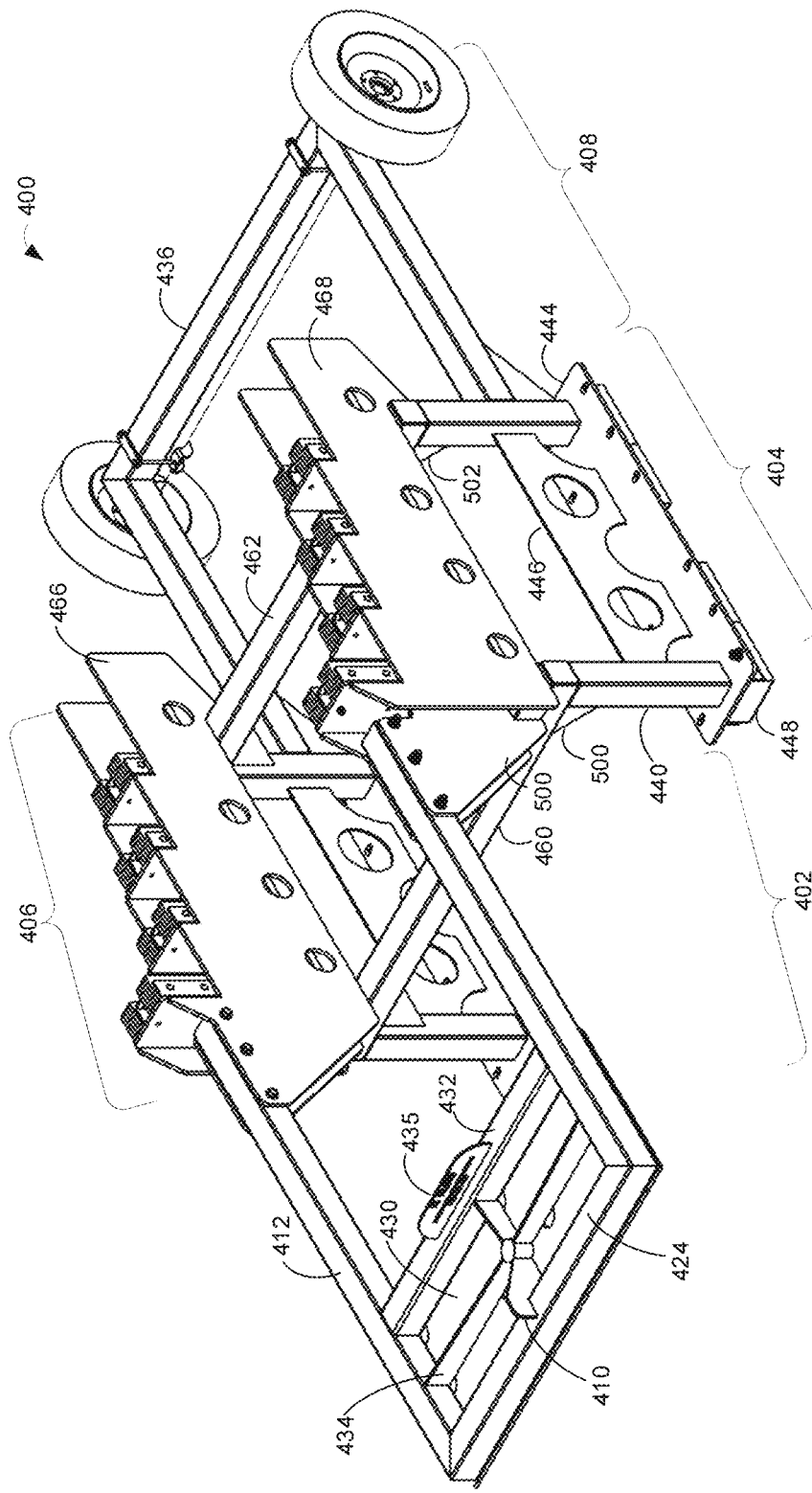

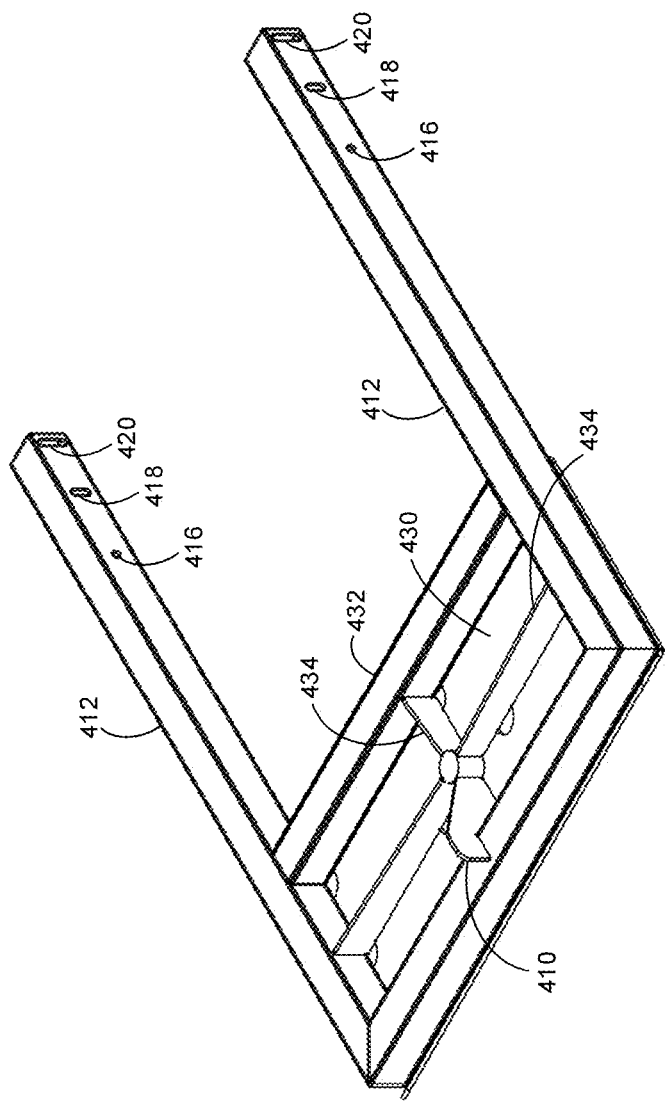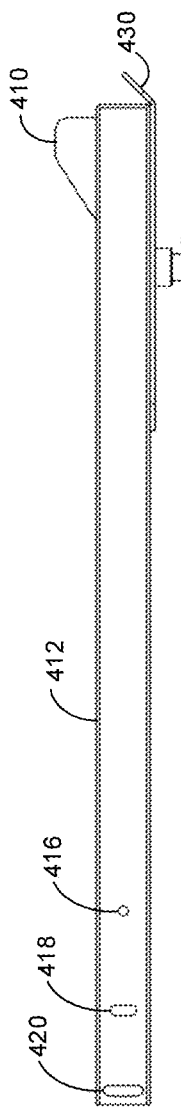
Figure 25A
Figure 25B

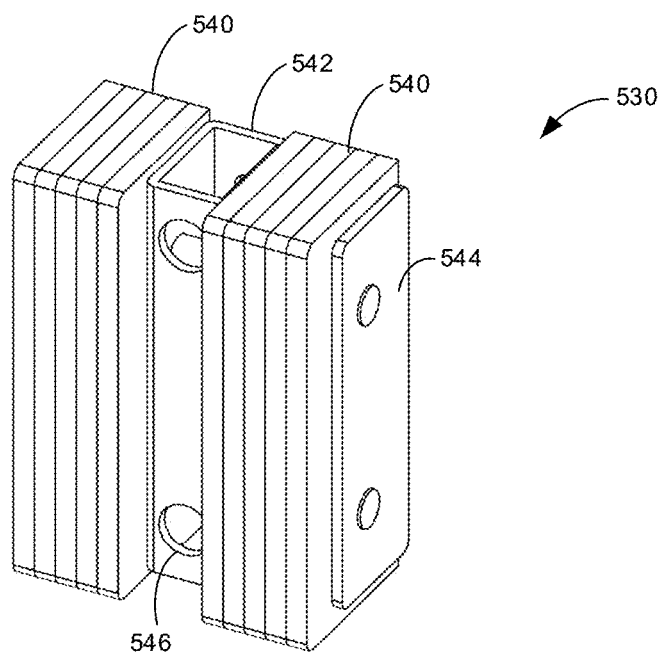
Figure 35
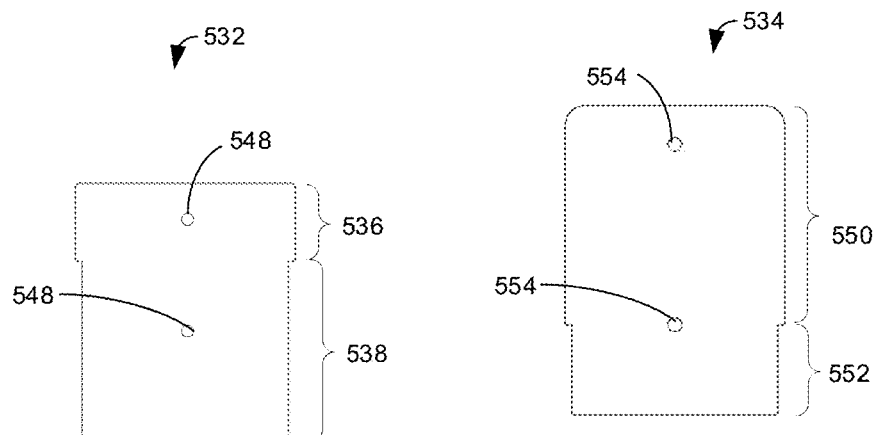
Figure 36
Figure 37

SHUNT TRUCK POSITIONED TRAILER STAND

CROSS REFERENCE TO RELATED APPLICATIONS

The present application is a continuation of U.S. patent application Ser. No. 16/910,455 filed Jun. 24, 2020, which claims priority to U.S. Provisional Patent Application No. 62/965,461 filed on Jan. 24, 2020, and from U.S. Provisional Patent Application No. 62/865,727 filed on Jun. 24, 2019, the entire disclosures of which are hereby incorporated by reference in their entirety.

FIELD

The present invention relates to trailer stands for semi-trailers. In particular this invention relates to trailer stands that are used in conjunction with shunt trucks.

BACKGROUND

When a freight semi-trailer is set down on its landing gear, the semi-trailer is freestanding, i.e., without a mechanical connection between the kingpin of the trailer and the shunt truck. Associated pneumatic and electrical connections between the truck and trailer are disconnected so that the brakes of the freight trailer are locked. The trailer is left adjacent to the dock opening, supported at the front end using only the trailer's landing gear.

When docked, semi-trailers require stabilization especially as they are being loaded and unloaded. For semi-trailers that will be loaded or unloaded with a very heavy load or using a forklift, a trailer stand is required to distribute load in case of collapse of the trailer's landing gear. When loading and unloading cargo from a freestanding freight trailer, the movement of the forklifts and loads along the floor of the semi-trailer causes the semi-trailer to move as well. Significant movement can result in the trailer separating from the dock or possibly tipping over. The landing gear of the freight trailer is not designed to accommodate the weight of a fully loaded trailer, let alone the dynamic forces generated by a forklift moving through a partially loaded trailer. The high center of gravity associated with most trailers makes the likelihood of tipping over a real possibility. Tipping of the trailer can result in damage to any goods within the trailer, the trailer itself, and the forklift, as well as injury to, or death of, the operator.

Some current trailer stands provide a stabilizing device having a pneumatic jack that is operable and positionable through the hydraulic system of the shunt truck. This type of device requires the operator to hook up, make positioning adjustments, and disconnect the device, while on the bed of the shunt truck. This leaves the operator in a vulnerable position between the cab of the shunt truck and the semi-trailer.

There is a need for an easy-to-use, reliable trailer stand support that inhibits a trailer from tipping over which does not require direct operator interaction to engage the stand with, or disengage the stand from, the trailer.

SUMMARY

In accordance with an aspect, there is provided a trailer stand for a semi-trailer comprising:
  at least two vertical legs each having a top and a bottom and connected by a cross support at each of the tops;
  a wheel assembly having a wheel assembly frame, the wheel assembly frame having a first end and a second end, the first end connected to the at least two legs, the second end retaining an axle, the axle rotatably retaining at least two wheels;
  a lifting frame the lifting frame having a first end, a second end, and a stop, the first end having a kingpin receivable by a shunt truck, the second end pivotably connected to the wheel assembly frame; and a stabilizing assembly having a plurality of brackets connected to the cross support, the plurality of brackets retaining a support beam,
  wherein, when the kingpin is received by the shunt truck, the lifting frame pivots upwards until the stop encounters the cross support, and wherein further pivoting the lifting frame upwards pivots the wheel assembly frame around the axle, thereby lifting the bottoms of each of the at least two vertical legs, allowing the trailer stand to be positioned under the semi-trailer.

In accordance with an aspect, there is provided a trailer stand comprising:
  a frame;
  a hitch mounted to the frame;
  a wheel assembly mounted to the frame; and
  a repositionable stabilizing assembly coupled to the frame.

In accordance with an aspect, there is provided a trailer stand and signaling system comprising:
  a repositionable trailer stand comprising a frame having mounted thereto a wheel, the repositionable trailer stand comprising a repositionable stabilizing assembly; and,
  a stand communicator operatively coupled to the trailer stand, the stand communicator including a deployable signaler configured to confirm the trailer stand is secured under a parked freight trailer; and,
  a dock communicator adapted to be remote from the stand communicator, the dock communicator configured to at least one of receive a signal from the stand communicator and send a signal to the stand communicator;
  wherein the dock communicator includes a first visual display configured to display a message indicative of the trailer stand being secured to the parked freight trailer.

In accordance with an aspect, there is provided a trailer stabilizer and signaling system comprising:
  a repositionable freight trailer stand comprising a frame having mounted thereto a wheel, the repositionable freight trailer stand comprising a repositionable stabilizing assembly;
  a stabilizer communicator operatively coupled to the repositionable trailer stand, the stabilizer communicator including a deployable signaler configured to confirm the repositionable trailer stand is properly aligned under parked freight trailer; and,
  a dock communicator adapted to be remote from the stabilizer communicator, the dock communicator configured to at least one of receive a signal from the stabilizer communicator and send a signal to the stabilizer communicator;
  wherein the dock communicator includes at least one of a wired transmitter, a wireless transmitter, a wired receiver, and a wireless receiver.

In accordance with an aspect, there is provided a trailer stand and signaling system comprising:

a repositionable freight trailer stand comprising a frame having mounted thereto a wheel, the repositionable freight trailer stand comprising a repositionable stabilizing assembly; and, a stabilizer communicator operatively coupled to the repositionable stabilizing assembly, the stabilizer communicator including a deployable signaler configured to confirm the repositionable stabilizing assembly is properly aligned under the parked freight trailer; and, a dock communicator adapted to be remote from the stabilizer communicator, the dock communicator configured to at least one of receive a signal from the stabilizer communicator and send a signal to the stabilizer communicator;

wherein the dock communicator includes a first visual display configured to display a message indicative of the repositionable trailer stand being properly aligned with respect to the parked freight trailer.

In accordance with an aspect, there is provided a trailer stabilizer and signaling system comprising:

a repositionable freight trailer stand comprising a frame having mounted thereto a wheel, the repositionable freight trailer stand comprising a repositionable stabilizing assembly; and, a stabilizer communicator operatively coupled to the trailer stand, the stabilizer communicator including a deployable signaler configured to confirm the trailer stand is secured under a parked freight trailer; and, a dock communicator adapted to be remote from the stabilizer communicator, the dock communicator configured to at least one of receive a signal from the stabilizer communicator and send a signal to the stabilizer communicator;

wherein the dock communicator includes a first visual display configured to display a message indicative of the trailer stand being properly aligned under the parked freight trailer.

In accordance with an aspect, there is provided a trailer stand and signaling system comprising:

a repositionable freight trailer stand comprising a frame having mounted thereto a wheel, the repositionable freight trailer stand comprising a repositionable stabilizing assembly;

a stabilizer communicator operatively coupled to the repositionable freight trailer stand, the stabilizer communicator including a deployable signaler configured to confirm the repositionable freight trailer stand is properly aligned under a parked freight trailer; and, a dock communicator adapted to be remote from the stabilizer communicator, the dock communicator configured to at least one of receive a signal from the stabilizer communicator and send a signal to the stabilizer communicator;

wherein the dock communicator includes at least one of a wired transmitter, a wireless transmitter, a wired receiver, and a wireless receiver.

In accordance with an aspect, there is provided a trailer stand and signaling system comprising:

a repositionable freight trailer stand comprising a frame having mounted thereto a wheel, the repositionable freight trailer stand comprising a repositionable stabilizing assembly; and, a stabilizer communicator operatively coupled to the repositionable freight trailer stand, the stabilizer communicator including a deployable signaler configured to confirm the repositionable freight trailer stand is secured under a parked freight trailer; and, a dock communicator adapted to be remote from the stabilizer communicator, the dock communicator configured to at least one of receive a signal from the stabilizer communicator and send a signal to the stabilizer communicator;

wherein the dock communicator includes a first visual display configured to display a message indicative of the repositionable freight trailer stand being properly aligned with respect to the parked freight trailer.

In accordance with an aspect, there is provided a trailer stand for stabilizing a parked freight trailer, the trailer stand comprising a frame separate from the support frame of the parked freight trailer, the frame having mounted thereto wheels, the trailer stand comprising a freight trailer load bearing repositionable stabilizing assembly operatively coupled to a trailer plate configured to engage the parked freight trailer, the freight trailer load bearing repositionable stabilizing assembly is configured to deploy between a first position wherein the repositionable stabilizing assembly is not in contact with the underside of the parked freight trailer and a second position wherein the repositionable stabilizing assembly is in contact with the underside of the parked freight trailer.

In accordance with an aspect, there is provided a trailer stand for stabilizing a parked freight trailer, the trailer stand comprising a frame separate from the support frame of the parked freight trailer, the frame having mounted thereto wheels, the trailer stand comprising a freight trailer load bearing repositionable stabilizing assembly operatively coupled to the frame and configured to engage the parked freight trailer, the freight trailer load bearing repositionable stabilizing assembly configured to deploy in a first direction wherein the repositionable stabilizing assembly is in contact with the underside of the trailer and in a second direction opposite the first direction wherein the repositionable stabilizing assembly is not in contact with the underside of the trailer wherein the freight trailer load bearing repositionable stabilizing assembly is operatively coupled to a linkage that is operatively coupled to the frame.

In accordance with an aspect, there is provided a method of stabilizing a parked trailer at a loading dock, the method comprising:

positioning a wheeled trailer stand underneath a parked freight trailer at a loading dock while landing gear of the parked freight trailer are deployed; and deploying a repositionable stabilizing assembly operatively coupled to a frame of the wheeled trailer stand;

wherein deploying the repositionable stabilizing assembly includes repositioning the repositionable stabilizing assembly from a storage position to a supporting position supporting the underside of the trailer.

In accordance with an aspect, there is provided a method of supporting a parked freight trailer at a loading dock, the method comprising:

positioning a portable trailer stand underneath a parked freight trailer at a loading dock so the portable trailer stand is between the parked trailer and the ground, the portable trailer stand comprising a repositionable stabilizing assembly;

utilizing a portable vehicle to reposition the repositionable stabilizing assembly from an unengaged position to an engaged position, where the unengaged position does not have the repositionable stabilizing assembly engaged with the underside of the trailer, and where the engaged position has the repositionable stabilizing assembly engaged with the underside of the trailer; and, retaining the portable trailer stand between the parked freight trailer and the ground while contents are at least one of loaded onto and unloaded from the parked freight trailer.

In accordance with an aspect, there is provided a method of operating a trailer stand, the method comprising:

positioning a trailer stand underneath a parked freight trailer at a loading dock so the trailer stand is between the parked freight trailer and the ground, the trailer stand comprising a repositionable stabilizing assembly; and utilizing a portable vehicle to reposition the repositionable stabilizing assembly between a lowered position and a raised position while the trailer stand is positioned underneath the parked freight trailer, wherein the lowered position does not have the repositionable stabilizing assembly in direct contact with the underside of the trailer and the raised position has the repositionable stabilizing assembly in direct contact with the underside of the trailer.

In accordance with an aspect, there is provided a method of operating a trailer stand comprising;

positioning a trailer stand underneath a parked freight trailer at a loading dock so the trailer stand is between the parked freight trailer and the ground, the trailer stand comprising a repositionable stabilizing assembly;

utilizing a portable vehicle to reposition the repositionable stabilizing assembly between a lowered position and a raised position while the trailer stand is positioned underneath the parked freight trailer, wherein the lowered position does not have the repositionable stabilizing assembly in direct contact with the underside of the trailer and wherein the raised position does have the repositionable stabilizing assembly in direct contact with the underside; and utilizing a visual display after the trailer stand is between the parked freight trailer and the ground.

In accordance with an aspect, there is provided a method of operating a trailer stand, the method comprising:

positioning a trailer stand underneath a parked freight trailer at a loading dock so the trailer stand is between the parked freight trailer and the ground, the trailer stand comprising a repositionable stabilizing assembly;

utilizing a portable vehicle to reposition the repositionable stabilizing assembly between a lowered position and a raised position while the trailer stand is positioned underneath the parked freight trailer, wherein the lowered position does not have the repositionable stabilizing assembly in direct contact with the underside of the trailer and the raised position does have the stabilizing in direct contact with the underside of the trailer; and visually signaling to a dock worker inside the loading dock that contents are ready to be loaded onto or unloaded from the parked freight trailer while the portable trailer stand is positioned underneath the parked freight trailer at the loading dock.

In accordance with an aspect, there is provided a trailer stand for a semi-trailer comprising:

a leg assembly having a front pair of legs and a back pair of legs, the front pair of legs connected by a front cross support and the back pair of legs connected by a back cross support;

a wheel assembly having a wheel assembly frame, the wheel assembly frame having a first end and a second end, the first end connected to the back pair of legs, the second end retaining an axle, the axle rotatably retaining at least two wheels;

a stepped assembly having a front end, a back end, a top, and a bottom, the front end connected to the front cross support, the back end connected to the back cross support, the top of the stepped assembly providing a plurality of landing areas for an end of the semi-trailer; and a lifting frame having a first end, a second end, and a stop, the first end having a kingpin receivable by a shunt truck, the second end connected to the stepped assembly.

In an embodiment, each landing area has a riser to abut a vertical wall of the trailer.

In an embodiment, each riser has a bumper to contact the vertical wall of the trailer.

In an embodiment, the lifting frame is pivotable about an axis of rotation on the front end of the stepped assembly.

In an embodiment, the lifting frame is secured to the stepped assembly at a desired angle to the stepped assembly about the axis of rotation.

In an embodiment, the front pair of legs and back pair of legs are further connected by a bottom plate.

In an embodiment, the bottom plate is in contact with a ground surface.

In an embodiment, the bottom plate is connected to bumpers that are in contact with a ground surface.

In accordance with an aspect of the present invention, there is provided a trailer stand comprising:

a leg assembly comprising a pair of substantially vertical front legs, a pair of substantially vertical back legs, a front cross support connected to the top of each front leg and a back cross support connected to the top of each back leg;

a pair of stepped landing assemblies, each stepped landing assembly comprising a base, an inside stepped side wall having a front end, a back end, a bottom and a top shaped to have a plurality of treads and risers, an outside stepped side wall having a front end, a back end, a bottom and a top shaped to have a plurality of treads substantially corresponding in length to the plurality of treads of the inside stepped side wall and a plurality of risers substantially corresponding in height to the plurality of risers of the inside stepped side wall, wherein the inside stepped side wall and the outside stepped side wall are connected to the sides of the base the treads and risers of the inside stepped side wall and the treads and risers of the outside step side wall substantially align on each side of the base forming steps, and wherein one end of the base sits atop, and is connected to, the front cross support and the other end of the base sits atop, and is connected to, the back cross support, such that the base traverses the gap between the front pair of legs and the back pair of legs;

a lifting frame comprising at least two arms connected by a top cross support, each arm of the lifting frame connected to one stepped landing assembly of the pair of stepped landing assemblies; and a wheel assembly comprising a frame comprising at least two arms connected at one end to the back pair of legs of the leg assembly and connected at the other end to a cross wheel brace, and an axel supported by the cross wheel brace, each end of the axel having a wheel.

In an embodiment, the lifting frame is U-shaped.

In an embodiment, the lifting frame comprises a rail connected to the top of each arm of the lifting frame.

In an embodiment, the rail is a guide rail.

In an embodiment, the lifting frame comprises a kingpin.

In an embodiment, the kingpin is for engaging a shunt truck.

In an embodiment, the kingpin is held by a kingpin plate connected at one end to the top cross support of the lifting frame.

In an embodiment, the lifting frame comprises a kingpin plate support and the kingpin plate is connected at the other end to the kingpin plate support of the lifting frame.

In an embodiment, the kingpin plate support further comprises a plate.

In an embodiment, the plate of the kingpin plate support is a guide plate.

In an embodiment, the kingpin plate is further supported by a plurality of cross-braces.

In an embodiment, one of the cross-braces has a higher profile than the other cross-braces.

In an embodiment, the higher profile cross-brace has a notch into which the top cross support of the lifting frame fits, such that higher profile cross-brace connects over the top cross support.

In an embodiment, the higher profile cross-brace is visible over the top cross support of the lifting frame.

In an embodiment, the higher profile cross-brace is located substantially at the center of the top cross support of the lifting frame.

In an embodiment, the kingpin plate is attached to the lifting frame such that one end of the kingpin plate protrudes from the top cross support of the lifting frame.

In an embodiment, the one end of the kingpin plate that protrudes from the top cross support of the lifting frame is angled upward to aid in engaging the kingpin with a shunt truck.

In an embodiment, the kingpin plate has a plurality of apertures therethrough.

In an embodiment, each arm of the lifting frame comprises an aperture and a plurality of slots at the end opposite to that which connects to the top cross support of the lifting frame.

In an embodiment, the aperture and the plurality of slots of each arm of the lifting frame traverse the width of each arm of the lifting frame to accommodate therethrough fasteners for connecting each arm of the lifting frame to the stepped assembly.

In an embodiment, the fasteners for connecting each arm of the lifting frame to the stepped assembly are bolts.

In an embodiment, a first fastener through a first aperture acts as an axis for pivoting the lifting frame when initially assembling the trailer stand.

In an embodiment, the arms of the lifting frame are attached to the stepped assembly at an upwards or downwards angle.

In an embodiment, the plurality of slots of each arm of the lifting frame are progressively longer towards the end of the arm, allowing the arm to be fastened to the stepped assembly at a desired angle.

In an embodiment, the plurality of slots of each arm of the lifting frame are two slots.

In an embodiment, the inside of each arm of the lifting frame is connected to the inner face of the inside stepped side wall.

In an embodiment, the outside of each arm of the lifting frame is connected to an additional arm support.

In an embodiment, the additional arm support is a substantially triangular plate, having an inner and outer face, a top side, a sloped side, and a vertical side.

In an embodiment, the vertical side of the additional arm support has a protrusion, forming a lower notch.

In an embodiment, the base of the stepped wall assembly fits within the notch, so that the arm support sits on the base.

In an embodiment, the top side of the arm support has a plurality of apertures which substantially align with apertures in the inside stepped side wall.

In an embodiment, apertures of the top side of the arm support and the apertures in the inside stepped side wall accommodate fasteners to secure each arm of the lifting frame to the arm support with nuts.

In an embodiment, first fastener is accommodated by first aperture in the arm support therethrough to first aperture in the inside stepped side wall and acts as the axis for pivoting the lifting frame.

In an embodiment, the remaining apertures in the arm support accommodate fasteners therethrough to the remaining apertures in the inside stepped side wall, for securing the arm of the lifting frame when the arm has been positioned at a desired angle around the axis.

In an embodiment, the apertures in the arm support and apertures in the inside stepped side wall are substantially the same size to ensure that the fasteners do not slide in the slots in the arm.

In an embodiment, one leg of the pair of substantially vertical front legs and one leg of the pair of substantially vertical back legs is supported on a bottom plate, such that each leg is normal to the bottom plate.

In an embodiment, the bottom plate is shaped to lie substantially flat on a horizontal surface.

In an embodiment, the bottom plate has angled ends.

In an embodiment, the bottom plate is connected to a plurality of bumpers for coming into contact with a ground surface.

In an embodiment, the bottom plate has a plurality of apertures therethrough for connecting to the plurality of bumpers by brackets using fasteners, in an embodiment, nuts and bolts.

In an embodiment, the brackets for connecting the plurality of bumpers to the bottom plate are angle brackets.

In an embodiment, the plurality of bumpers are rubber bumpers.

In an embodiment, the plurality of bumpers are laminated rubber bumpers.

In an embodiment, the plurality of bumpers are molded rubber bumpers.

In an embodiment, between each of the front legs and each of the back legs is a leg brace.

In an embodiment, the leg brace is a metal plate.

In an embodiment, the front cross support is reinforced underneath by a gusset connected to each front leg.

In an embodiment, the back cross support is reinforced underneath by a gusset connected to each back leg.

In an embodiment, the frame of the wheel assembly is U-shaped.

In an embodiment, the wheel assembly has a wheel assembly gusset to support the frame.

In an embodiment, the wheel assembly gusset is connected under each arm of the wheel assembly and connected to each back leg.

In an embodiment, the wheel assembly gusset is a substantially triangular shaped plate.

In an embodiment, the cross wheel brace comprises at least two brackets for supporting the axel.

In an embodiment, the brackets of the cross wheel brace are U-shaped.

In an embodiment, the brackets of the cross wheel brace are held to the underside of the cross wheel brace by axel bracket connectors sitting on the top of cross wheel brace via long bolts traversing the width of cross brace.

In an embodiment, the brackets of the cross wheel brace are bolted to the underside of the cross wheel brace.

In an embodiment, each wheel is rotationally connected at the end of the axel by wheel bearings.

In an embodiment, the base of each stepped landing assembly extends past the back pair of legs at the other end of the base.

In an embodiment, at the front end of the inside stepped side wall, a top arm connection is connected to the arm of the lifting frame, such that the entire top arm connection is substantially flush with the top of the arm of the lifting frame.

In an embodiment, the top arm connection is connected to the arm of the lifting frame by welding.

In an embodiment, at the front end of the inside stepped side wall, a top arm connection has apertures and for connecting to the arm of the lifting frame such that the top arm connection is substantially flush with the top of the arm of the lifting frame.

In an embodiment, under the top arm connection, the front end is angled forming a gusset under the arm of the lifting frame.

In an embodiment, the base is connected to the inside stepped side wall such that the bottom of the inside stepped side wall is substantially flush with the bottom of the base.

In an embodiment, the inside stepped side wall has a plurality of apertures.

In an embodiment, the plurality of apertures are a plurality of circular holes.

In an embodiment, the inside stepped side wall extends beyond the length of the base at each end.

In an embodiment, the top arm connection has a protrusion.

In an embodiment, the protrusion forms the top riser, which is higher than the other risers.

In an embodiment, at the back end of the inside stepped side wall, the base comprises a bottom tread that is longer in length than the other treads of the inside stepped side wall.

In an embodiment, under the bottom tread, the inside stepped side wall is angled and extends lower than the bottom to form a hook or lip which extends downwards to connect to the back cross support forming a right angle around two sides of the back cross support.

In an embodiment, the base is connected to the outside stepped side wall such that the bottom of the outside stepped side wall is substantially flush with the bottom of the base.

In an embodiment, the outside stepped side wall has a plurality of apertures.

In an embodiment, the plurality of apertures of the outside stepped side wall are a plurality of circular holes.

In an embodiment, the outside stepped side wall extends beyond the length of the base at each end.

In an embodiment, the top of the outside stepped side wall is shorter in length than the top arm connection of inside stepped side wall and the front end is substantially perpendicular to the bottom.

In an embodiment, the top of the outside wall has an upper protrusion at the front end, wherein the upper protrusion forms the top riser, which is higher than the other risers.

In an embodiment, the higher top riser substantially aligns with the higher top riser of the inside stepped side wall.

In an embodiment, at the back end of the outside stepped side wall, the outside stepped side wall comprises a bottom tread that is longer in length than the other treads of the outside stepped side wall.

In an embodiment, the bottom tread of the outside stepped side wall is angled and extends lower than the bottom to form a hook or lip which extends downwards to connect to the back cross support forming a right angle around two sides of the back cross support.

In an embodiment, the top arm connection of the outside wall is shorter than the top arm connection of the inside wall.

In an embodiment, the front end is substantially perpendicular to the bottom.

In an embodiment, the outside stepped side wall comprises a plurality of apertures.

In an embodiment, the bottom step is substantially longer than the other steps.

In an embodiment, the steps and bottom step are open.

In an embodiment, the steps and bottom step are closed.

In an embodiment, the steps and bottom step are closed with a top or tread that traverses the width and length of the steps and the bottom step.

In an embodiment, a bumper is connected to each of the risers of the inside stepped side wall and the outside stepped side wall, respectively.

In an embodiment, the bumper has a substantially rectangular shape.

In an embodiment, the bumper is made of rubber or plastic.

In an embodiment, the bumper is made of laminated rubber.

In an embodiment, the bumper is made of molded rubber.

In an embodiment, the bumper has boreholes which allow the bumper to be connected to the risers via mounting plates.

In an embodiment, the mounting plate has a substantially rectangular portion with a lower protrusion, which fits within the step formed between the inside stepped side wall and the outside stepped side wall.

In an embodiment, the rectangular portion of the mounting plate, traverses the width of the gap between the risers of the inside stepped side wall and the risers of the outside stepped side wall.

In an embodiment, the rectangular portion of the mounting plate has boreholes that align with the boreholes of the bumper to allow for connection by fasteners, in an embodiment, bolts and nuts.

In an embodiment, the bumper may be connected to the mounting plates by adhesive.

In an embodiment, the mounting plates are welded to the risers such that the mounting plates traverse the width of the base, from the inside stepped side wall to the outside stepped side wall, thereby connecting the two stepped side walls at each of the risers.

In an embodiment, the rectangular portions of the mounting plates are of a length that extends beyond the inside stepped side wall and the outside stepped side wall.

In an embodiment, the pair of stepped assemblies creates matched stepped landing areas on each side of the trailer stand.

It is understood that one or more of the aspects described herein (and above) may be combined in any suitable manner. The novel and inventive features of the present invention will become apparent to those of skill in the art upon examination of the following detailed description of the invention. It should be understood, however, that the detailed description of the invention and the specific examples presented, while indicating certain aspects of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The present invention will be further understood from the following description with reference to the Figures, in which:

FIG. 4B shows a cut-away bottom perspective view of the connector of FIG. 4A.

FIG. 15 shows a side view of the trailer stand of FIG. 1A after it has been positioned.

FIG. 16C shows a side view of the trailer stand of FIG. 16A.

FIG. 18 is a perspective view of an inside stepped wall of the stepped landing assembly of FIGS. 17A and 17B.

FIG. 19 is a perspective view of an outside stepped wall of the stepped landing assembly of FIGS. 17A and 17B.

FIG. 24A shows a perspective view of another alternative embodiment of a trailer stand.

FIG. 25A shows a perspective view of the lifting assembly of the trailer stand of FIG. 24A.

FIG. 25B shows a side view of the lifting assembly of the trailer stand of FIG. 24A.

FIG. 35 shows a perspective view of an exemplary bumper of the stepped landing assembly of FIG. 34.

FIG. 36 shows a front view of a mounting plate for a plurality of bumpers of the stepped landing assembly of FIG. 34.

FIG. 37 shows a front view of a mounting plate for a top bumper of the stepped landing assembly of FIG. 34.

DETAILED DESCRIPTION OF CERTAIN ASPECTS

Figure 1A:
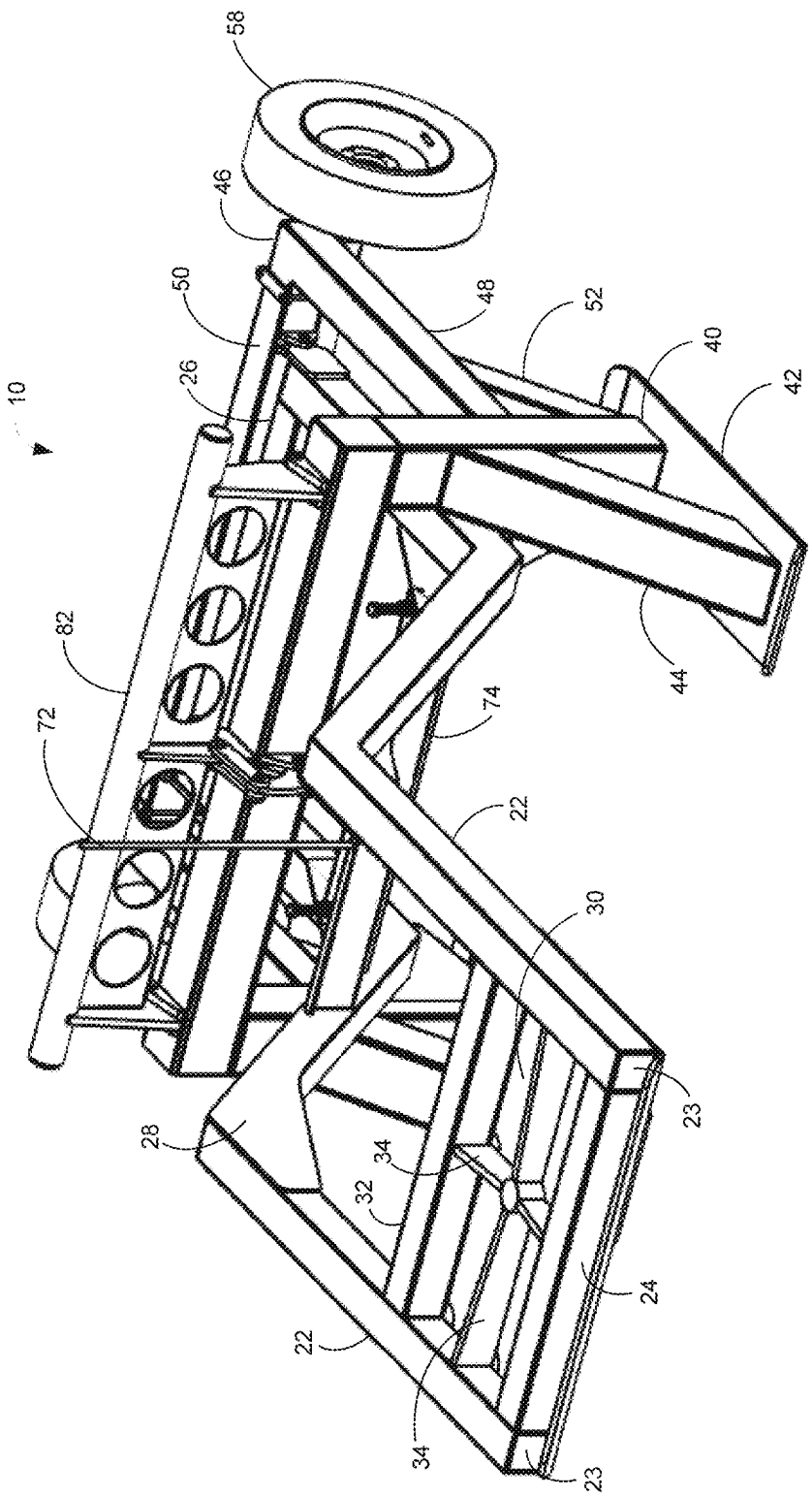
FIG. 1A shows a perspective view of an exemplary trailer stand.
Figure 1B:
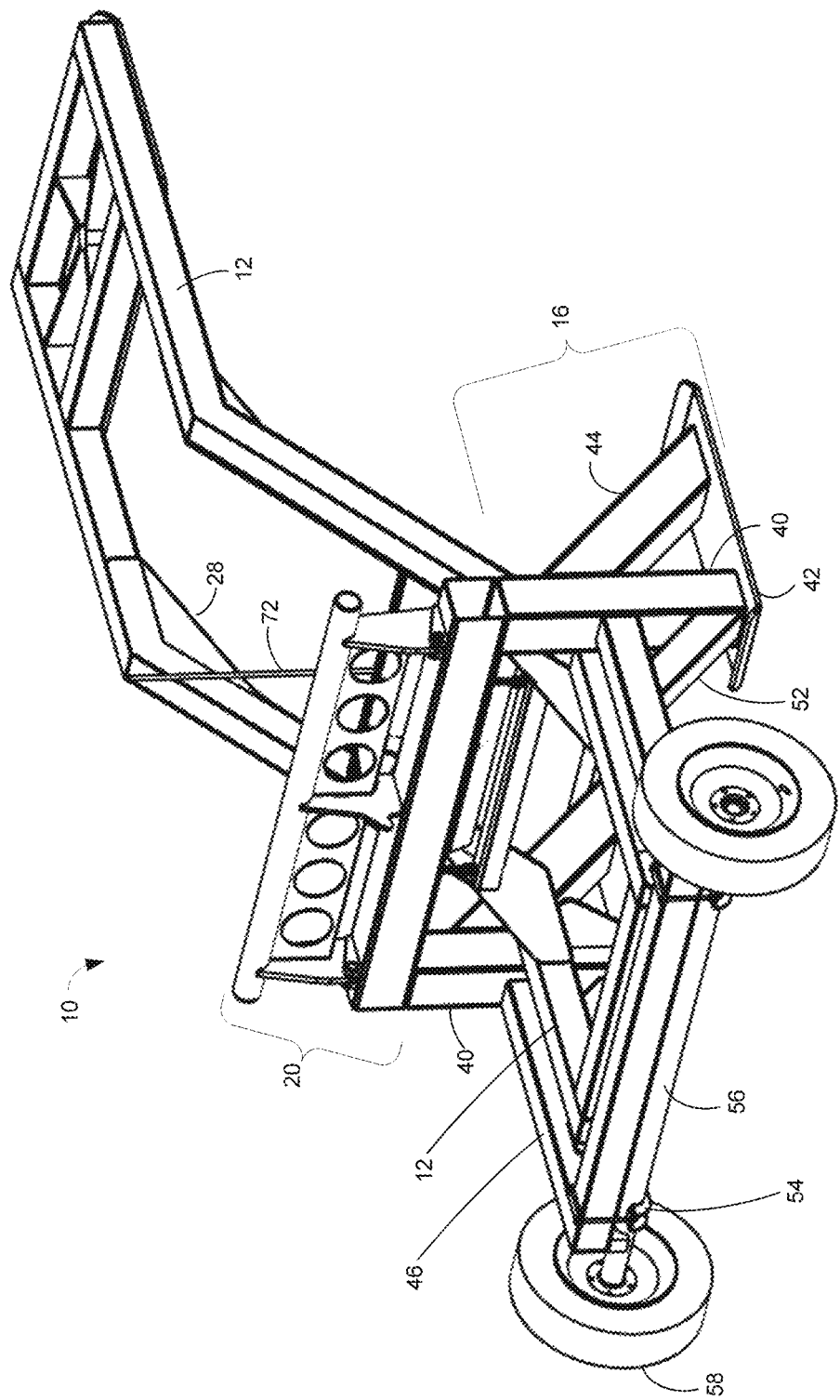
FIG. 1B shows an alternate perspective view of the trailer stand of FIG. 1A.
Figure 1C:
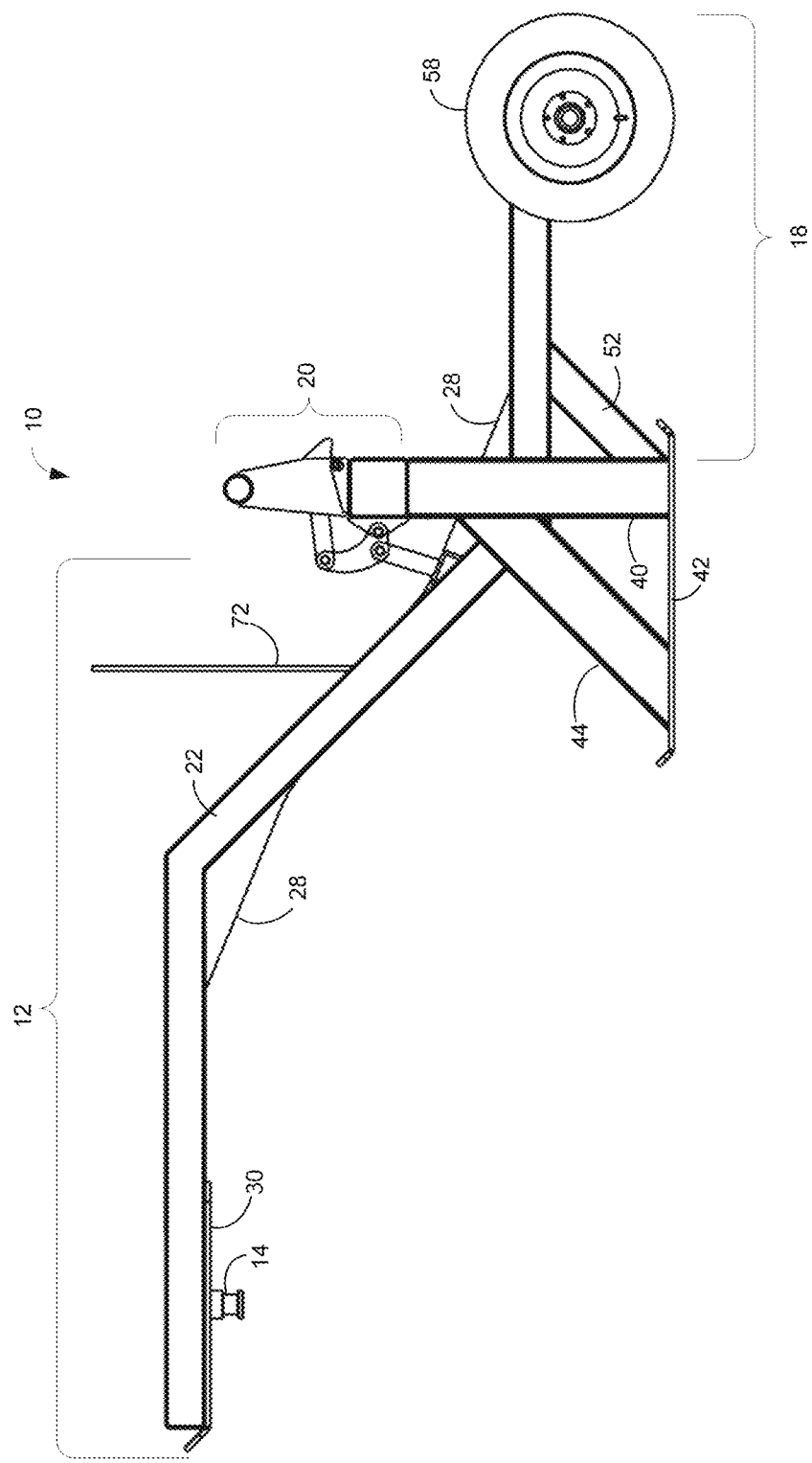
FIG. 1C shows a side view of the trailer stand of FIG. 1A.
Figure 1D:
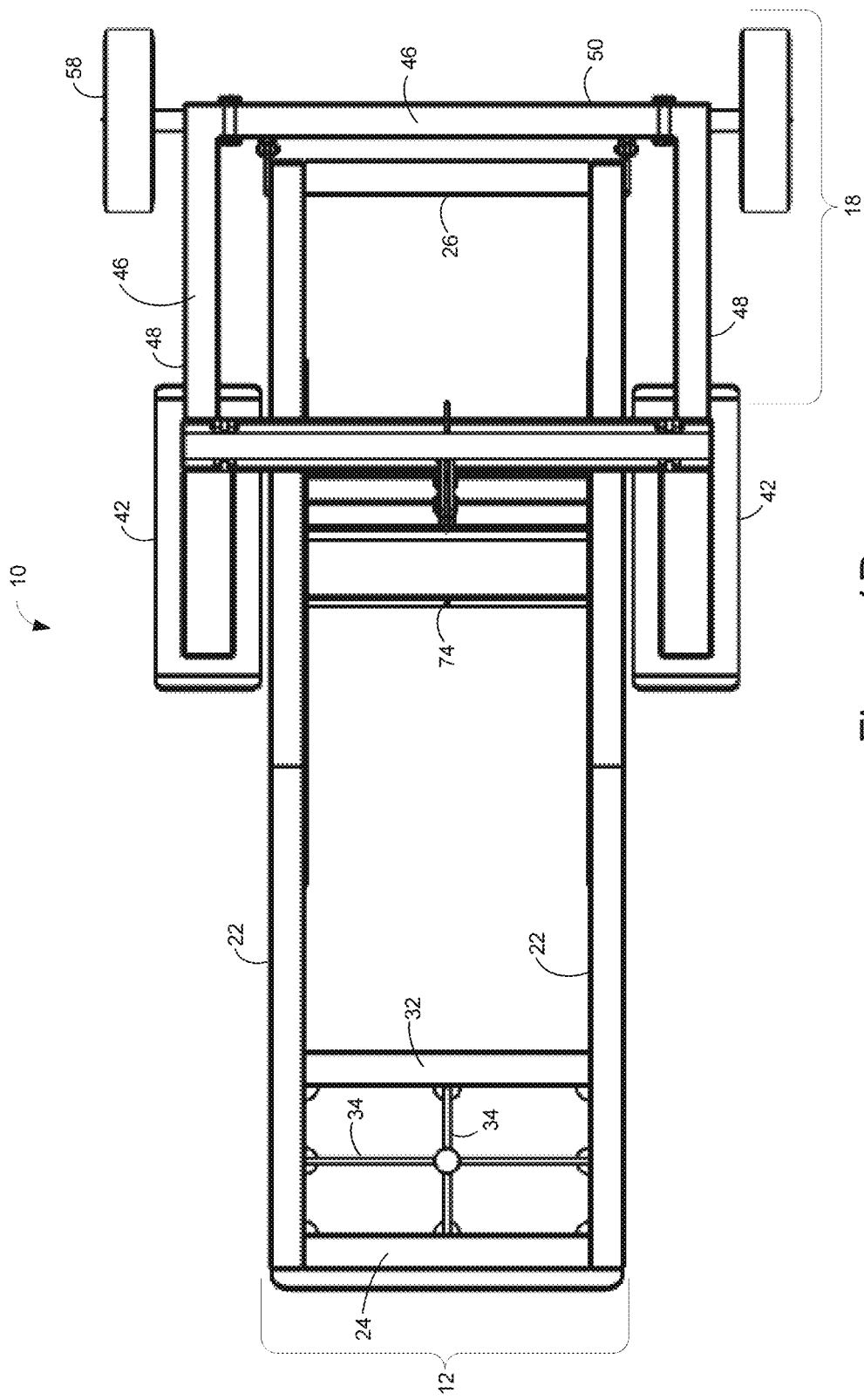
FIG. 1D is a top view of the trailer stand of FIG. 1A.
Figure 1E:
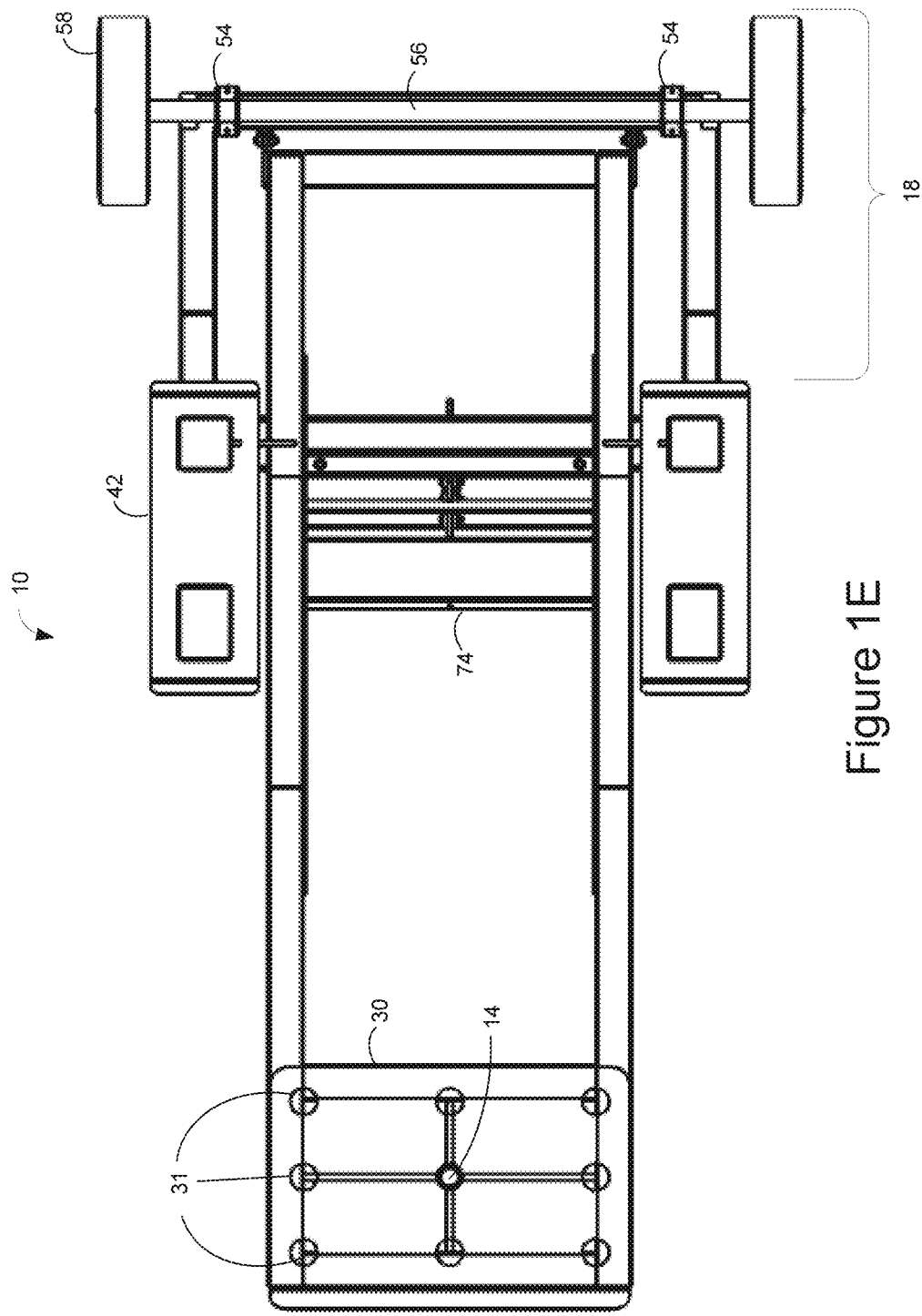
FIG. 1E is a bottom view of the trailer stand of FIG. 1A.
Figure 1F:
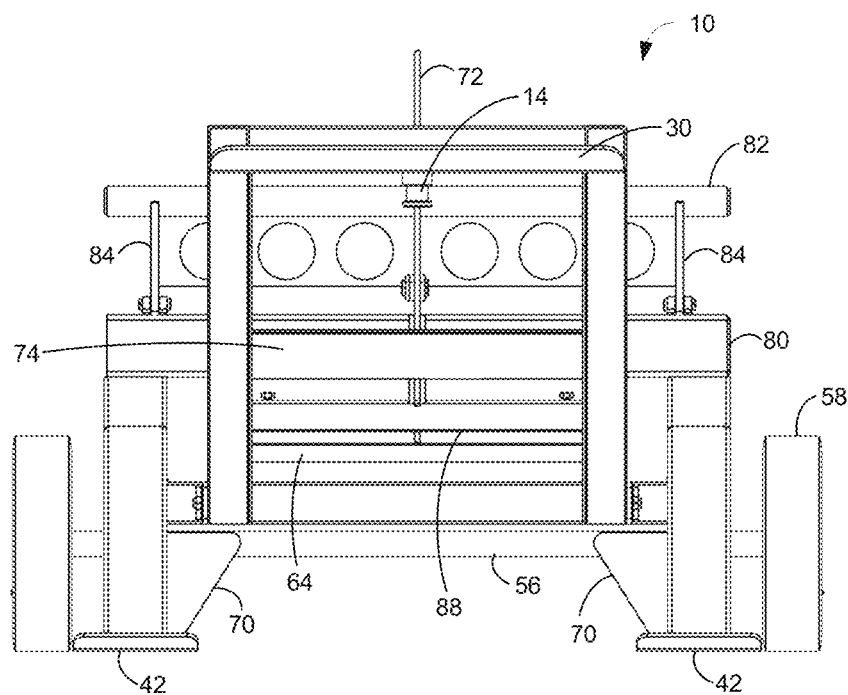
FIG. 1F is a front view of the trailer stand of FIG. 1A.
Figure 1G:
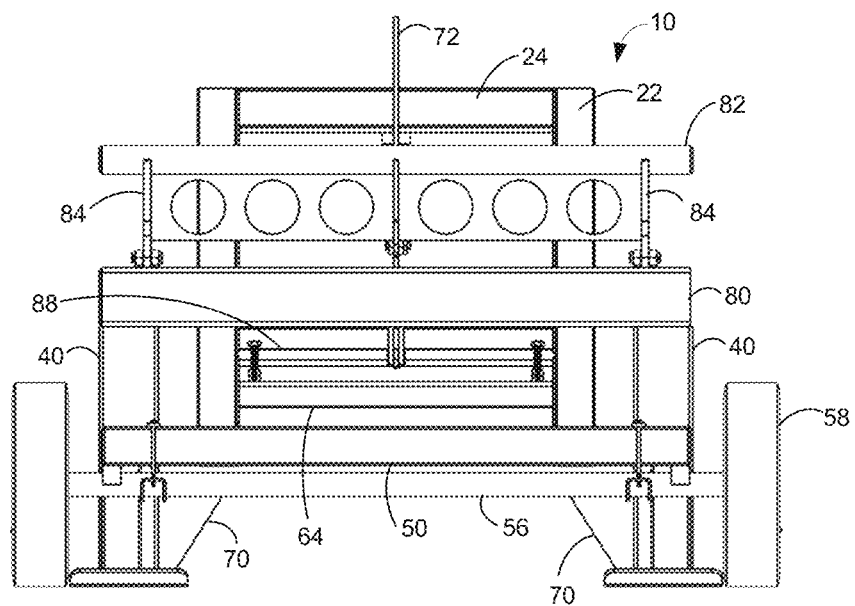
FIG. 1G is a rear view of the trailer stand of FIG. 1A.

Turning now to FIGS. 1A to 1E, an exemplary, mechanical trailer stand 10 is shown having an elevated kingpin 14 on a lifting frame 12. The lifting frame 12 is substantially S-shaped and is operatively connected to a stiff leg assembly 16 and a wheel assembly 18. Atop the stiff leg assembly 16 is a stabilizing assembly 20, which is operatively connected to the lifting frame 12.

Figure 2:
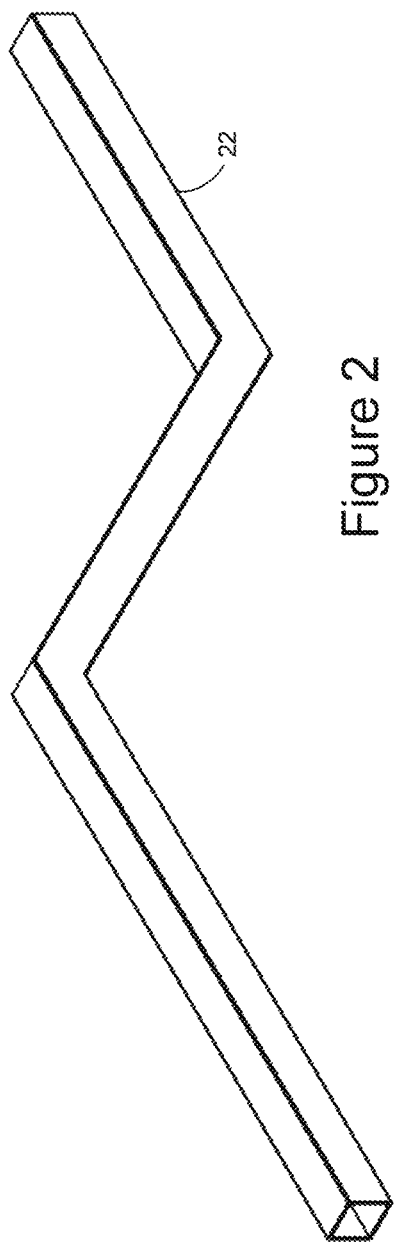
FIG. 2 shows a perspective view of a lifting frame arm of the trailer stand of FIG. 1A.
Figure 3:
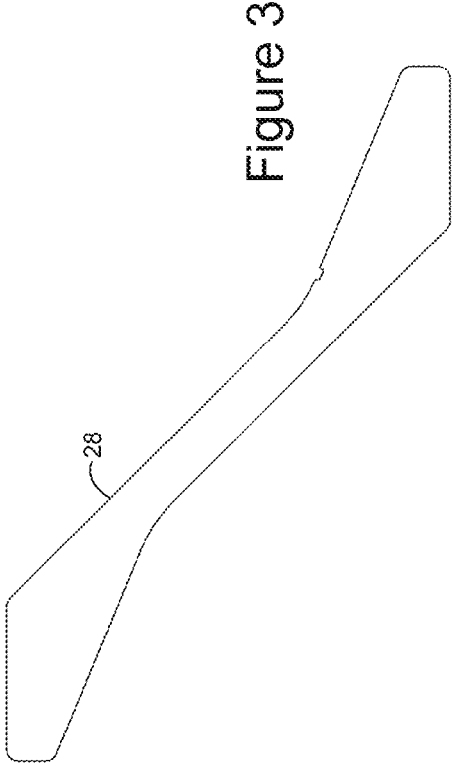
FIG. 3 shows a side view of the brace plate of the trailer stand of FIG. 1A.

Lifting frame 12 comprises at least two arms 22. An arm 22 of lifting frame 12 is shown in more detail in FIG. 2. The arm 22 may be made of metal tubing such as steel tubing, and may be cut and welded to form the shape. For example, arms 22 may be made with 4×4" steel tubing. Arms 22 are connected at the top end by a top cross support 24 and at its bottom end by a bottom cross support 26. Top cross support 24 and cross bottom support 26 are shown to be made of the same metal tubing as the arms 22 for a consistent shape and size but may be any shape. A brace plate 28, shown in more detail in FIG. 3, is connected to the inside of each arm 22. Each arm 22 may have an end cap 23 to close the metal tubing.

Brace plate 28 is shaped and helps align arms 22 as the lifting frame 12 is being constructed, providing the necessary angles at which the arms 22 are to be shaped. Once lifting frame 12 is constructed, brace plate 28 may be welded to the insides of the arms to provide reinforcement to the joints of the arms 22. Furthermore, the shapes of each end of brace plate 28 provide a gusset at the joints of the arms. Brace plate 28 may have slots or notches to place other components of the linkage assembly 100 as described below.

At the top end of the lifting frame 12, a kingpin is 14 supported on a kingpin plate 30 by the top cross support 24 and a kingpin plate support 32. The kingpin plate 30 may be further supported by a cross-bracing 34. In this embodiment, the kingpin plate 30 is attached to the lifting frame such that one end protrudes from the top cross support 24. The kingpin plate 30 may be angled at this end to aid in engaging the kingpin with a shunt truck. The kingpin plate 30, may have a plurality of holes 31 therethrough for drainage in the event of snow or rain accumulation. The kingpin plate 30 may be made of cold rolled steel and may be welded in place, adding weight to the top end of the lifting frame 12 and providing more stability to the trailer stand 10.

Stiff leg assembly 16 comprises at least two substantially vertical legs 40 which may be made from, but are not limited, to steel tubing. In one non-limiting example, square 6"×6" steel tubing may be used, however any shape or width or breadth tubing is possible. Each leg 40 has a bottom plate 42, such that each leg 40 is normal to the bottom plate 42. Bottom plate 42 may be made from, but not limited to, cold rolled steel and is shaped to lie substantially flat on a horizontal surface. Bottom plate 42 may have angled ends to allow for pivoting when the trailer stand 10 is being moved and when it is positioned. Each leg 40 may have a gusset 44 for added support. Each gusset 44 is connected to each leg 40 at one end and each bottom plate 42 at its other end, forming an angle. Each gusset 44 may be made from steel tubing of the same dimensions as the legs 40. An arm stop 70 is connected to each leg 40 of stiff leg assembly 16. These arm stops are positioned on each leg 40 under each arm 22. The arm stops 70 prevent the arms 22 from falling to the ground if any connection on the trailer stand 10 is disabled. For instance, if any part of the linkage assembly 100 were to become detached or either of the hinge plates 60 were to come loose from the pairs of hinge plates 62, the arm 22 would only travel downwards as far as the arm stops 70.

Wheel assembly 18 may comprise a U-shaped frame 46 connected to the stiff leg assembly 16. U-shaped frame 46 comprises at least two arms 48 connected to a cross wheel brace 50. U-shaped frame 46 may be made from, but is not limited to, metal tubing such as steel tubing, for example, 4"×4" steel tubing, which is cut and welded into a U-shape. However, as a skilled person in the art will understand, any size or shape tubing may be used to create the frame. The end of each arm 48 of the U-shaped frame 46 is connected to each leg 40 of the stiff leg assembly 16. The wheel assembly 18 may have a wheel assembly gusset 52 to support the U-shaped frame 46. The wheel assembly gusset 52 is connected under each arm 48 and connected to each leg 40 at or substantially close to the bottom plate 42 thereby forming an angle.

The cross wheel brace 50 has at least two U-shaped brackets 54 for supporting an axel 56 having wheels 58. U-shaped brackets 54 are held to the underside of cross wheel brace 50 by axel bracket connectors 55 sitting on the top of cross wheel brace 50 via long bolts 53 traversing the width of cross brace 50. U-shaped brackets 54 may be bolted to the underside of cross wheel brace 50. Axel 56 is a tube or rod made from metal or other robust material, such as steel. At each end of axel 56 a tire or wheel 58 is rotationally connected by wheel bearings. Wheel 58 may be any suitable tire for moving the trailer stand 10, such as a trailer tire. While one type of wheel and axel assembly has been described herein, it is understood that any wheel and axel assembly may be used.

Figure 4A:
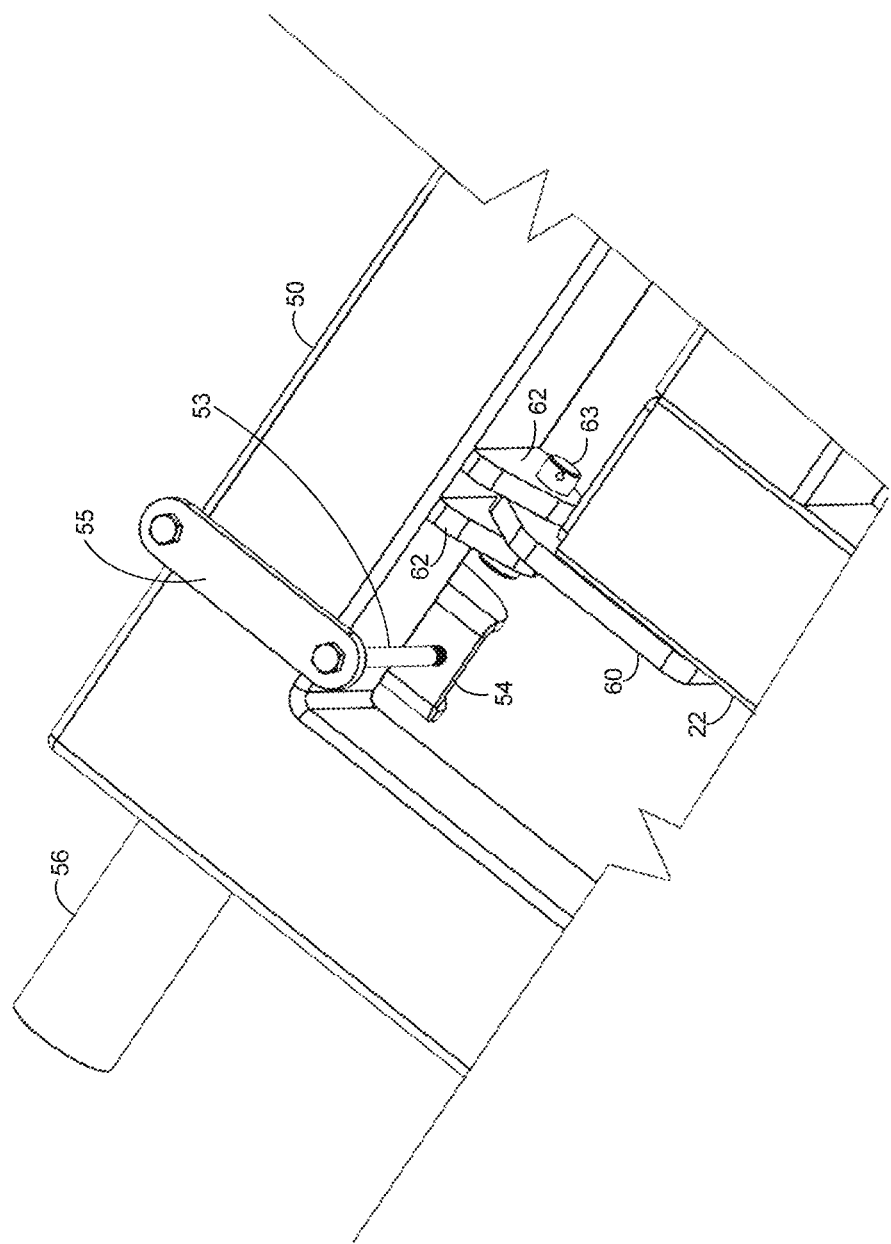
FIG. 4A shows a cut-away top perspective view of a connector between the lifting arm and the wheel assembly of the trailer stand of FIG. 1A.

Lifting frame 12 is shaped to fit within U-frame 46. The ends of each arm 22 are pivotally connected to the inside of cross wheel brace 50. In this embodiment shown in FIGS. 4A and 4B, a hinge plate 60 is connected to the end of each arm 22. Cross wheel brace 50 has at least two pairs of corresponding hinge plates 62 connected to the cross wheel brace 50 of the U-frame 46, which align on each side of each hinge plate 60. Hinge plate 60 has a hole (not shown) which aligns with a holes (not shown) in the pair of hinge plates 62. Hinge plate 60 connects to the pair of hinge plates 62 via a bolt or cotter pin 63 through their corresponding holes, allowing for the lifting frame 12 to pivot around the axis created by the pin 63 when the lifting frame is raised at the top cross support 24.

Figure 5A:
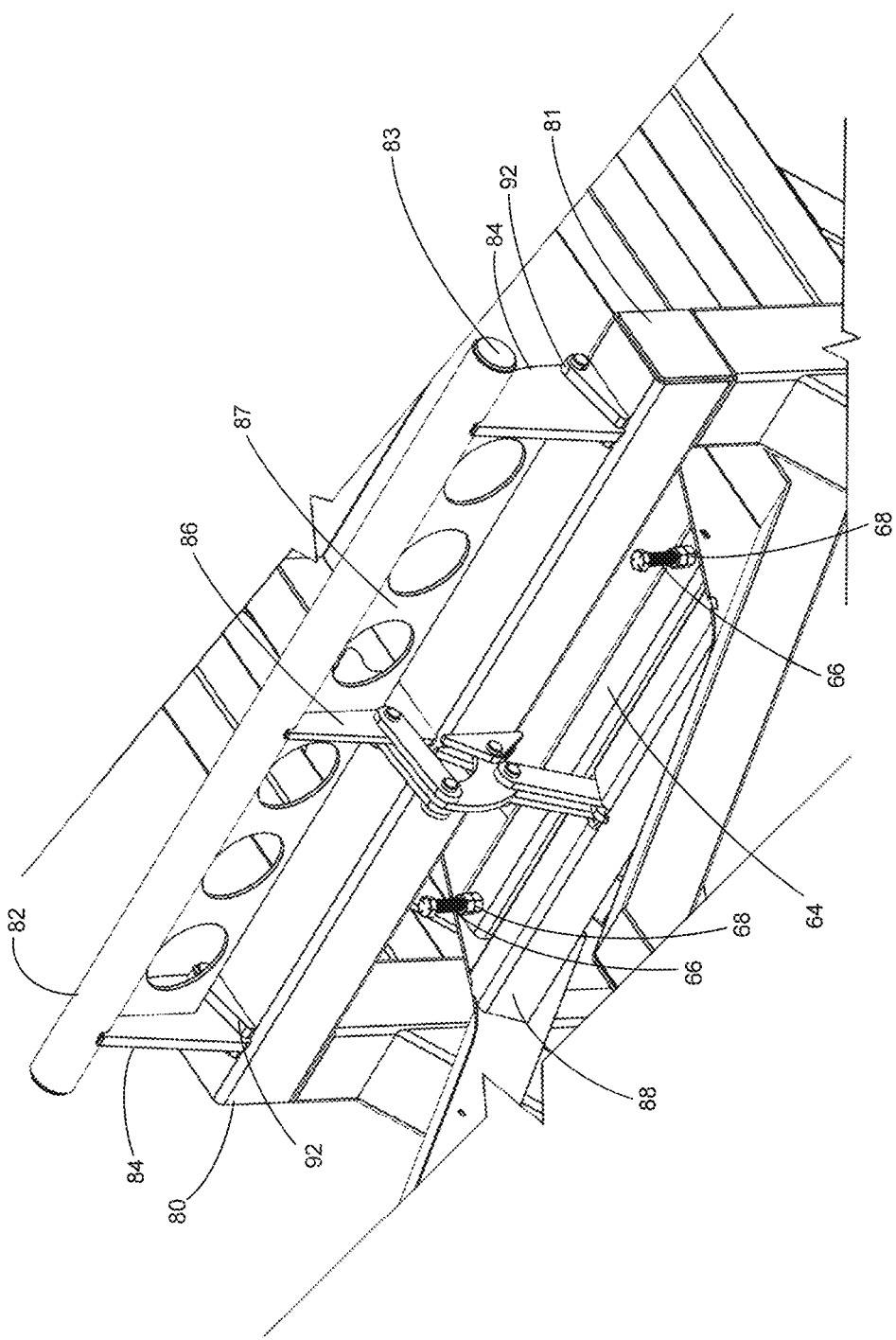
FIG. 5A shows a cut-away front perspective view of a stabilizer assembly of the trailer stand of FIG. 1A.

A stop bar 64, seen more clearly in FIG. 5A, is connected to the lower end of each brace plate 28 and traverses the width of lifting frame 12. The stop bar 64 may have protrusions (not shown) which fit into notches (not shown) within the brace plate 28 to position it, and then the stop bar 64 may be welded into place. While FIG. 5A shows an embodiment where stop bar 64 accommodates two stops, stop bar 64 may accommodate at least one stop 66. Stop 66 may be a bolt with a cap held in a hole (not shown) in stop bar 64 by nuts 68 or other retention means. Stop bar 64 aligns with the stiff leg assembly 16 to sit beneath the stabilizing assembly 20. When lifting frame 12 is raised, lifting frame 12 rotates about the axis created by the hinge plates 60 and the pairs of hinge plates 62 until the stops 66 engage the underside of stabilizing assembly 20. When the stops 66 engage the stabilizing assembly 20, the lifting frame 12 no longer pivots causing the U-frame 46 of the wheel assembly 18 to move with the lifting frame 12 as it continues to be raised, thereby raising the stiff leg assembly 16. When the stiff leg assembly 16 is raised thusly, the trailer stand 10 is supported on the wheels 58 and is movable by rotating the wheels 58.

Figure 5B:
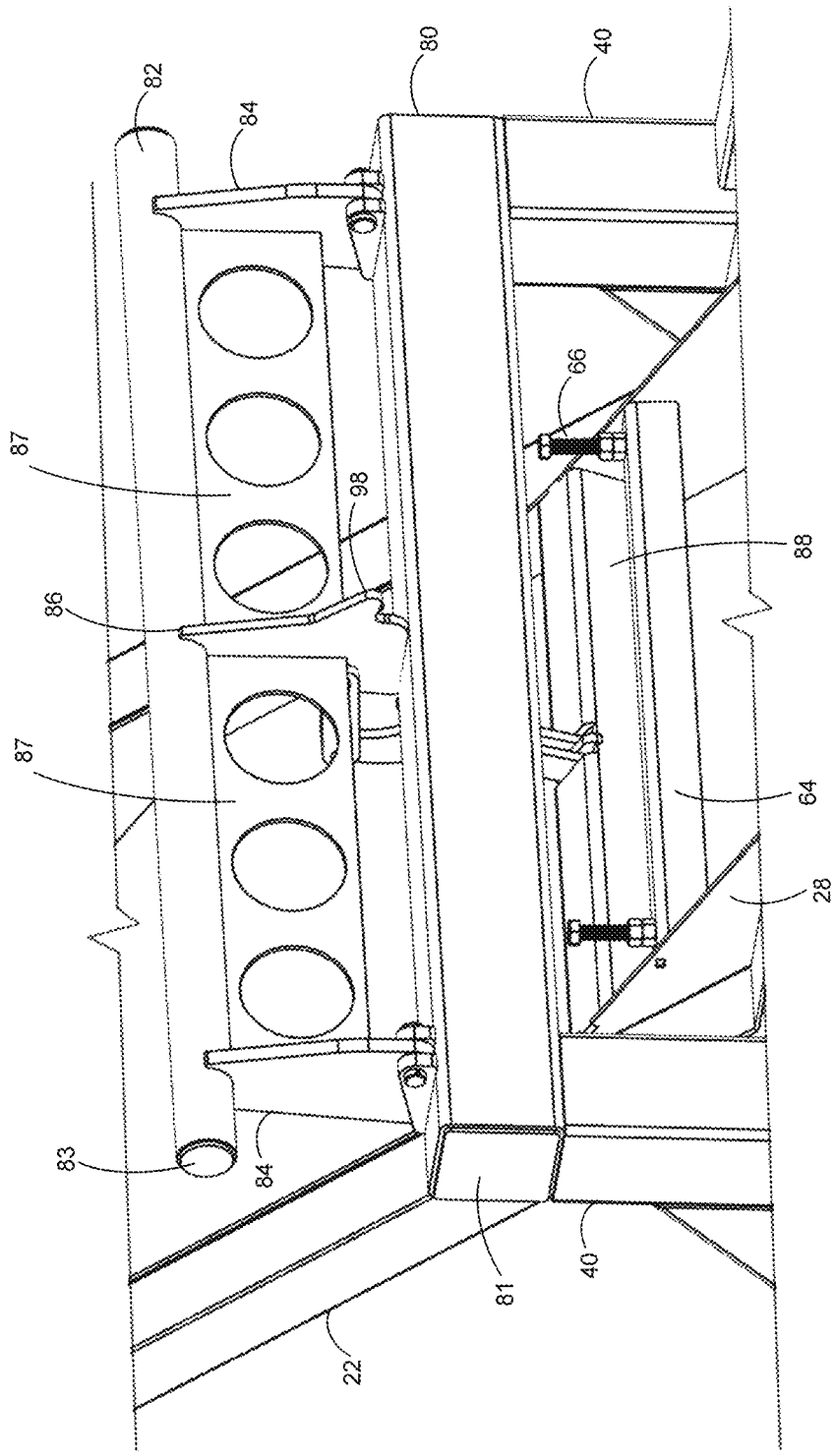
FIG. 5B shows a cut-away back perspective view of the stabilizer assembly of FIG. 5A.
Figure 6:
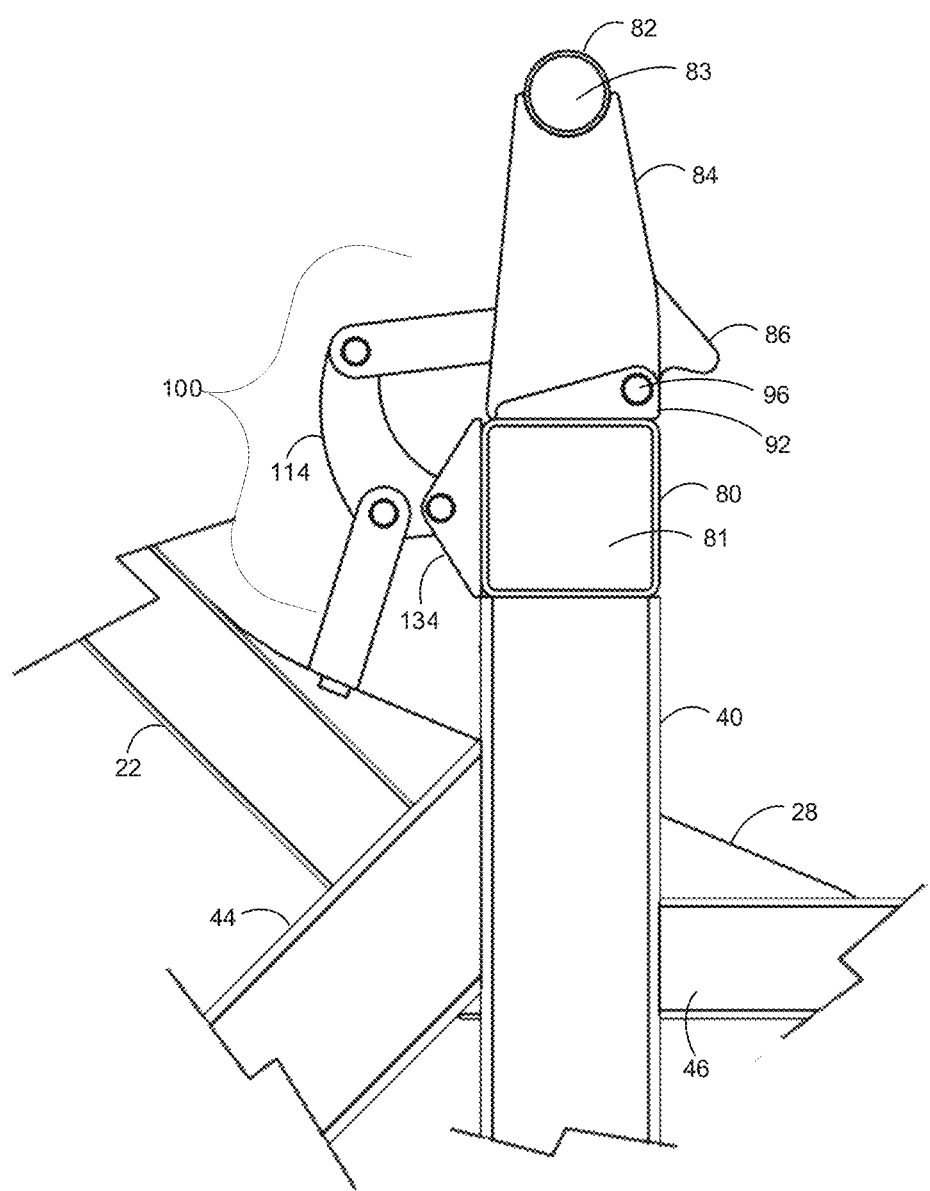
FIG. 6 shows a side view of a stabilizing assembly when the trailer stand of FIG. 1A is stationary.
Figure 7:
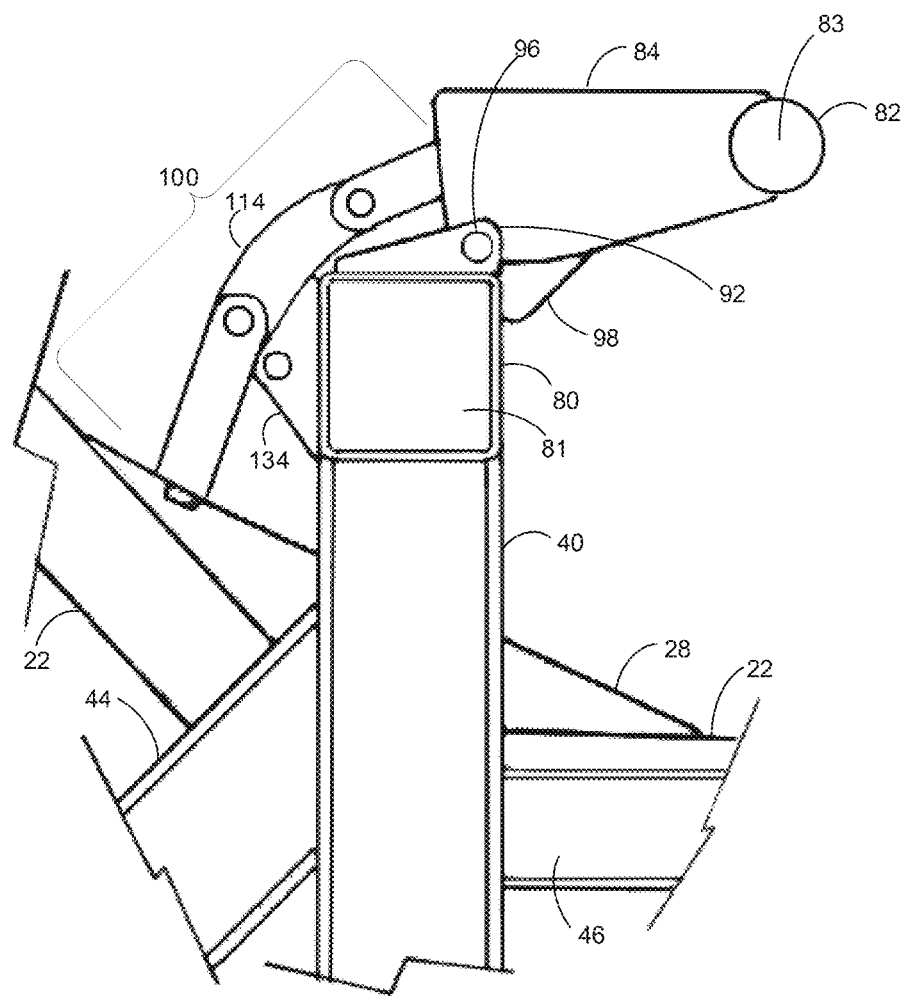
FIG. 7 shows a side view of the stabilizing assembly when the trailer stand of FIG. 1A is in motion.
Figure 8:
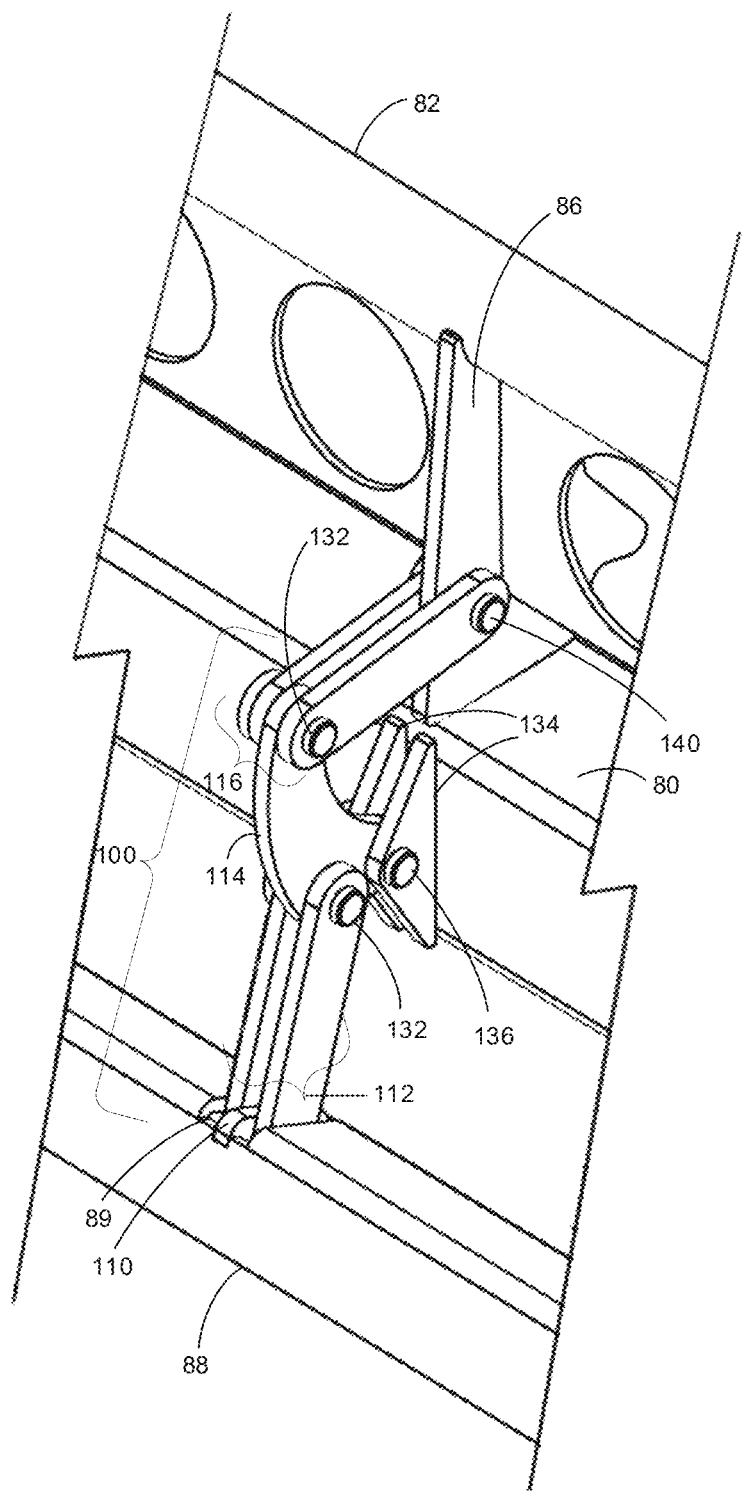
FIG. 8 shows a perspective cut-away view of the center pivot of the stabilizing assembly of FIG. 5A.

FIGS. 5A and 5B show the stabilizing assembly 20 in more detail. The stabilizing assembly 20 comprises a stabilizing cross support 80, support beam 82, beam pivots 84, beam linkage pivot 86, and linkage cross support 88. FIG. 6 shows a portion of the stabilizing assembly 20 when the trailer stand 10 is not in motion. FIG. 7 shows the portion of the stabilizing assembly 20 when the trailer stand 10 is in motion. FIG. 8 shows the linkage assembly 100 of the stabilizing assembly 20 in more detail.

Stabilizing cross support 80 is connected to the tops of each vertical leg 40 and may be made from, but not limited to, steel tubing. One non-limiting example may be square 6"×6" steel tubing, however, any shape or width or breadth tubing may be possible. Each end of stabilizing cross support 80 may have an end cap 81 which may be welded into place.

In the example shown in FIGS. 5A and 5B, two beam pivots 84 and a linkage pivot 86 sit atop the stabilizing cross support 80. However, stabilizing assembly 20 may have any arrangement or number of beam pivots and linkage pivots to allow the movement of the stabilizing assembly 20. In FIGS. 5A and 5B, the two beam pivots 84 are shown to hold the support beam 82 on each end of support beam 82. Linkage pivot 86 holds the support beam 82 at its center. Support beam 82 may be a round metal tube such as a round steel pipe and may have end caps 83 which may be welded into place. Under the support beam 82 and between each of the beam pivots 82 and the linkage pivot 86 are at least two plates 87 which may be stitch-welded to the bottom of the support beam 82 and welded to the beam pivots 82 and the linkage support 86. The plates 87 help to keep the beam pivots 82 and linkage support 86 to fluidly move together. If a semi-trailer were to collapse onto the support beam 82, the plates 87 keep the beam pivots 82 from twisting and keep the stabilizing assembly 20 moving together as a whole.

Figure 9:
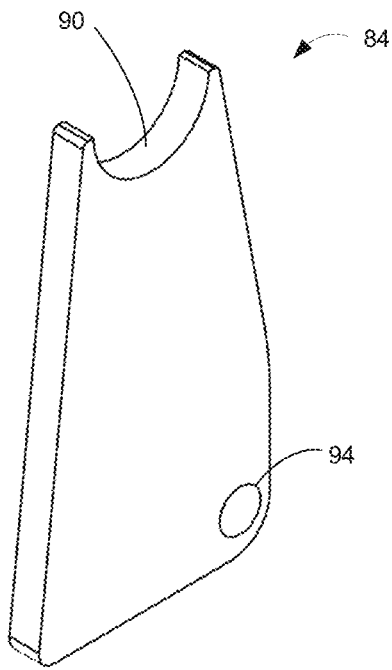
FIG. 9 shows a perspective view of a beam pivot of the stabilizing assembly of FIG. 5A.

Beam pivots 84, shown in more detail in FIG. 9, have a rounded cut out 90 at the top to fit the support beam 82 to act as a bracket for the support beam 82. The bottom of support beam 82 fits within the rounded cut out 90 and is welded to the beam pivots 82. Linkage pivot 86, shown in more detail in FIG. 10, has a similar rounded cut out 91 at its top to fit the support beam 82, which is also welded within this cut-out. Beam pivots 84 and linkage pivot 86 may be made of plate metal such as cold rolled steel and may be laser cut to shape. Each beam pivot 84 is held to the stabilizing cross support 80 between a pair of pivot brackets 92, which are welded to the stabilizing cross support 80. Pivot brackets 92 are substantially a right-triangle shape and have a hole (not shown) at its wide end which aligns with the hole 94 in the beam pivot 84. Beam pivot 84 is held by the pivot bracket 92 by a bolt or pin, such as a cotter pin 96, allowing the beam pivot 84 to rotate around the axis of rotation created by the pin. While beam pivot 84 is shown to have a particular shape in FIG. 9, it is understood that beam pivot 84 may have any shape to allow it to hold the support beam 82 and rotate around its axis of rotation.

Figure 10:
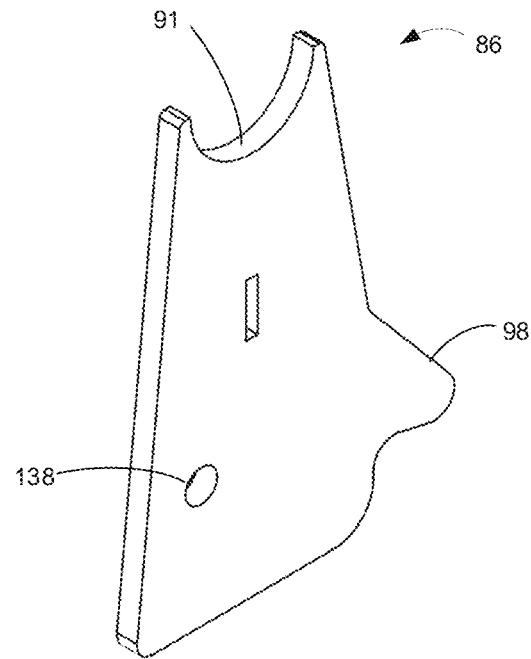
FIG. 10 shows a perspective view of a linkage pivot of the stabilizing assembly of FIG. 5A.

Linkage pivot 86, shown in more detail in FIG. 10, has a similar shape to beam pivot 84, except linkage 86 has a protrusion 98 on one side. Protrusion 98 acts as a stop to prevent the stabilizing assembly from rotating past the stabilizing cross support 80.

The linkage assembly 100 pivots the support beam 82 to a downward position when the lifting frame 12 is raised. Linkage assembly 100 is connected to linkage cross support 88 at one end and to beam linkage pivot 86 at its other end. Linkage cross support 88 is connected to the brace plate 28 and sits adjacent to and slightly above the stop bar 64 and traverses inside of the lifting assembly 12. Linkage cross support 88 may have notches (not shown) at each end which fit into slots (not shown) within the brace plate 28, and then linkage cross support 88 may be welded to the brace plate 28.

Linkage assembly 100, shown in more detail in FIG. 8, comprises a connector plate 110, a first pair of straight links 112, a middle link 114, and a second pair of straight links 116. All of the components of the linkage assembly 100 may be made from cold rolled steel which is laser cut. However, linkage assembly 100 may have any arrangement or number links and to allow the pivoting movement of the stabilizing assembly 20.

Figure 11:
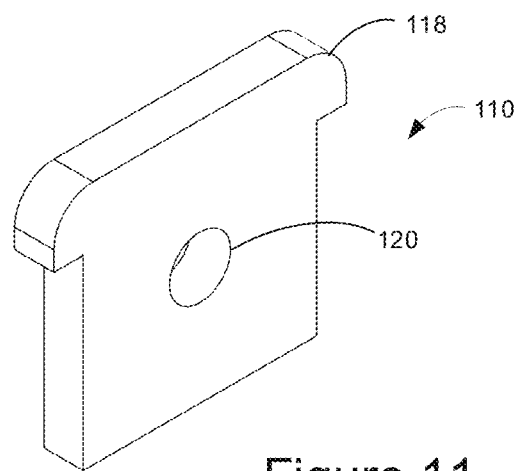
FIG. 11 shows a perspective view of a connector plate of the stabilizing assembly of FIG. 5A.

Linkage cross support 88 has a slot 89 that is shaped to retain connector plate 110. Connector plate 110, shown in more detail in FIG. 11, is substantially rectangular with a flared top 118, which fits in grooves (not shown) within the slot 89. Connector plate 110 has a central hole 120.

Figure 12:
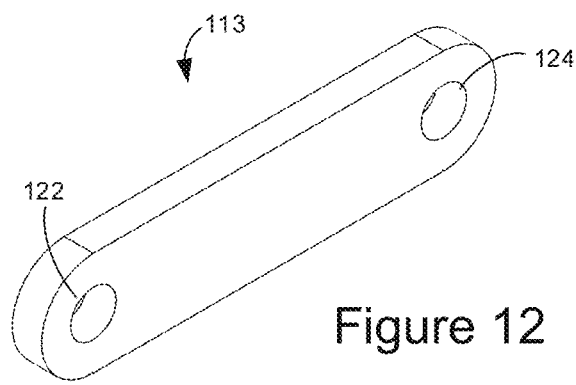
FIG. 12 shows a perspective view of a straight link of the stabilizing assembly of FIG. 5A.

Connector plate 110 is connected to a first pair of straight links 112, such that the connector plate is between the first pair of straight links 112. A single straight link 113, shown in FIG. 12, is substantially oblong having a first hole 122 at one end and a second hole 124 at the other end. The central hole 120 of the connector plate 110 aligns with the first holes 122 of each straight link 112. A cotter pin or bolt (not shown) may hold the connector plate 110 and the first pair of straight links 112 together through their respective holes, creating an axis of rotation.

Figure 13:
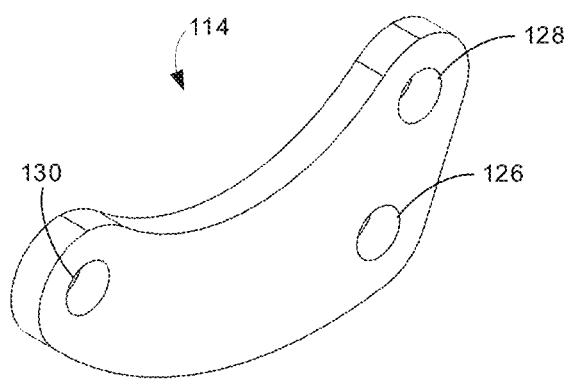
FIG. 13 shows a perspective view of a middle link of the stabilizing assembly of FIG. 8.

Middle link 114, shown in FIG. 13, is substantially kidney-shaped, and having a wider end and a thinner end. Middle link 114 has a first hole 126 and a second hole 128 at the wider end and a third hole 130 at the thinner end. First hole 126 of the middle link 114 aligns with the second holes 124 of the first pair of straight links 112. Middle link 114 is held between the first pair of straight links 112 by a bolt or cotter pin 132, or some other retention means, through their respective holes, creating an axis of rotation.

Second hole 128 aligns with a hole (not shown) in a pair of triangular brackets 134 attached to the side of stabilizing cross support 82. Middle link 114 is held between the pair of triangular brackets 134 by a bolt or cotter pin 136, or some other retention means, through their respective holes, creating an axis of rotation.

Thinner end of middle link 114 is also held between a second pair of straight links 116. Second pair of straight links 116 comprises two straight links 113 shown in FIG. 12. Third hole 130 aligns with first holes 122 of the second pair of straight links 116. Middle link 114 is held between the second pair of straight links 112 by a bolt or cotter pin 132, or some other retention means, through their respective holes, creating an axis of rotation.

Second holes 124 of the second pair of straight links 116 aligns with a hole 138 in linkage pivot 86. Linkage pivot 86 is held between the second pair of straight links 116 when a bolt or cotter pin 140 or other retention means traverses the second holes 124 and the hole 138, creating an axis of rotation.

In operation, as the lifting frame 12 is lifted, the linkage cross support 88 moves upwards, causing the linkage assembly 100 to rotate around the axes of rotation created by the connections between the connector plate 110, first pair of straight links 112, middle link 114, the pair of triangular brackets 134, the second pair of straight links 116, and the linkage pivot 86. As shown, as the linkage cross support 88 moves upward, the rotations of the links push the bottom of the linkage pivot up, causing it and the beam pivots 84 to pivot from a vertical position to a horizontal position as shown in FIG. 7. When protrusion 98 engages with the stabilizing cross support 80, the linkage assembly 100 is stopped from rotationally moving the pivots further.

Figure 14:
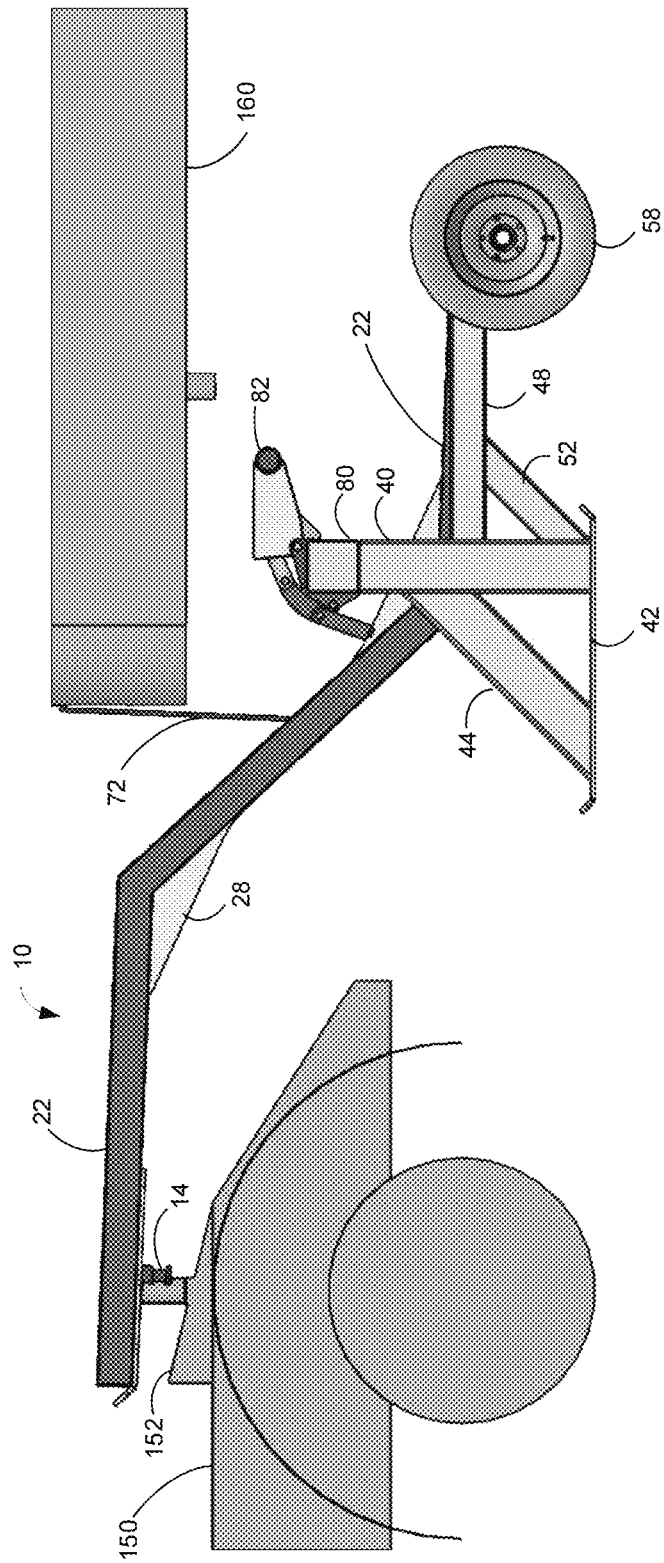
FIG. 14 shows a side view of the trailer stand of FIG. 1A as it is being positioned.

FIG. 14 shows the trailer stand 10 in operation as it is being moved. Kingpin 14 of trailer stand 10 connects to a fifth wheel 152 of a shunt truck 150. Shunt truck 150 lifts the lifting frame 12 via the kingpin 14. As the lifting frame 12 is lifted, the linkage assembly 100 is activated, and the stabilizing assembly 20 is pivoted. When the stops 66 on stop bar 64 engage the stabilizing cross support 80, the U-frame 46 of the wheel assembly 18 moves in conjunction with the lifting frame 12, lifting the leg assembly 16 off the ground, such that the trailer stand 10 is supported by the shunt truck 150 and its wheels 58. The shunt truck 150 is then able to move the trailer stand 10 under the semi-trailer 160.

Trailer stand 10 may have a flag 72 in a flag holder 74 to aid visually the operator in placing the trailer stand 10. For example, if the flag 72 is at the center of the width of the stand 10, then an operator can determine if the stand 10 is centered to the trailer 160. The flag also may visually indicate the proximity of the trailer stand 10 to the semi-trailer 160 by waving or vibrating as it engages with the semi-trailer 160. Flag 72 may be a rod or staff made from any flexible material such as fiberglass and may have further visual indicators attached to it, such as a small piece of fabric or plastic sheet (not shown). Flag holder 74 may be connected to the brace plate 28 and holds flag 72 by insertion into a spring (not shown) protruding from a central hole (not shown).

FIG. 15 shows the trailer stand 10 after it has been placed under the semi-trailer 160. Shunt truck 150 lowers the lifting assembly 12, thereby lowering the leg assembly 16. As the lifting assembly 12 lowers, the linkage assembly 100 lowers and the stabilizing assembly 20 pivots back from its horizontal position to its vertical position. As shown in FIG. 15, the stabilizing assembly 20 does not need to be in contact with the bottom of the trailer 160. The gap between the support beam 82 and the trailer 160 creates a "catch-zone" of about 1 to about 3 inches, whereby if the trailer 160 were to collapse, it would gradually and safely land on the support beam 82. In one embodiment, the "catch zone" gap is about 1 inch. In another embodiment, the "catch zone" gap is about 2 inches. In another embodiment, the "catch zone" gap is about 3 inches.

The trailer stand 10 is positionable under the semi-trailer 160 further than standard manual trailer stands which typically sit at the edge of the end of the semi-trailer 160 or within 6" of the edge, ensuring more stability in the event of the landing gear 162 of the semi-trailer 160 collapsing.

Because of the shape of the trailer stand 10, for example, the elongated wheel assembly 18, and the elongated lifting frame 12, the center of gravity of the trailer stand 10 is around the gusset 44. This makes it very difficult to tip the trailer stand 10 forward or backward and thus an operator could not become pinned under the trailer stand 10.

The width of support beam 82, in this example, is determined to by knowing the width of standard semi-trailers and forklifts and establishing the half-way point of where a forklift would be if it was inside the semi-trailer. Thus, the width of the support beam 82 may reach up to the half-way point of where a forklift (not shown) would be if it were against one side of the inside of the semi-trailer. This way, if the landing gear 162 of a semi-trailer 160 were to collapse while a forklift were inside, the support beam 82 would be able to support the weight sufficiently as the semi-trailer came down. In this manner, the trailer stand 10 would prevent the semi-trailer 160 from tipping forward or to one side. However, the support beam 82 may be longer or shorter depending on the needs of the operator. Because of the shape of the trailer stand 10, it is able to support up to about 100,000 lb of load.

While an articulating trailer stand 10 has been described herein, it is understood that the trailer stand 10 may also be static or fixed. In one embodiment, instead of sitting atop pivots, implemented by the linkage assembly 100, the support beam 82 would sit atop the leg assembly 16 by a support means that is substantially vertical. The "catch-zone" gap would be sufficiently large enough to allow the trailer stand 10 to be placed under a semi-trailer 160 as it is being moved into place. In another embodiment, the stabilizing assembly 20 is configured as a series of support beams 82 which are vertically oriented as steps as shown in FIG. 16. In this embodiment, the shunt truck 150 moves the trailer stand 10 under the semi-trailer 160 until the about 1 inch to about 3 inch "catch zone" gap is created by the appropriate vertically oriented support beam 82 or step.

Because of the automated mechanical nature of the trailer stand 10, operator intervention in the placement, positioning and adjusting of the trailer stand 10 is unnecessary. Thus, the operator does not have to leave the cab of the shunt truck 150 to place the trailer stand 10, ensuring the operator's safety at all times of operation.

In embodiments of the present invention, the trailer stand 10 does not require a motor for positioning the trailer stand 10 under the semi-trailer 160 or removing the trailer stand 10 from under the semi-trailer 160 or for pivoting the stabilizing assembly 20. In these embodiments, the motion of the shunt truck 150 is utilized to position the trailer stand 10 under the semi-trailer 160, to remove the trailer stand 10 from under the semi-trailer 160, and to pivot the stabilizing assembly 20.

FIGS. 16A to 16G show an alternative embodiment of a trailer stand, generally referenced by the number 200. In this example, trailer stand 200 comprises a lifting frame 202, a leg assembly 204, a wheel assembly 208, and a stepped landing assembly 210. The lifting frame 202 comprises a U-shaped frame having at least two arms 212 connected by a top cross support 224. The arms 212, top cross support 224 may be from square metal tubing, such as 4×4" steel tubing, but may be any size or shape to create the frame. The lifting frame 202 has a guide rail 206 on each arm 212. The guide rails 206 acts as a visual guide for a shunt truck operator to place the trailer stand 200. The guide rails 206 are of a sufficient height that the shunt truck operator can see them from the shunt truck and allow the operator to place the trailer stand 200 substantially square to a semi-trailer. The guide rails 206, in this example, are shown to be U-shaped and connected to the top of each arm 212. It is understood that the guard rails 206 may be any shape that allows a shunt truck operator to visually guide the trailer stand 200.

Like the embodiment in FIG. 1A, the lifting frame 202 has a kingpin 214 held by a kingpin plate 230. The kingpin plate 230 is connected to the top cross support 224 and a kingpin plate support 232. The kingpin plate 230 may be further supported by a cross-bracing 234. In this embodiment, the kingpin plate 230 is attached to the lifting frame such that one end protrudes from the top cross support 224. The kingpin plate 230 may be angled upward at this end to aid in engaging the kingpin with a shunt truck. The kingpin plate 230, may have a plurality of holes 231 therethrough for drainage in the event of snow or rain accumulation. The kingpin plate 230 may be made of cold rolled steel and may be welded in place.

Leg assembly 204 comprises a pair of substantially vertical front legs 240 and a pair of substantially vertical back legs 242 which may be made from, but are not limited to, metal tubing, such as 6"×6" steel tubing. However, the legs 240 and 242 may be made of metal tubing of any dimensions to create the legs of the leg assembly. Each leg 240, 242 is supported on a bottom plate 244, such that each leg 240 is normal to the bottom plate 244. Bottom plate 244 may be made from, but not limited to, cold rolled steel and is shaped to lie substantially flat on a horizontal surface. Bottom plate 244 may have angled ends to allow for pivoting when the trailer stand 200 is being moved and when it is positioned. Between each of the front legs 240 and each of the back legs 242 is a leg brace 246, which keeps the legs apart and from twisting if the ground on which the trailer stand 200 sits is not level, The leg brace 246 may be a metal plate such as steel plate or cold rolled steel and may be laser cut to shape. In this embodiment, the leg brace has circular and semicircular cut outs to reduce the weight of the overall trailer stand. As the skilled person in the art will understand, any size, shape, or thickness metal plate may be used to create the leg brace 246. The skilled person will also understand that any type of brace or gusset may be used to reinforce the legs and stabilize the bottom plate 244, such as, but not limited to, metal tubing.

A front cross support 260 is connected to the tops of each front leg 240. A back cross support 262 is connected to the tops of each back leg 242. The front cross support 260 and the back cross support 262 may be made from, but not limited to, metal tubing, such as 6"×6" steel tubing and may have an end caps 261, 263 respectively, covering each end. However, the front cross support 260 and the back cross support 262 may be made of metal tubing of any dimensions in order to connect the legs and support the stepped assembly 210.

Like the embodiment shown in FIG. 1A, the wheel assembly 208 may comprise a U-shaped frame 236 connected to the back pair of legs 242 of the leg assembly 204. U-shaped frame 236 comprises at least two arms 238 connected to a cross wheel brace 250. U-shaped frame 236 may be made from, but is not limited to, metal tubing such as steel tubing, for example, 4"×4" steel tubing. However, the skilled person in the art will understand, any size and dimension of tubing may be used to create the frame. The end of each arm 238 of the U-shaped frame 236 is connected to each back leg 242 of the leg assembly 204. The wheel assembly 208 may have a wheel assembly gusset 252 to support the U-shaped frame 236. The wheel assembly gusset 252 may be a substantially triangular shaped steel plate which may be connected under each arm 238 and connected to each back leg 242.

The cross wheel brace 250 has at least two U-shaped brackets 254 (similar to U-shaped brackets 54 shown in FIG. 4B) for supporting an axel 256 having wheels 258. U-shaped brackets 254 are held to the underside of cross wheel brace 250 by axel bracket connectors 255 (similar to bracket connectors 55 shown in FIG. 4A) sitting on the top of cross wheel brace 250 via long bolts 253 (similar to long bolts 53 shown in FIG. 4A) traversing the width of cross brace 250. U-shaped brackets 254 may be bolted to the underside of cross wheel brace 250. Axel 256 is a tube or rod made from metal or other robust material, such as steel. At each end of axel 256 a tire or wheel 258 is rotationally connected by wheel bearings. Wheel 258 may be any suitable tire for moving the trailer stand 200, such as a trailer tire. While one type of wheel and axel assembly has been described herein, it is understood that any wheel and axel assembly may be used.

Figure 17A:
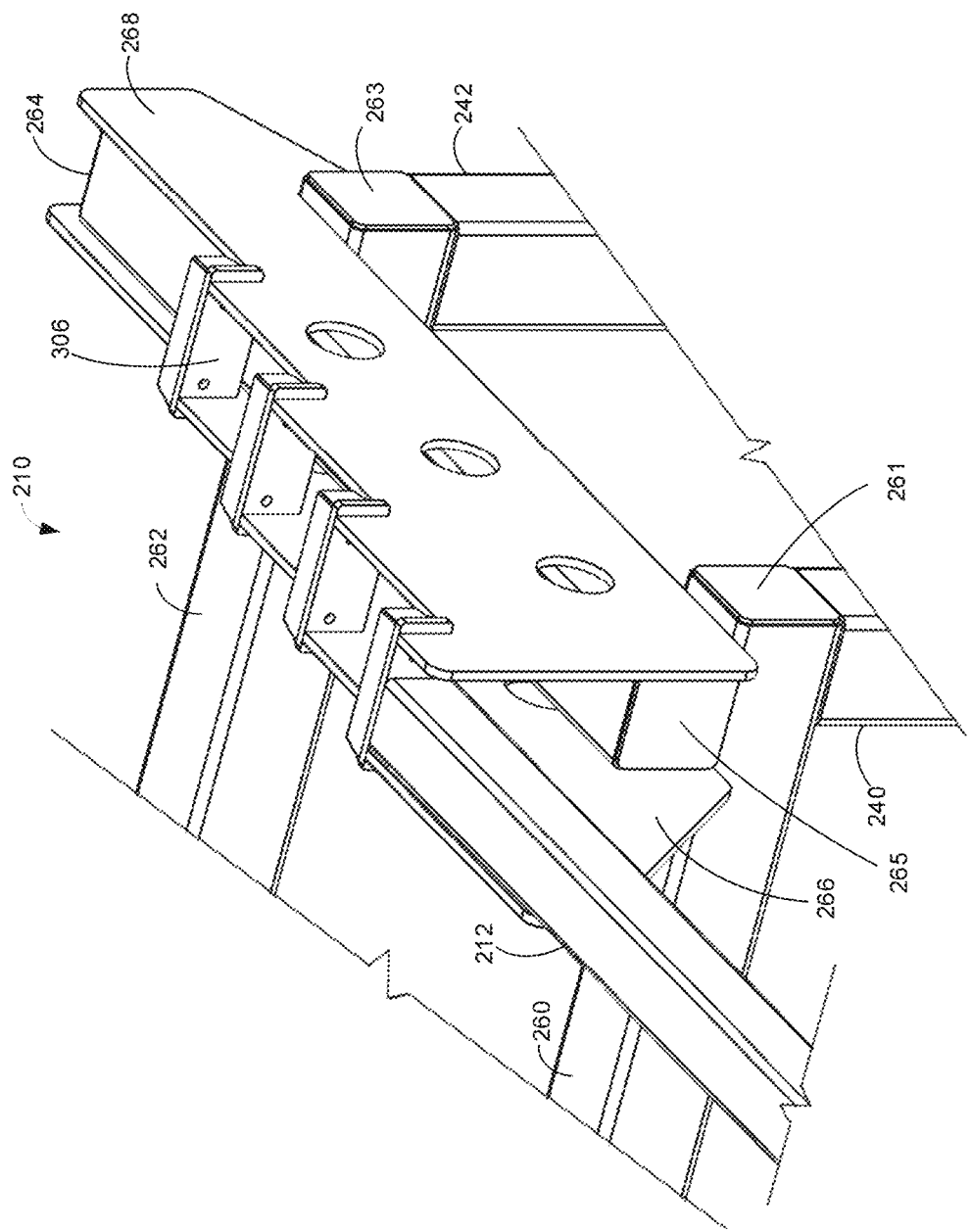
FIG. 17A is a perspective cutaway view of a stepped landing assembly of the trailer stand of FIG. 16A.
Figure 17B:
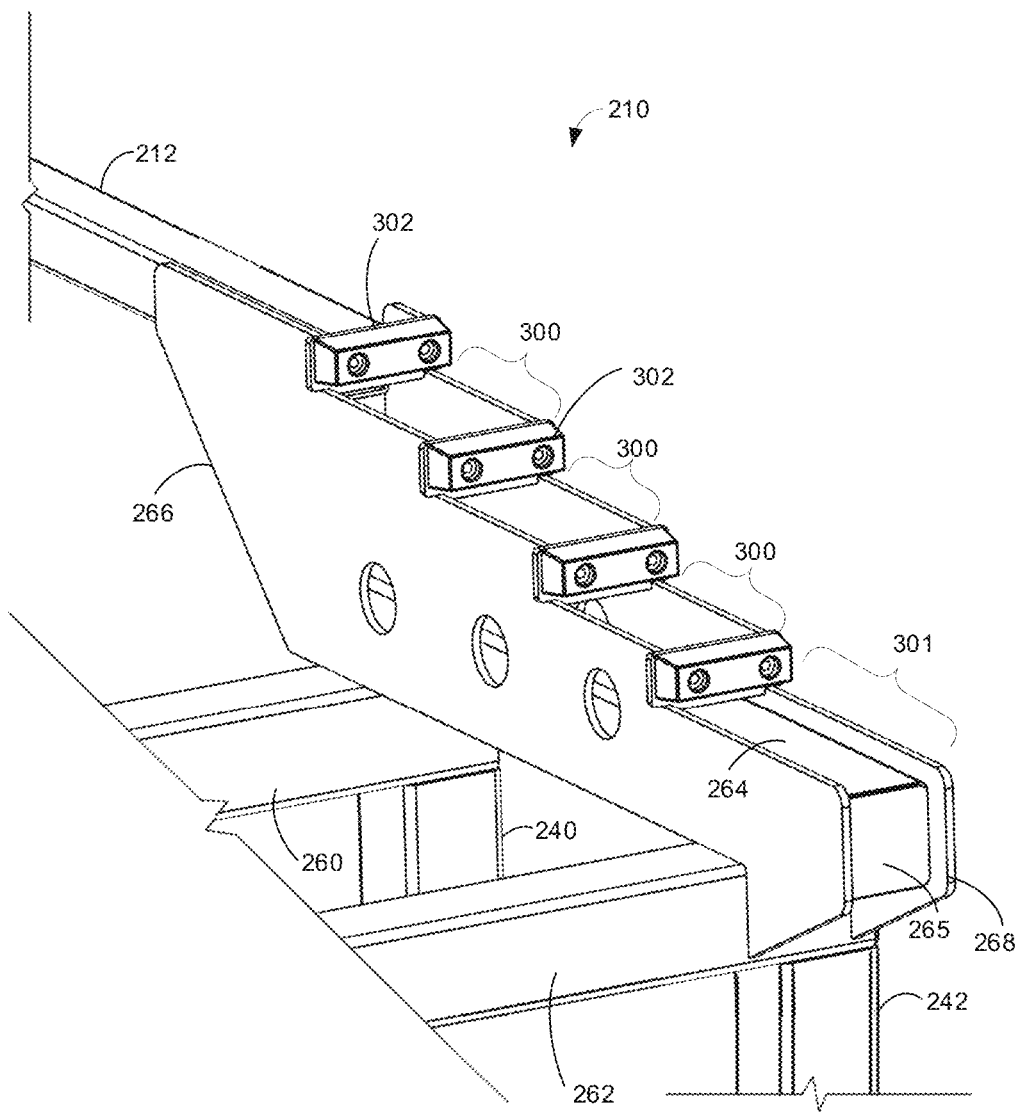
FIG. 17B is an alternate perspective cutaway view of the stepped landing assembly of FIG. 17A.

Turning now to FIGS. 17A and 17B, a stepped landing assembly 210 for the trailer stand 200 is shown in more detail. Each arm 212 is connected to a stepped landing assembly 210. Each stepped landing assembly 210 sits atop and is connected to the front cross support 260 of the front pair of legs 240 and the back cross support 262 of the back pair of legs 242 of the leg assembly 204. Each stepped landing assembly 210 comprises a base 264, an inside stepped side wall 266, and an outside stepped sidewall 268. The base 264 may be made from square metal tubing such as 6"×6" steel tubing, however any size or dimension of tubing may be used to create the base. The tubing may have end caps 265 to cover each end of the base 264. The base 264 sits atop and is connected to the front cross support 260 at one end of the base 264, and to the back cross support 262, such that the base 264 traverses the gap between the front pair of legs 240 and the back pair of legs 242 and extends past the back pair of legs 242 at the other end of the base 264.

The inside stepped wall 266 and the outside stepped wall 268 are connected to the sides of the base 264 to substantially form a stepped open-topped box. The inside stepped wall 266 can be seen in more detail in FIG. 18. The outside stepped wall 268 can be seen in more detail in FIG. 19. Both the inside stepped wall 266 and the outside stepped wall 268 may be made of cold rolled steel and laser cut to shape. The inside stepped wall 266 and outside stepped wall 268 act much like stringers in stair construction, having treads and risers to form stages or steps.

The inside stepped wall 266 has a top 270, which is shaped to have a plurality of treads 272, a front end 271, a back end 273, and a bottom 278. At the front end 271, a top arm connection 274 is welded to the arm 212, such that the entire top arm connection 274 is substantially flush with the top of the arm 212. Under the top arm connection 274, the front end 271 is angled. This forms a gusset 275 under the arm 212 providing rigidity and stability for the arm 212. The base 264 is connected to the inside stepped wall 266 such that the bottom 278 of the inside stepped wall 266 is substantially flush with the bottom of the base 264. The inside stepped wall 266 may have a plurality of circular holes 267 to allow for melting or draining of any accumulation of snow, ice or rain due to weather conditions on the base 264. The inside stepped wall 266 may extend beyond the length of the base 264 at each end 271, 273.

Each of the plurality of treads 272 may be about 10" in length, and each having a riser 277 of about 2 to 4" in height. However, as the skilled person in the art will understand, any length of tread and any height of riser may be used and depends on the acceptable height that a trailer may fall onto the stand 200 and the acceptable amount of tread to support a trailer if it were to land on the trailer stand 200. At the back end 273, a bottom tread 280 may be approximately 18" in length. Under the bottom tread 280, the inside stepped wall 266 is angled and extends lower than the bottom 278 to form a hook or lip 282 which extends downwards to connect to the back cross support 262 forming a right angle around two sides of the back cross support 262. The lip 282 may provide more surface area to connect the inside stepped wall 266 to the back cross support 262, thereby providing more overall stability and rigidity for the stepped wall assembly 210.

The outside stepped wall 268 has a top 284, a front end 286, a back end 288, and a bottom 290. The top 284 is shaped to have a plurality of treads 292 which substantially correspond in length and height to the plurality of treads 272 of the inside stepped wall 266.

The base 264 is connected to the outside stepped wall 268 such that the bottom 290 of the outside stepped wall 268 is substantially flush with the bottom of the base 264. The outside stepped wall 268 may have a plurality of circular holes 269 to allow for melting or draining of any accumulation of snow, ice or rain due to weather conditions on the base 264. The outside stepped wall 268 may extend beyond the length of the base 264 at each end 286, 288. In this embodiment, the top arm connection 294 of the outside wall 268 is shorter than the top arm connection of inside wall 266 and the front end 286 is substantially perpendicular to the bottom 290. Like the inside stepped wall 266, the bottom tread 296 of the outside stepped wall 268 is angled and extends lower than the bottom 490 to form a hook or lip 289 which extends downwards to connect to the back cross support 262 forming a right angle around two sides of the back cross support 262. The lip 289 may provide more surface area to connect the outside stepped wall 268 to the back cross support 262, thereby providing more overall stability and rigidity for the stepped wall assembly 210. The plurality of treads 292 may be about 8" to 10" in length, each having a riser 298 of about 3" in height. At the back end 288, a bottom tread 296 may be approximately 18" in length.

Turning back to FIGS. 17A and 17B, the treads 272 and risers 277 of the inside stepped wall 266 and the treads 292 and risers 298 of the outside stepped wall 268 substantially align on each side of the base 264, forming open stages or steps 300. The bottom step 301 is substantially longer than the other steps 300. The steps 300 and bottom step 301 are open so that during rainy, snowy or icy weather conditions, no build-up of water, snow, or ice forms on the steps 300. While the examples shown in FIGS. 17A and 17B show the steps 300 to be open, the steps 300 may be closed with a top or treading that traverses the width and length of steps 300 for warmer, dryer climates, or for aesthetic purposes.

Figure 20:
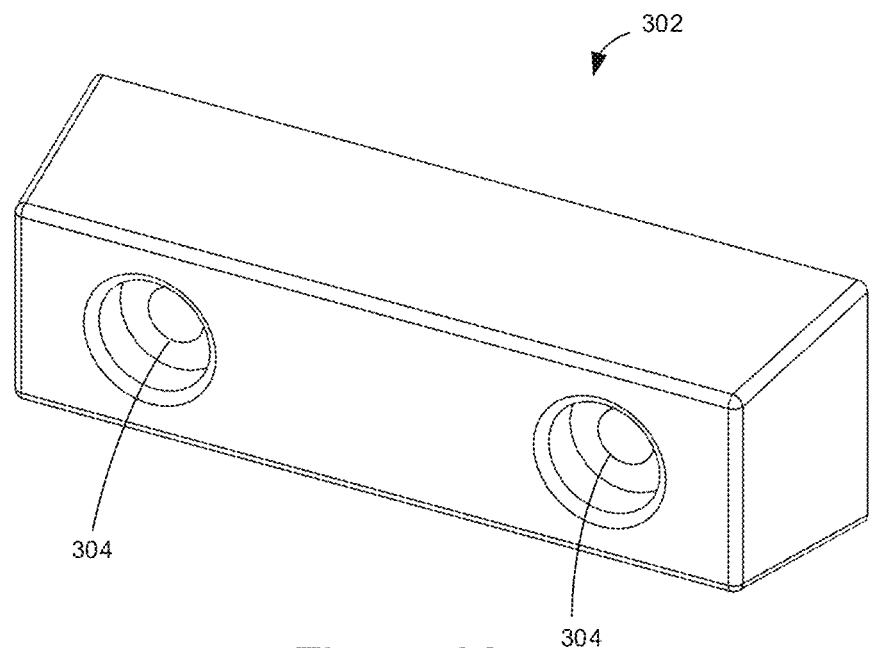
FIG. 20 is a perspective view of a bumper of the stepped landing assembly of FIGS. 17A and 17B.

In the embodiment shown, a bumper 302 is connected to each of the risers 277, 298 of inside stepped wall 266 and the outside stepped wall 268 respectively. The bumper 302 prevents metal-on-metal contact between the risers 277, 298 and the semi-trailer 160. The bumper 302 is shown in more detail in FIG. 20 and has a substantially rectangular shape. In this example, the rubber bumper may be made to a sufficient size and shape to absorb the contact from the semi-trailer 160. The rubber bumper 302 has boreholes 304 which allow the bumper to be connected to the risers 277, 298 via mounting plates 306. The bumper may be made from molded rubber or plastic.

Figure 21:
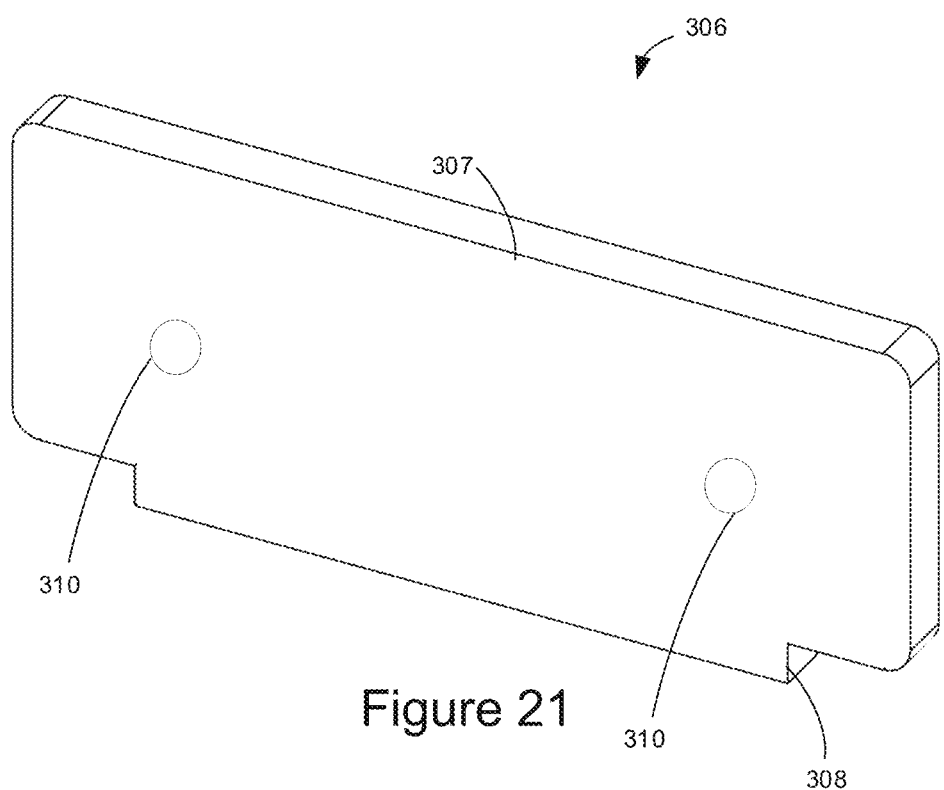
FIG. 21 is a perspective view of a bumper attachment of the stepped landing assembly of FIGS. 17A and 17B.

A single mounting plate 306 is shown in more detail in FIG. 21. The mounting plate 306 has a substantially rectangular portion 307 with a lower protrusion 308, which fits within the step 300 formed between the inside stepped wall 266 and the outside stepped wall 268. The rectangular portion 307 of the mounting plate 306, traverses the width of the gap between the risers 277 of the inside stepped wall 266 and the risers 298 of the outside stepped wall 268. The rectangular portion 307 has boreholes 310 that align with boreholes 304 of the rubber bumper 302 to allow for connection by bolts and nuts (not shown). Alternatively, the rubber bumper 302 may be connected to the mounting plates 304 by adhesive or any suitable connecting means. The mounting plates 304 may be welded to the risers 277, 298 such that the mounting plates 304 traverse the width of the base 264, from the inside stepped wall 266 to the outside stepped wall 268, thereby connecting the two stepped walls at each of the risers. The rectangular portions 307 may be of a length that extends beyond the inside stepped wall 266 and the outside stepped wall 268.

The pair of stepped assemblies 210 creates matched stepped landing areas on each side of the stand 200. While FIGS. 16 to 21 show a particular shape to the inside stepped wall 266 and outside stepped wall 268 to create the stepped landing assemblies 210, it is understood that any shape of the walls is feasible to create the stepped landing areas 300, 301 and to support a trailer in the event of a free-fall or a tip.

Figure 22:
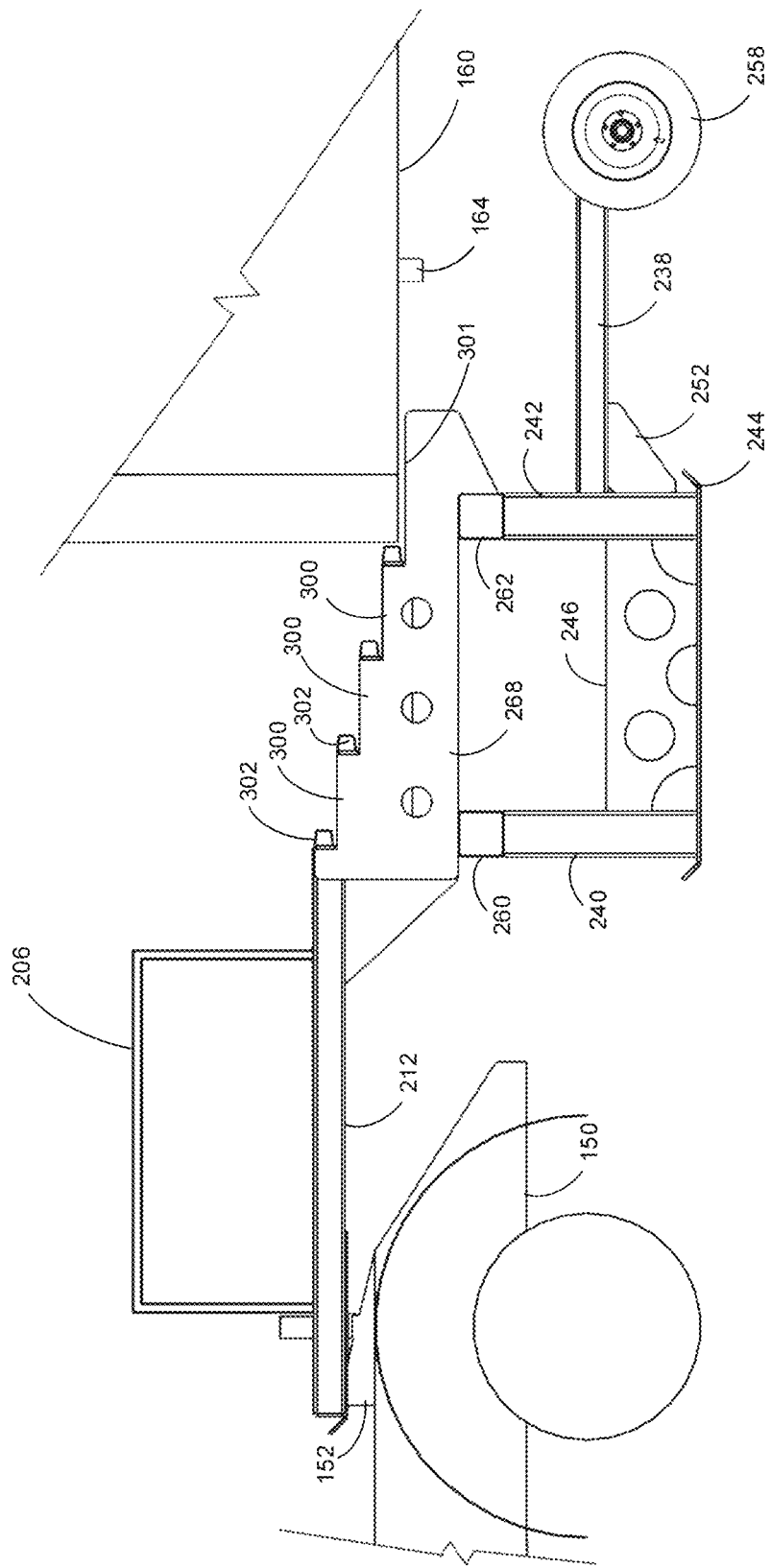
FIG. 22 is a side view of the trailer stand of FIG. 16A after it has been positioned under a trailer, where the trailer is a certain distance off the ground.

FIG. 22 shows the trailer stand 200 after it has been positioned under a semi-trailer 160. Kingpin 14 of trailer stand 200 is connected to a fifth wheel 152 of a shunt truck 150. To move the trailer stand 200, shunt truck 150 lifts the stand 200 via the fifth wheel 152 and the kingpin 14, pivoting the entire stand upwards, creating an axis of rotation around the wheels 258 of the stand so that it is moveable by its wheels 258. Once the stand is positioned, the shunt truck 150 lowers the stand 200 via the fifth wheel 152. In FIG. 22, the trailer stand 200 is positioned such that the bottom step 301 is positioned under the semi-trailer 160.

Step 301 of each stepped assembly 210 is substantially longer than steps 300 to accommodate if the trailer stand 200 is positioned on an angle to the semi-trailer 160. The approximate maximum angle the trailer stand 200 could be positioned in relation to the semi-trailer is about 60°. In the case of a drop or collapse of the semi-trailer 160 onto the stand 200, one side of the trailer 160 would drop onto the step 301 on one side, and be fully supported by the trailer stand 200, while the other side would be supported by the step 301 up to about 2", which is considered a safe drop.

Figure 23:
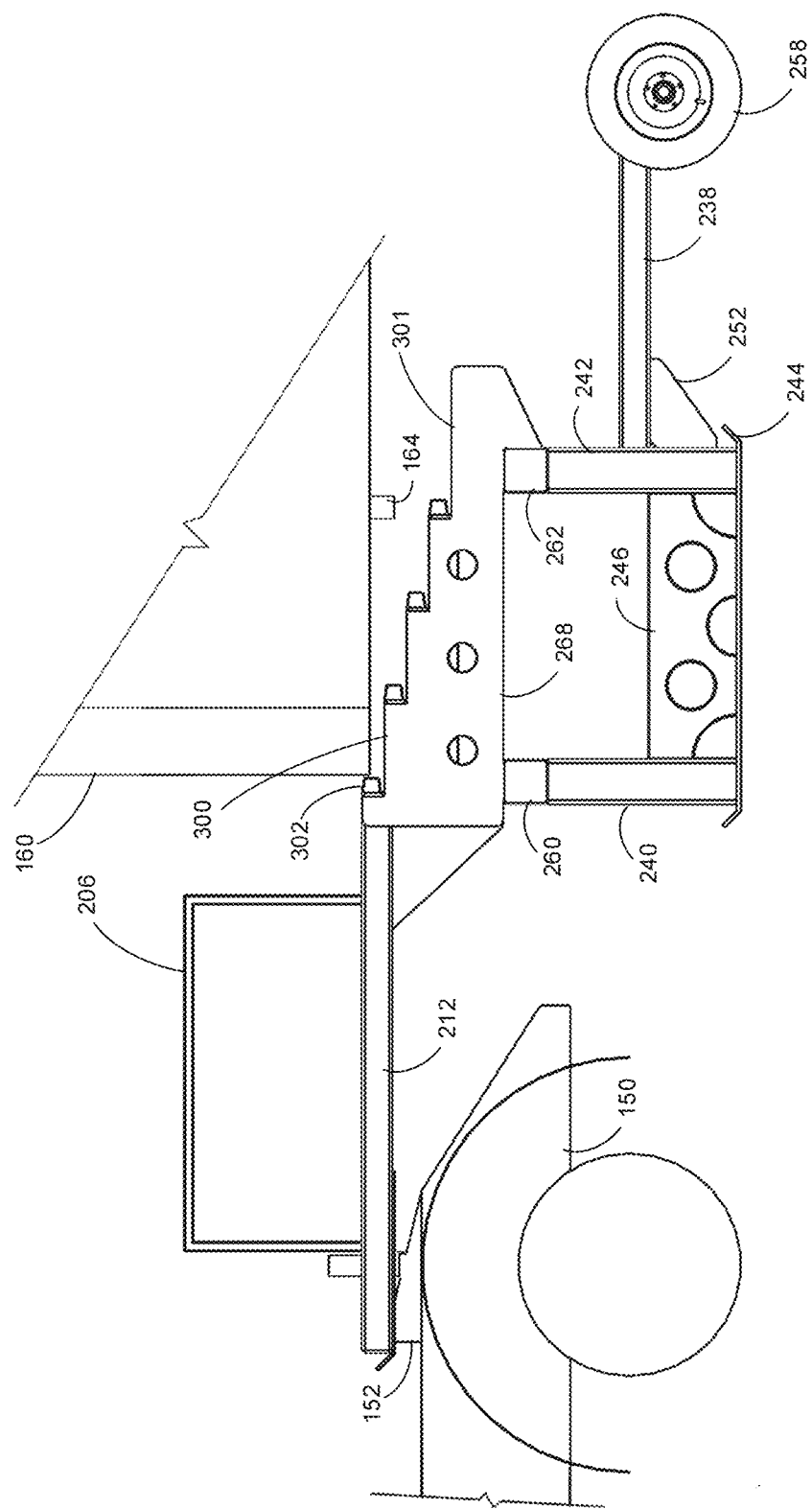
FIG. 23 is another side view of the trailer stand of FIG. 16A after it has been positioned under a trailer, where the trailer is a certain distance off the ground.
Figure 24B:
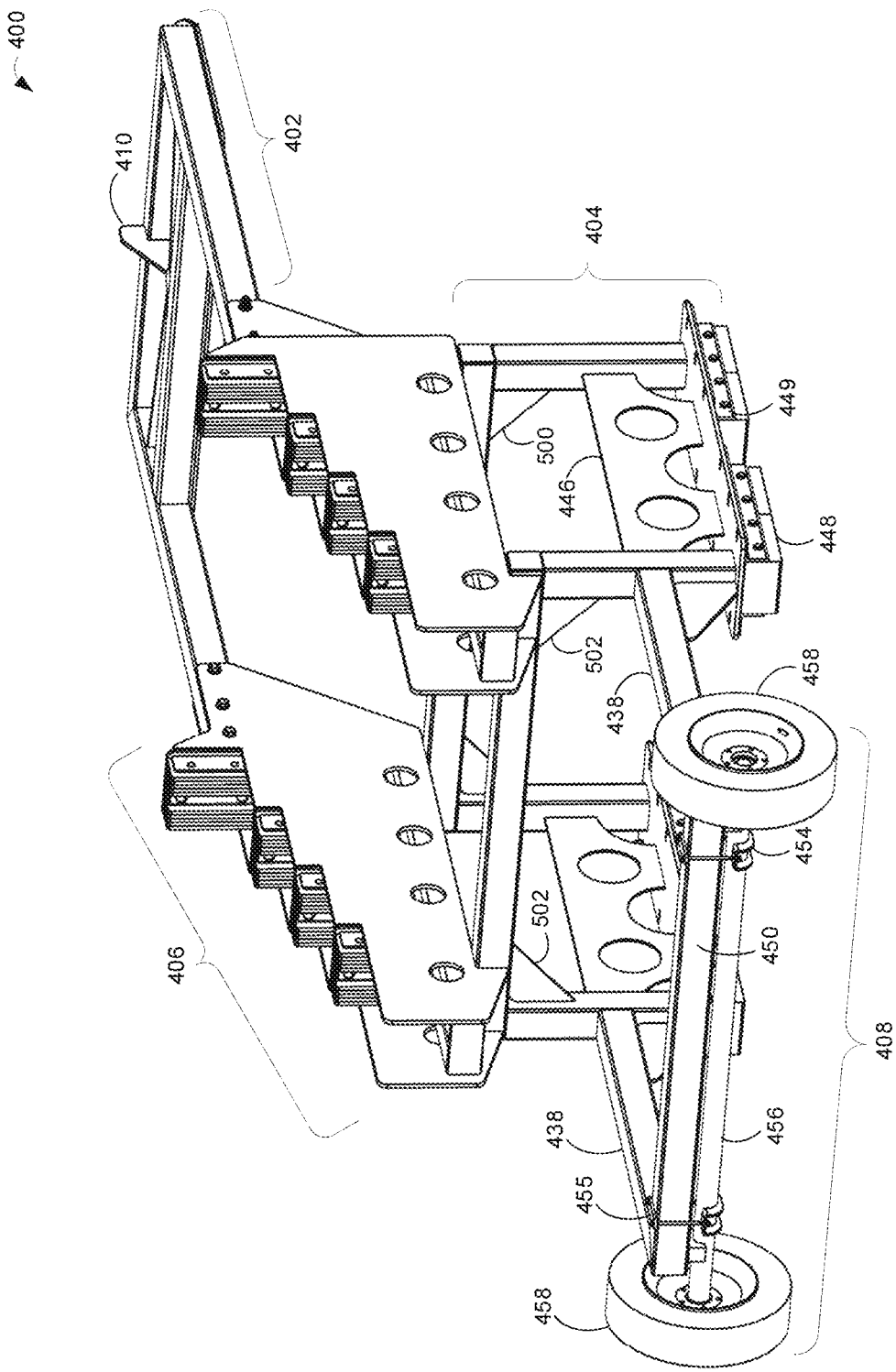
FIG. 24B shows an alternate perspective view of the trailer stand of FIG. 24A.
Figure 24C:
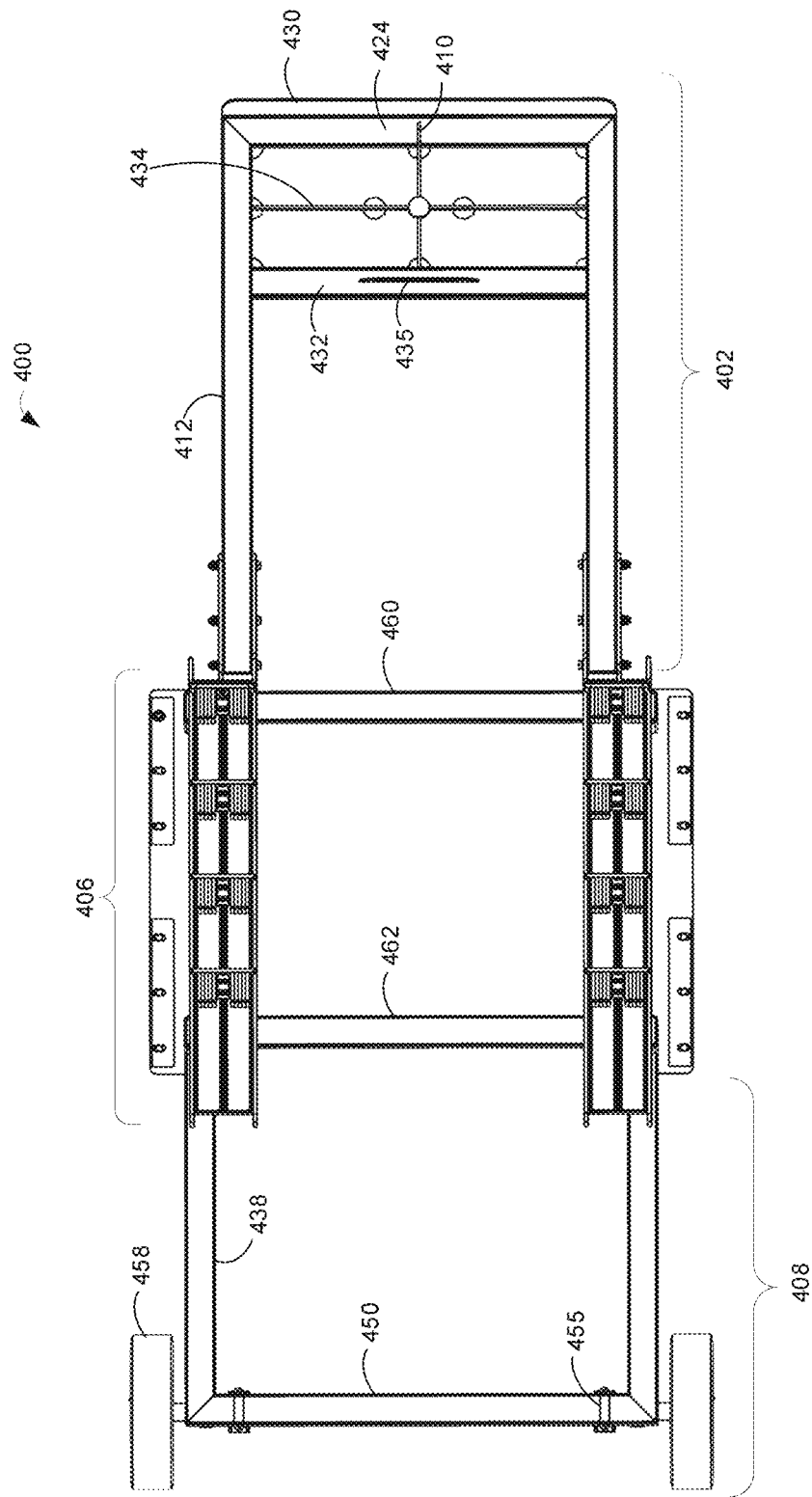
FIG. 24C shows a top view of the trailer stand of FIG. 24A.
Figure 24D:
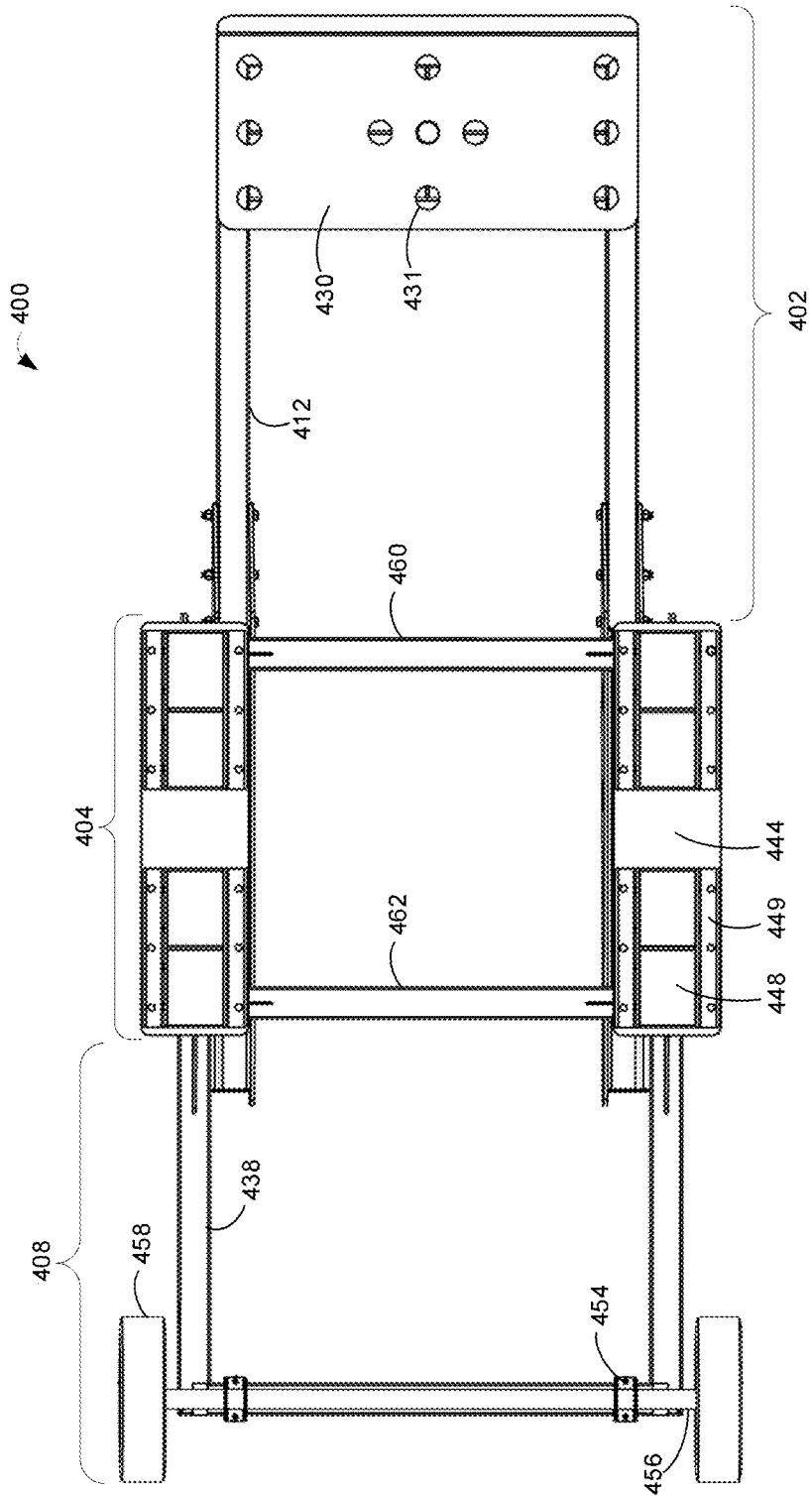
FIG. 24D shows a bottom view of the trailer stand of FIG. 24A.
Figure 24E:
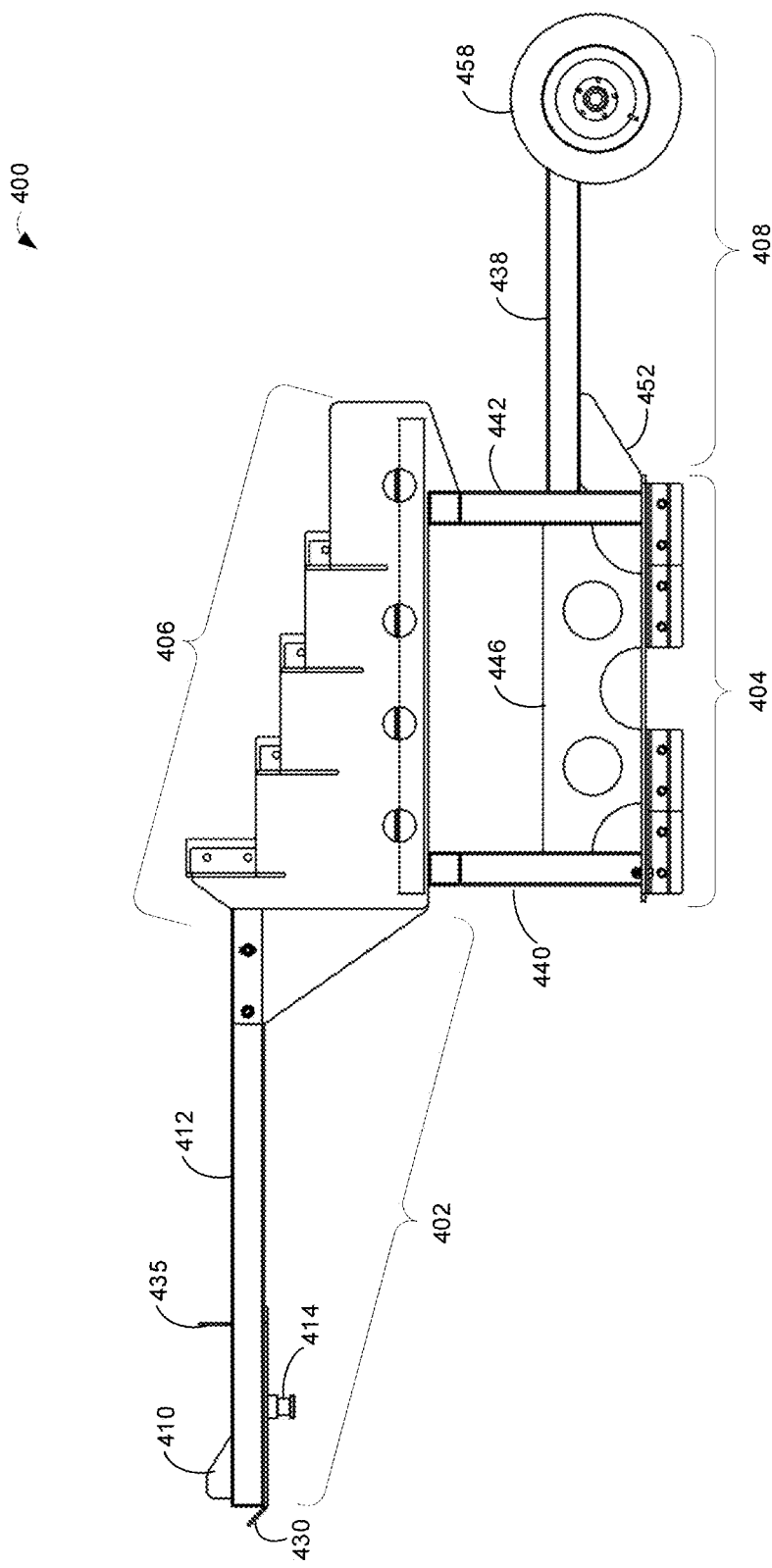
FIG. 24E shows a side view of the trailer stand of FIG. 24A.
Figure 24F:
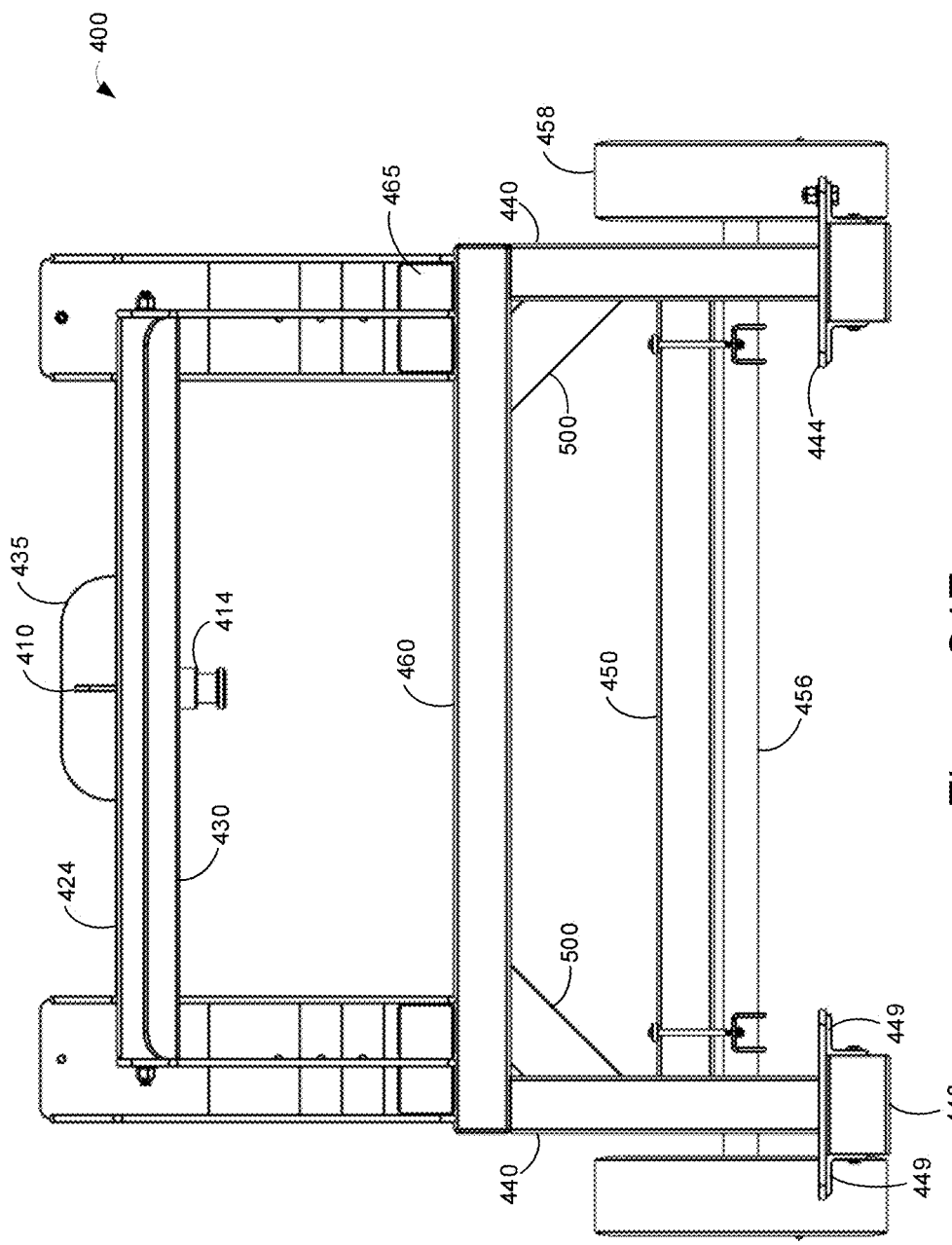
FIG. 24F shows a front view of the trailer stand of FIG. 24A.
Figure 24G:
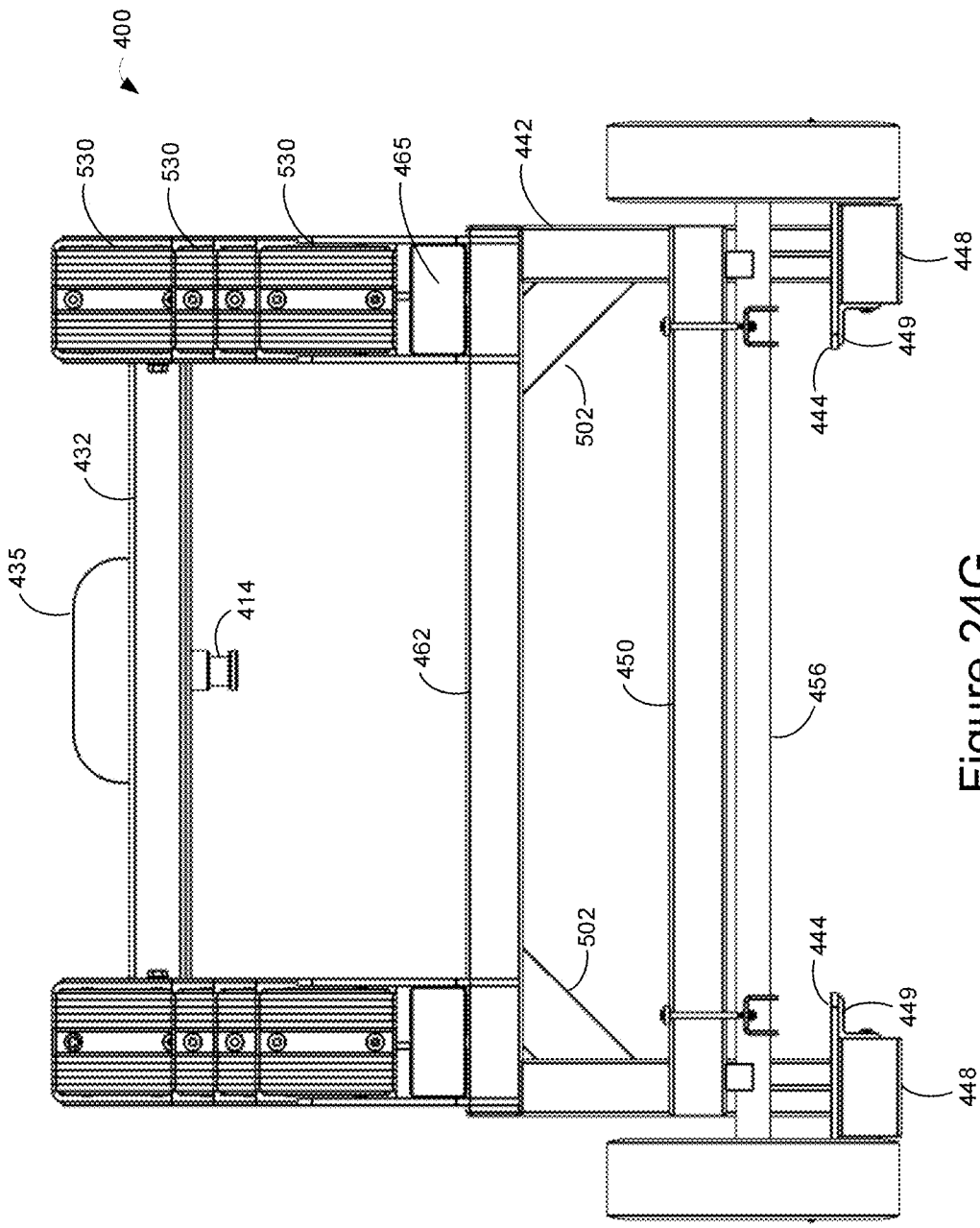
FIG. 24G shows a rear view of the trailer stand of FIG. 24A.

The underside of a semi-trailer 160 may be between 40" to 50" off the ground. The height of the bottom step 301 from the ground is about 36" to 39". If the semi-trailer 160 is higher than 40" off the ground, then the trailer stand 200, is positioned further under the semi-trailer 160, until it reaches the step 300 with the height that corresponds with the height of the semi-trailer off the ground, such that the bumpers 302 of each step 300 connect with the outer wall of the semi-trailer 160. This configuration means that whichever step 300, 301 is positioned under the semi-trailer 160, the "catch-zone" is between about 2" and 3". For example, FIG. 23 shows the trailer stand 200 positioned under the semi-trailer 160 such that the semi-trailer 160 is over the top step 300 of the trailer stand 200. In this case, the semi-trailer 160 would be at its maximum height off the ground. Even if the stand 200 were positioned incorrectly, such that the front wall of the trailer 160 did not engage a bumper 302, there would be enough of a step underneath the trailer 160, that were it to fall or tip, that step or the step immediately below that step would catch the trailer 160, so that the maximum the trailer may fall would be 2" to 6".

The pair of stepped assemblies 210 are separated to accommodate the kingpin 164 of the semi-trailer 160 as the trailer stand 200 moves further under the semi-trailer 160, until it reaches the appropriate step 300, 301 to match the height of semi-trailer 160.

The width of trailer stand, in this example, is determined to by knowing the width of standard semi-trailers and forklifts and establishing the half-way point of where a forklift would be if it was inside the semi-trailer. Thus, the width of the trailer stand 200 may reach up to the half-way point of where a forklift (not shown) would be if it were against one side of the inside of the semi-trailer. This way, if the landing gear 162 of a semi-trailer 160 were to collapse while a forklift were inside, the trailer stand 200 would be able to support the weight sufficiently as the semi-trailer 160 comes down. In this manner, the trailer stand 200 would prevent the semi-trailer 160 from tipping forward or to one side. However, the trailer stand 200 may be wider or narrower depending on the needs of the operators. In some embodiments, the trailer stand 200 has a width of about 60". Because of the shape of the trailer stand 200, it is able to support up to about 100,000 lb of load.

While the embodiments of FIGS. 16 to 23 show the trailer stand 200 to have three steps 300 and an elongated bottom step 301, it is understood that the trailer stand 200 may have any number of steps of any length or width to accommodate a semi-trailer 160.

FIGS. 24A to 24G show an alternate embodiment of a trailer stand 400 to the stepped trailer stand of FIGS. 16 to 23. In this example, trailer stand 400 comprises a lifting frame 402, a leg assembly 404, a stepped landing assembly 406, and a wheel assembly 408.

Figure 26:
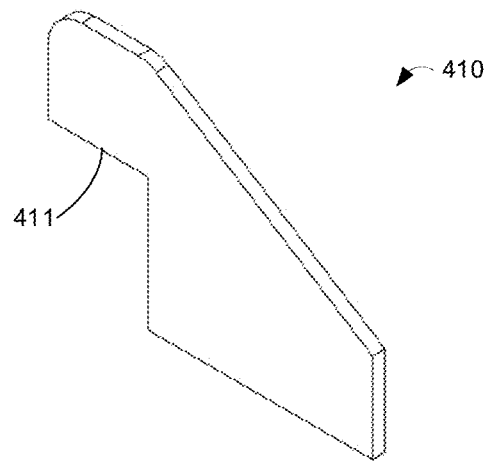
FIG. 26 shows a side view of a raised cross brace for a kingpin of the lifting assembly of FIG. 25A.

The lifting frame 402, shown in more detail in FIGS. 25A and 25B, comprises a U-shaped frame having at least two arms 412 connected by a top cross support 424. The arms 412, top cross support 424 may be from metal tubing, such as 4×4" steel tubing, but may be any size or shape to create the frame. Like the embodiment in FIG. 1A and FIG. 16A, the lifting frame 402 has a kingpin 414 held by a kingpin plate 430. The kingpin plate 430 is connected to the top cross support 424 and a kingpin plate support 432. Kingpin plate support 432 may have a plate 435 for a visual guide and/or for placing a brand name, model number or logo. The kingpin plate 430 may be further supported by a cross-bracing 434. In this embodiment, one of the cross-bracing 410, shown in FIG. 26, may have a higher profile than the other cross-bracing 434, and may have a notch 411 into which the cross support 424 fits, such that cross-bracing 410 connects over cross support 424. Because this higher profile cross-bracing 410 is visible over the top cross support 424 and located substantially at the center of the cross support 424, it may help a shunt truck operator to center the kingpin 414 when positioning the trailer stand 400 under a semi-trailer.

Figure 16A:
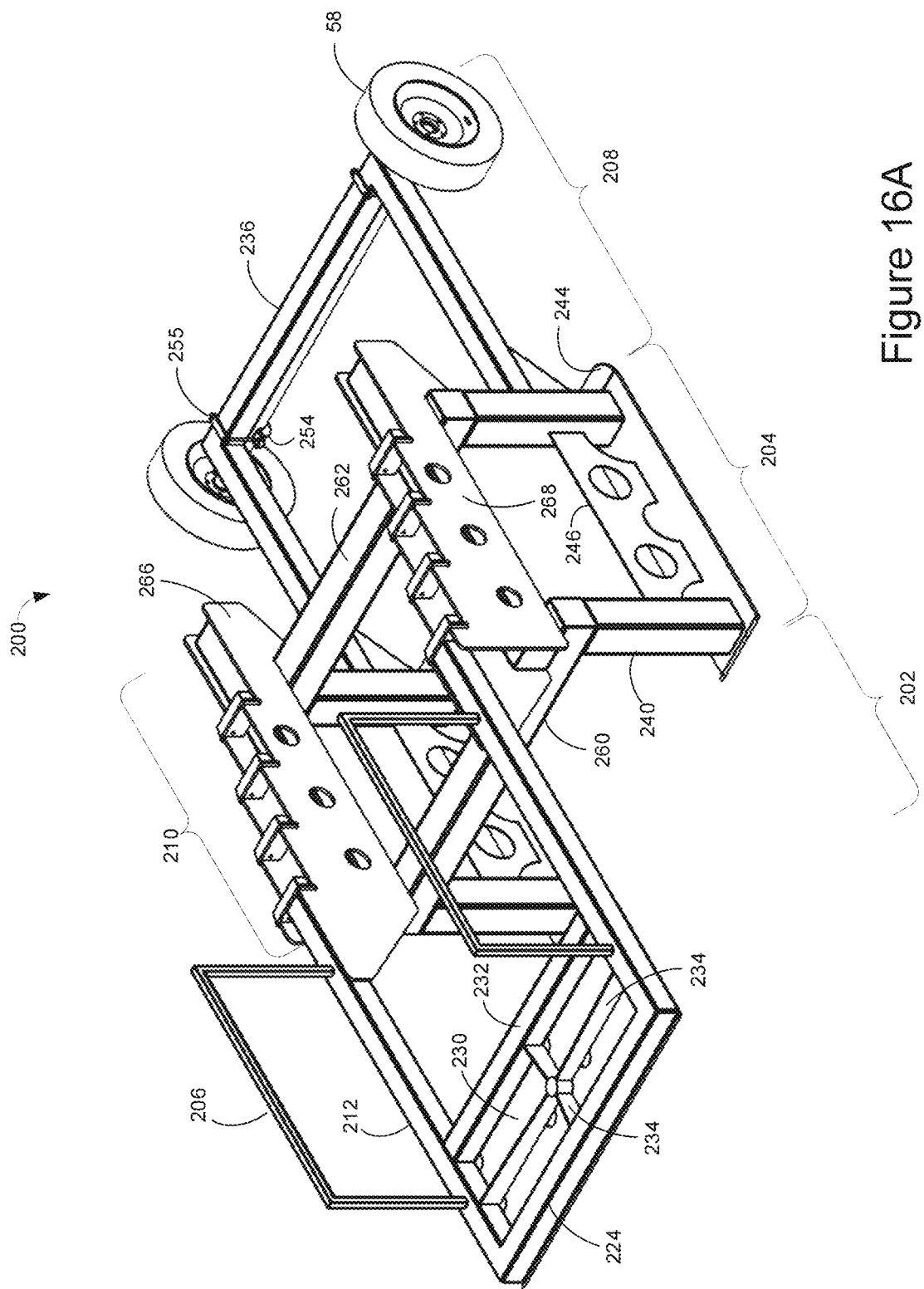
FIG. 16A shows a perspective view of an alternative embodiment of a trailer stand.
Figure 16B:
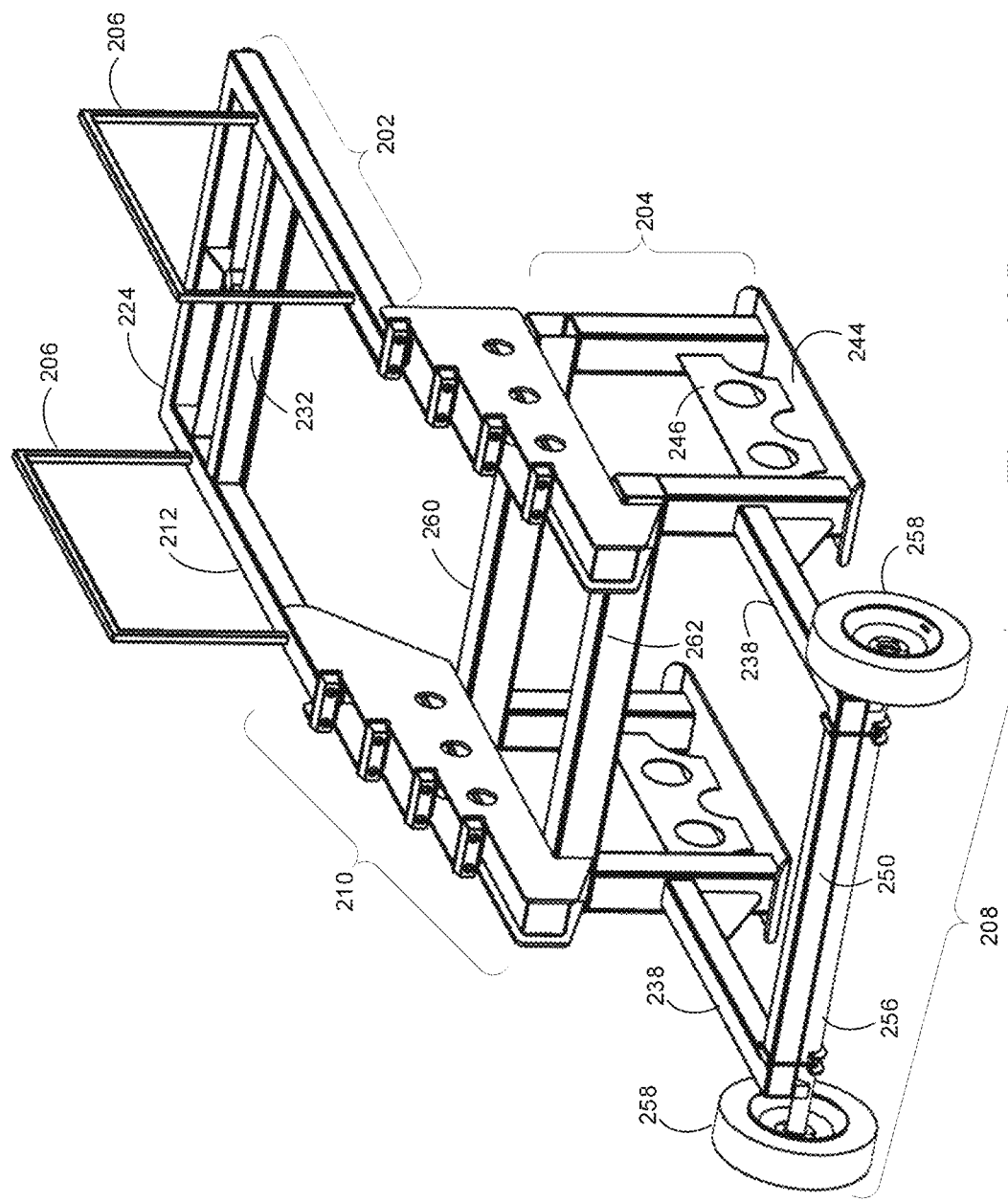
FIG. 16B shows an alternate perspective view of the trailer stand of FIG. 16A.
Figure 16D:
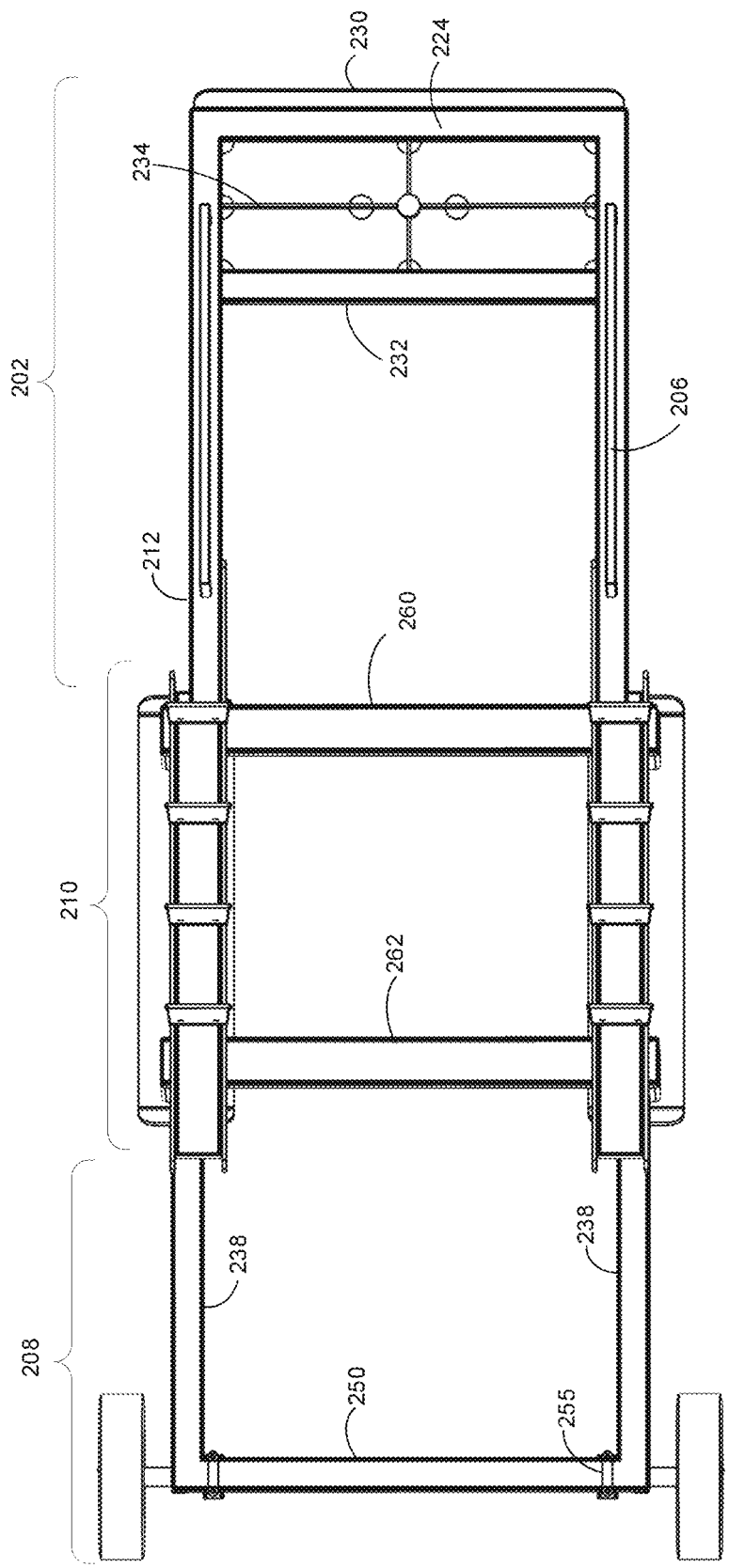
FIG. 16D is a top view of the trailer stand of FIG. 16A.
Figure 16E:
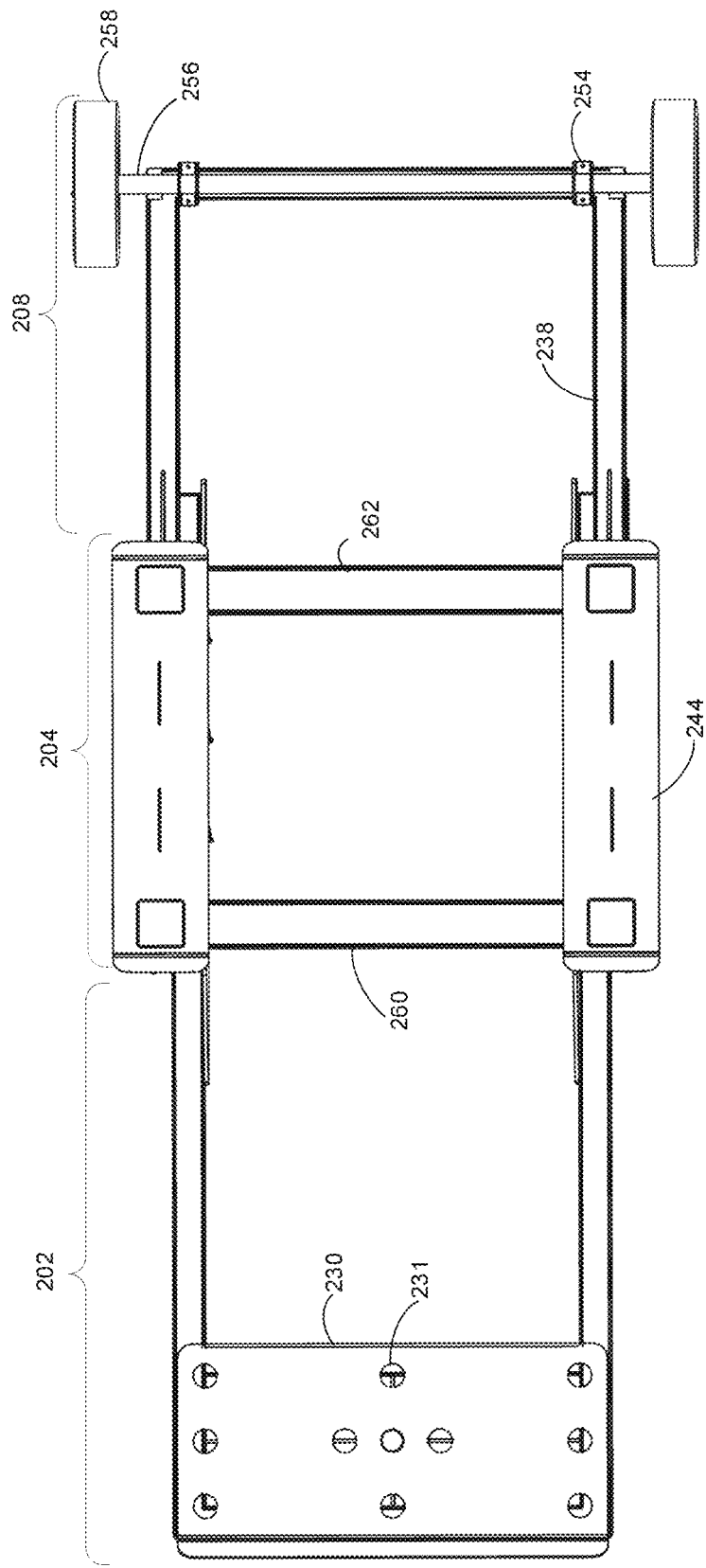
FIG. 16E is a bottom view of the trailer stand of FIG. 16A.
Figure 16F:
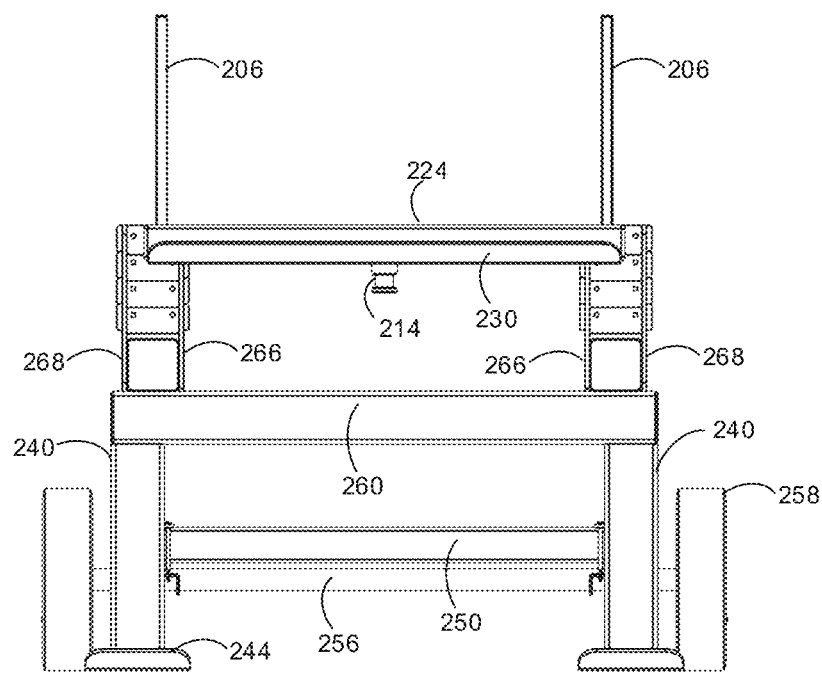
FIG. 16F is a front view of the trailer stand of FIG. 16A.
Figure 16G:
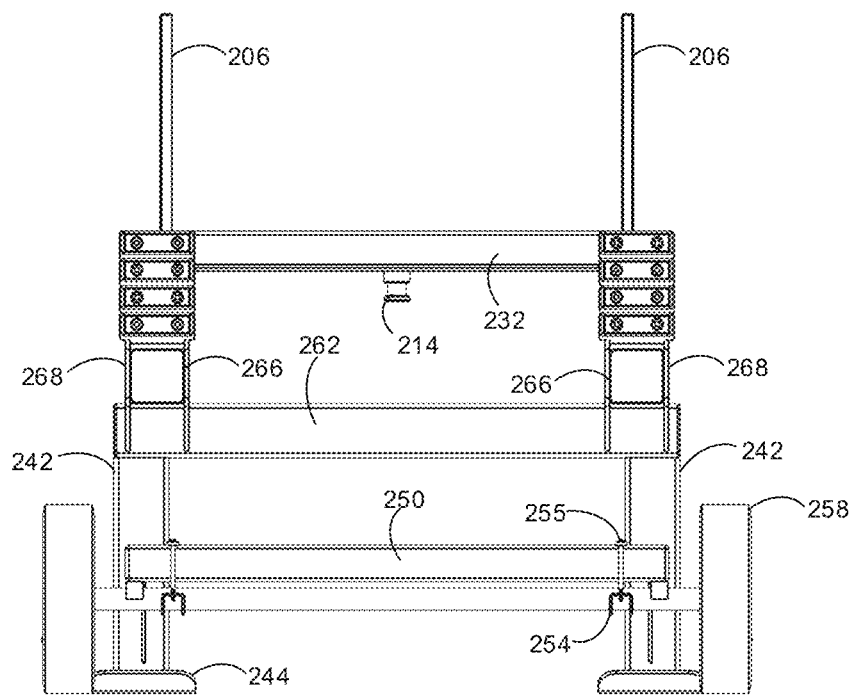
FIG. 16G is a rear view of the trailer stand of FIG. 16A.

Like the embodiment in FIG. 16A, the kingpin plate 430 is attached to the lifting frame 402 such that one end protrudes from the top cross support 424. The kingpin plate 430 may be angled upward at this end to aid in engaging the kingpin 414 with a shunt truck. The kingpin plate 430, may have a plurality of holes 431 therethrough for drainage in the event of snow or rain accumulation. The kingpin plate 430 may be made of cold rolled steel and may be welded in place, however any method of attaching the kingpin plate 430 to the lifting frame 402 is possible.

Figure 29:
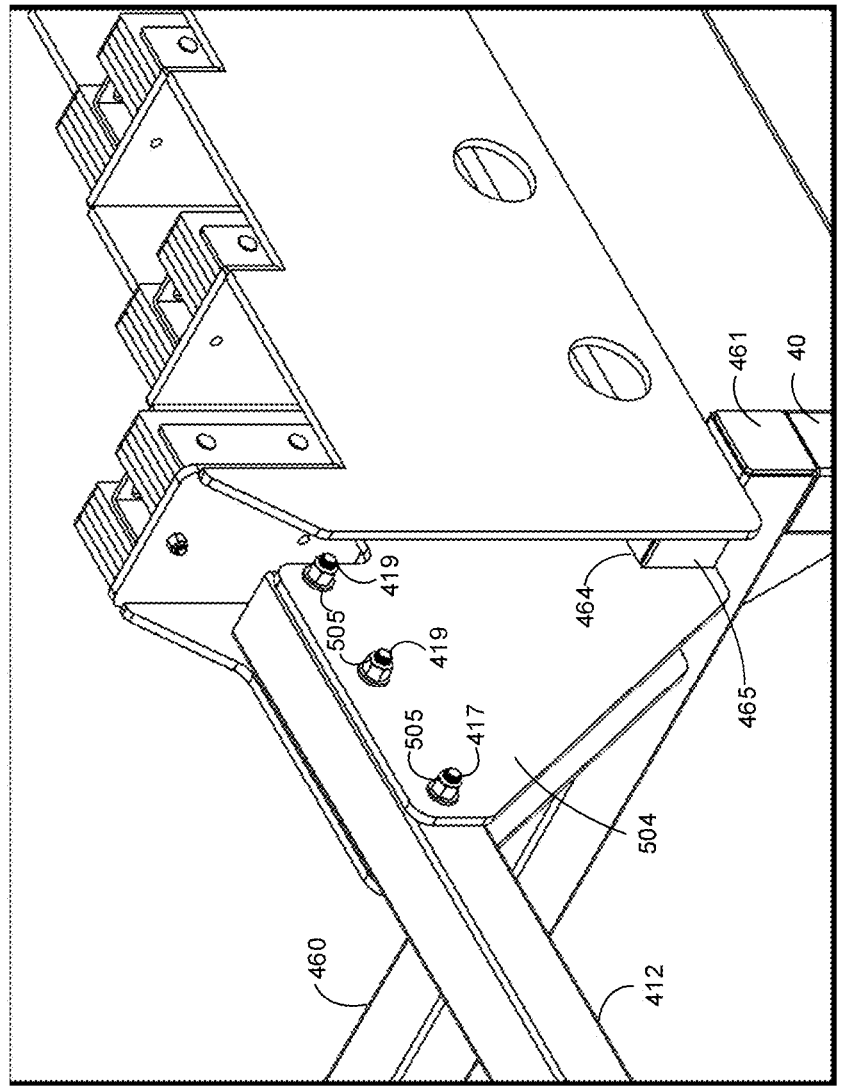
FIG. 29 shows a close-up perspective view of the connection between the lifting frame and the stepped assembly.
Figure 30:
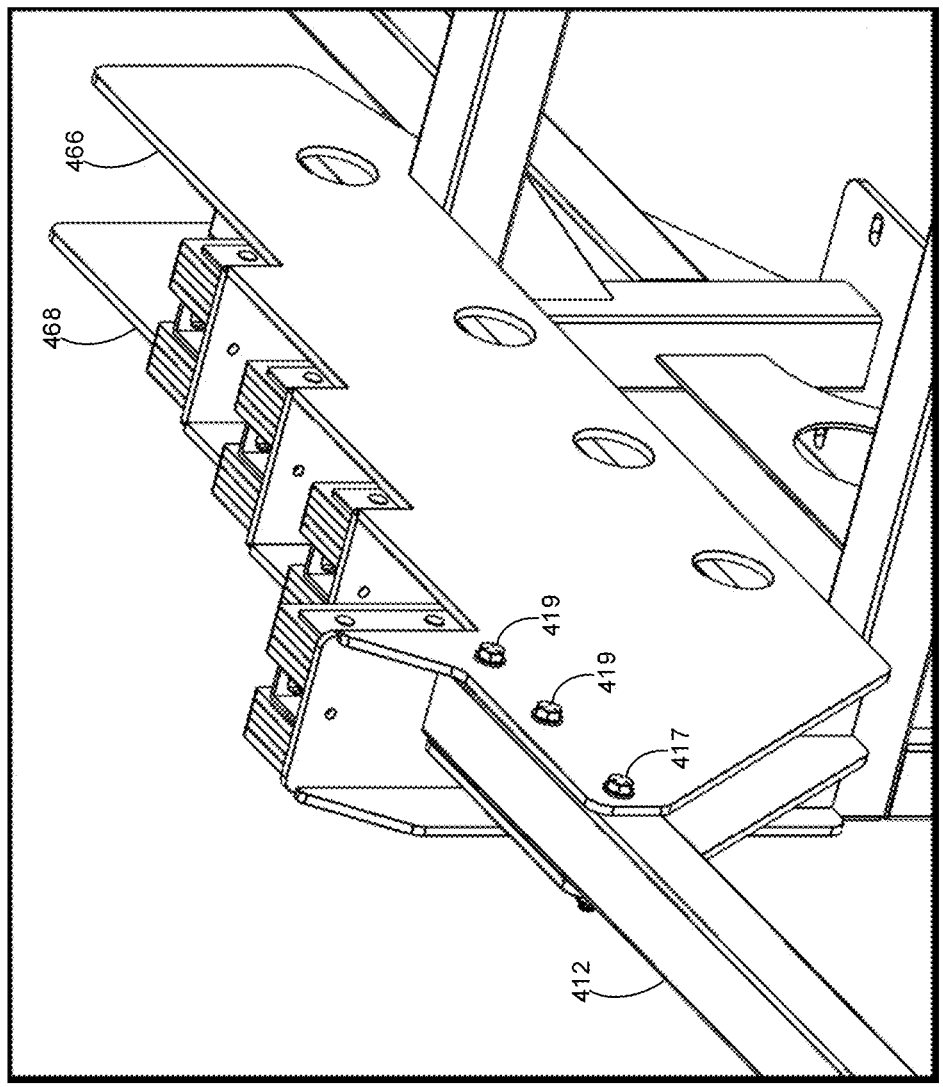
FIG. 30 shows an alternate close-up perspective view of the connection between the lifting frame and the stepped assembly
Figure 31:
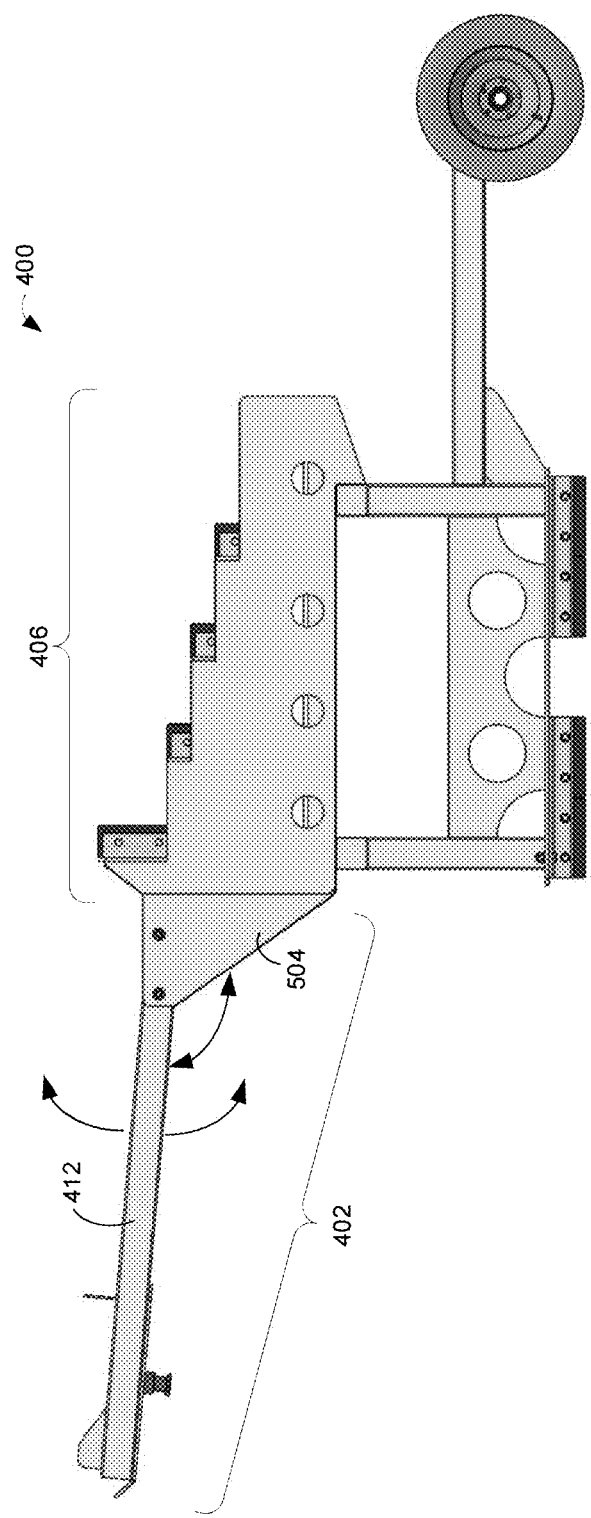
FIG. 31 shows a side view of the trailer stand of FIG. 24A when the lifting frame is tilted.

FIGS. 25A and 25B show that each arm 412 has a hole 416 and a plurality of slots 418, 420 at the end opposite to that which connects to the cross support 424. The hole 416 and the plurality of slots 418, 420 traverse the width of arm 412 accommodate therethrough bolt 417, 419 for connecting the arm to the stepped assembly 406. FIGS. 29 and 30 show close-up views of the connection between the lifting frame 402 and the stepped assembly 406. First bolt 417 through hole 416 may act as an axis for pivoting the lifting frame 402 when initially assembling the trailer stand 400. That is, the arms 412 may be attached to the stepped assembly 406 at an upwards or downwards angle. An example of an angled connection is shown in FIG. 31. The plurality of slots 418, 420 are progressively longer towards the end of the arm 412, allowing the arm 412 to be bolted to the stepped assembly 406 at a desired angle. It may be desirable to connect the arms lifting assembly 402 at an angle to the stepped assembly 406 to accommodate docking ramps that are sloped, so that the trailer stand 400 or shunt truck are able to move up a or down a docking ramp, maintaining a level movement. While FIGS. 25A and 25B show two slots 418, 420, it is understood that any number of slots is possible for connecting the lifting frame 402 to the stepped assembly 406.

Figure 28:
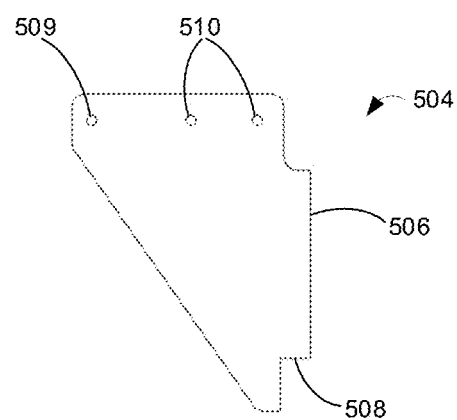
FIG. 28 shows a side view of an arm support for connecting the lifting frame to the stepped landing assembly of the trailer stand of FIG. 24A.
Figure 32:
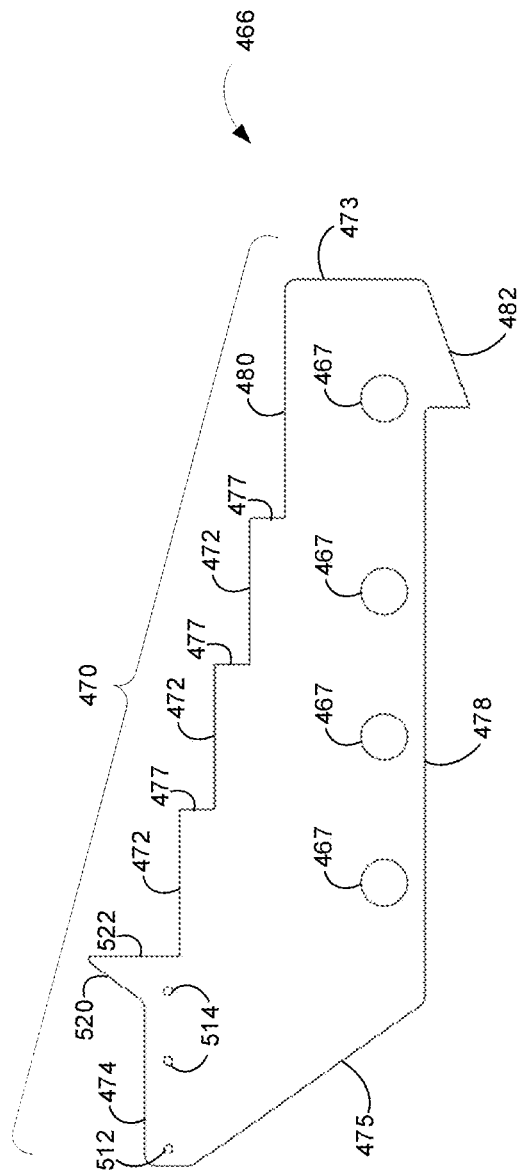
FIG. 32 shows a side view of an inside stepped wall of the stepped landing assembly of the trailer stand of FIG. 24A.

FIG. 30 shows that the inside of the arm 412 is connected to the inner face of an inside stepped wall 466. FIG. 29 shows that the outside of the arm 412 is connected to an additional arm support 504, which is shown in more detail in FIG. 32, and described below. Arm support 504, shown in FIG. 28, is a substantially triangular plate, having an inner and outer face, and a top side, a sloped side, a vertical side which has a protrusion 506, forming a lower notch 508. The base 464 of the stepped wall assembly 406 fits within notch 508, so that arm support 504 sits on the base 464. The top side of the arm support 504 has a plurality of holes 509, 510, which substantially align with holes 512, 514 in the inside stepped wall 466. Holes 509, 510 and the holes in the inside stepped wall 466 may accommodate the bolts 417, 419, respectively, to secure the arm 412 to the arm support 504 with nuts 505. First bolt 417 is accommodated by first hole 509 in the arm support 504 therethrough to first hole 512 in the inside stepped wall 466 and acts as the axis for pivoting the lifting frame 402. Remaining holes 510 in the arm support 504 accommodate bolts 419 therethrough to remaining holes 514 in the inside stepped wall 466, for securing the arm 412 when the arm has been positioned at a desired angle around the axis. Holes 510 in the arm support 504 and holes in the inside stepped wall are the substantially the same size to ensure the bolts do not slide in the slots 418, 420 in the arm.

Figure 27:
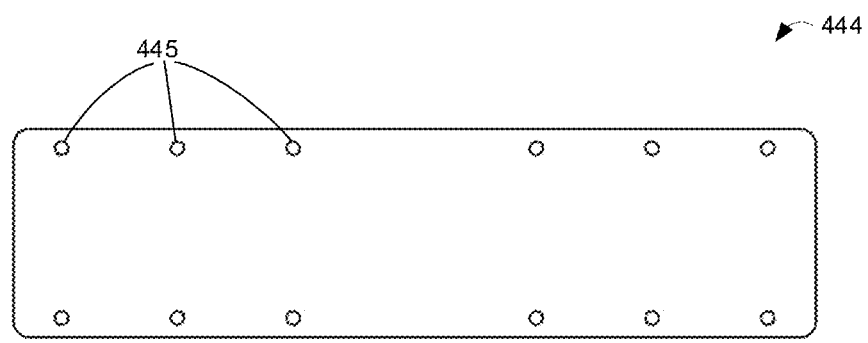
FIG. 27 shows a top view of a bottom plate of the leg assembly of the trailer stand of FIG. 24A.

Turning back to FIGS. 24A-24G, leg assembly 404 comprises a pair of substantially vertical front legs 440 and a pair of substantially vertical back legs 442 which may be made from, but are not limited to, metal tubing. The legs 440 and 442 may be made of metal tubing of any dimensions to create the legs of the leg assembly and to support the weight of the rest of the trailer stand 400 as well as the semi-trailer in the event of tipping. Each leg 440, 442 is attached to a bottom plate 444, shown in FIG. 27, such that each leg 440, 442 is normal to the bottom plate 444. Bottom plate 444 may be made from, but not limited to, metal plate such as cold rolled steel and is shaped to be substantially horizontal. Legs 440 and 442 may be connected to the bottom plate 444 by welding or any possible connection means.

Bottom plate 444 may be connected to a plurality of bumpers 448, which come into contact with a ground surface. The bottom plate 444 may have a plurality of holes 445 therethrough for connecting to the plurality of bumpers 448 by angle brackets 449 using nuts and bolts. However, as one skilled in the art will understand, the angle brackets 449 may be connected to the bottom plate 444 by other means such as welding. The plurality of bumpers 448 may be laminated rubber bumpers, molded rubber bumpers, or any kind of bumper. The plurality of bumpers 448 may provide friction for the trailer stand 400, inhibiting the trailer stand from sliding. Because the plurality of bumpers 448 are made from a more flexible material than a metal plate, the plurality of bumpers 448 may provide more contact with a ground surface that is uneven. The plurality of bumpers 448 may provide some shock absorption in the event of a semi-trailer tip. The bumpers 448 may act as a chock for a trailer since the friction provided by the bumpers 448 may also help to prevent the trailer from "creeping" forward while a forklift is moving within the trailer.

Between each of the front legs 440 and each of the back legs 442 is a leg brace 446, which keeps the legs apart and from twisting if the ground on which the trailer stand 400 sits is not level. The leg brace 446 may be a metal plate, such as rolled steel. As the skilled person in the art will understand, any size or thickness metal plate may be used to create the leg brace. The skilled person will also understand that any type of brace or gusset may be used to reinforce the legs and stabilize the bottom plate 444, such as, but not limited to, metal tubing.

A front cross support 460 is connected to the tops of each front leg 440 and reinforced underneath by a gusset 500 connected to each leg front 440. A back cross support 462 is connected to the tops of each back leg 442 and reinforced underneath by a gusset 502 connected to each back leg 442. The front cross support 460 and the back cross support 462 may be made from, but not limited to, metal tubing, such as 6"×6" steel tubing and may have an end caps 461, 463 respectively, covering each end. However, the front cross support 460 and the back cross support 462 may be made of metal tubing of any dimensions in order to connect the legs and support the stepped assembly 406. Gussets 500 and 502 may be made from metal plate such as steel plate and are sized and shaped to be suitable for reinforcing the front and back cross supports 460, 462.

Like the embodiment shown in FIG. 16A, the wheel assembly 408, shown in FIGS. 24A-24G, may comprise a U-shaped frame 436 connected to the back pair of legs 442 of the leg assembly 204. U-shaped frame 436 comprises at least two arms 438 connected to a cross wheel brace 450. U-shaped frame 436 may be made from, but is not limited to, metal tubing such as steel tubing, for example, 4"×4" steel tubing. However, the skilled person in the art will understand, any size and dimension of tubing may be used to create the frame. The end of each arm 438 of the U-shaped frame 436 is connected to each back leg 442 of the leg assembly 404. The wheel assembly 408 may have a wheel assembly gusset 452 to support the U-shaped frame 436. The wheel assembly gusset 452 may be a substantially triangular shaped steel plate, however any shape or size gusset may be used to support the U-shaped frame 436. The gussets 452 may be connected under each arm 438 and connected to each back leg 442.

The cross wheel brace 450 has at least two U-shaped brackets 454 (similar to U-shaped brackets 54 shown in FIG. 4B) for supporting an axel 456 having wheels 458. U-shaped brackets 454 are held to the underside of cross wheel brace 450 by axel bracket connectors 455 (similar to bracket connectors 55 shown in FIG. 4A) sitting on the top of cross wheel brace 450 via long bolts 453 (similar to long bolts 53 shown in FIG. 4A) traversing the width of cross brace 450. U-shaped brackets 454 may be bolted to the underside of cross wheel brace 450. Axel 456 is a tube or rod made from metal or other robust material, such as steel. At each end of axel 456 a tire or wheel 458 is rotationally connected by wheel bearings. Wheel 458 may be any suitable tire for moving the trailer stand 400, such as a trailer tire. While one type of wheel and axel assembly has been described herein, it is understood that any wheel and axel assembly may be used.

Figure 34:
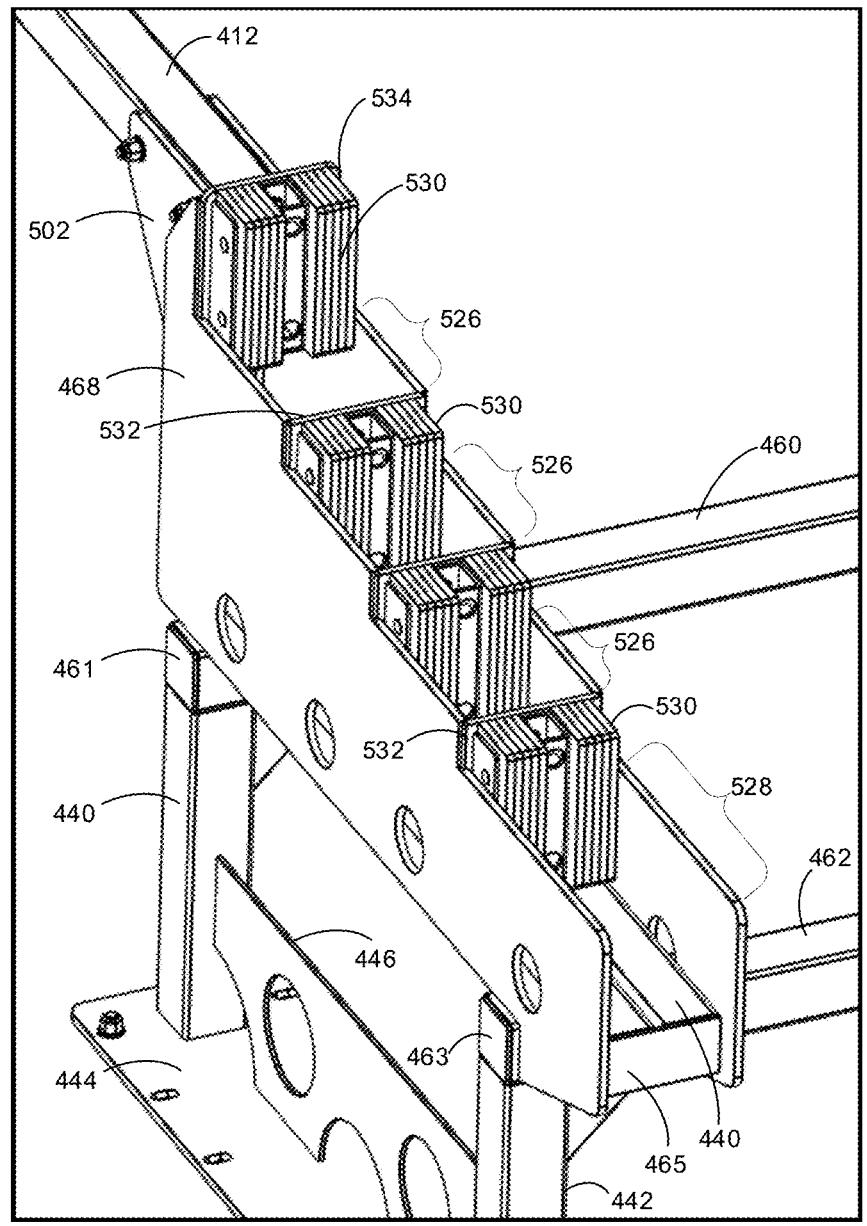
FIG. 34 shows a close-up top perspective view of a single stepped landing assembly of the trailer stand of FIG. 24A.

Turning now to FIG. 34, a stepped landing assembly 406 for the trailer stand 400 is shown in more detail. Each arm 412 is connected to a stepped landing assembly 406. Each stepped landing assembly 406 sits atop and is connected to the front cross support 460 of the front pair of legs 440 and the back cross support 462 of the back pair of legs 442 of the leg assembly 404. Each stepped landing assembly 406 comprises a base 464, an inside stepped side wall 466, and an outside stepped sidewall 468. The base 464 may be made from metal tubing such as 6"×6" steel tubing, however any size or dimension of tubing may be used to create the base. The tubing may have end caps 465 to cover each end of the base 464. The base 464 sits atop and is connected to the front cross support 460 at one end of the base 464, and to the back cross support 462, such that the base 464 traverses the gap between the front pair of legs 440 and the back pair of legs 442 and extends past the back pair of legs 442 at the other end of the base 464.

Figure 33:
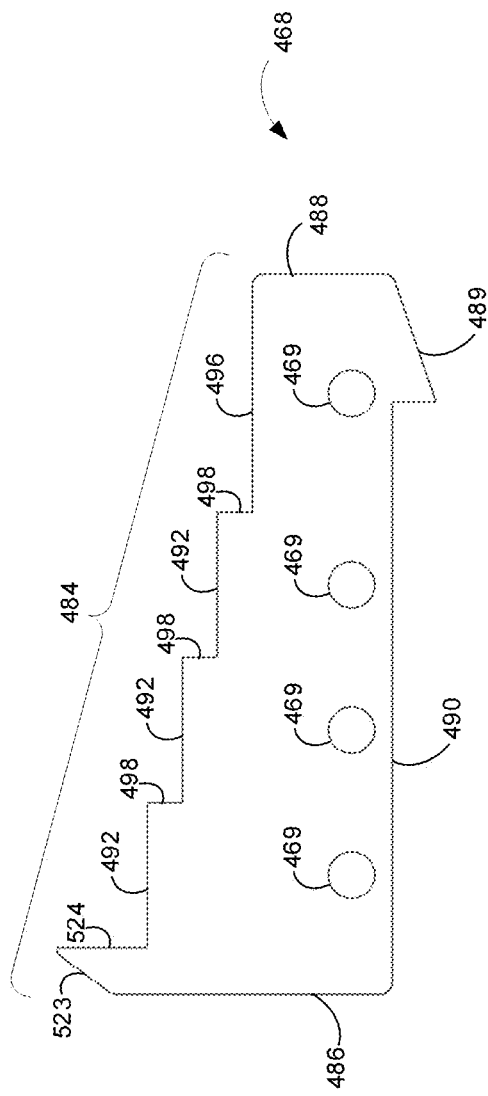
FIG. 33 shows a side view of an outside stepped wall of the stepped landing assembly of the trailer stand of FIG. 24A.

The inside stepped wall 466 and the outside stepped wall 468 are connected to the sides of the base 464 to substantially form a stepped open-topped box. The inside stepped wall 466 can be seen in more detail in FIG. 32. The outside stepped wall 468 can be seen in more detail in FIG. 33. Both the inside stepped wall 466 and the outside stepped wall 468 may be made of metal such as cold rolled steel and laser cut to shape. The inside stepped wall 466 and outside stepped wall 468 act much like stringers in stair construction, having treads and risers to form stages or steps.

The inside stepped wall 466 has a top 470, which is shaped to have a plurality of treads 472, a front end 471, a back end 473, and a bottom 478. At the front end 471, a top arm connection 474 has holes 512 and 514 for connecting to the arm 412 (as described above), such that the top arm connection 474 is substantially flush with the top of the arm 412.

Under the top arm connection 474, the front end 471 is angled. This forms a gusset 475 under the arm 412 providing rigidity and stability for the arm 412. The base 464 is connected to the inside stepped wall 466 such that the bottom 478 of the inside stepped wall 466 is substantially flush with the bottom of the base 464. The inside stepped wall 466 may have a plurality of circular holes 467 to allow for melting or draining of any accumulation of snow, ice or rain due to weather conditions on the base 464. The inside stepped wall 766 may extend beyond the length of the base 464 at each end 471, 473.

Each of the plurality of treads 472 may be about 10" in length, and each having a riser 477 of about 2 to 4" in height. However, as the skilled person in the art will understand, any length of tread and any height of riser may be used and depends on the acceptable height that a trailer may fall onto the stand 400 and the acceptable amount of tread to support a trailer if it were to land on the trailer stand 400.

The top arm connection 474 has a protrusion 520. Protrusion 520 forms the top riser 522, which is higher than the other risers 477. The higher top riser 522 may be at a height to block a semi-trailer from override and avoid a semi-trailer possibly landing on the arms 412 in the event of tipping or landing gear failure.

At the back end 473, a bottom tread 480 may be approximately 18" in length. Under the bottom tread 480, the inside stepped wall 466 may be angled and extends lower than the bottom 478 to form a hook or lip 482 which extends downwards to connect to the back cross support 462 forming a right angle around two sides of the back cross support 462, providing rigidity or stability for the stepped wall assembly 406.

The outside stepped wall 468 has a top 484, a front end 486, a back end 488, and a bottom 490. The top 484 is shaped to have a plurality of treads 492 which substantially correspond in length and height to the plurality of treads 472 of the inside stepped wall 466.

The base 464 is connected to the outside stepped wall 468 such that the bottom 490 of the outside stepped wall 468 is substantially flush with the bottom of the base 464. The outside stepped wall 468 may have a plurality of circular holes 469 to allow for melting or draining of any accumulation of snow, ice or rain due to weather conditions on the base 464.

The outside stepped wall 468 may extend beyond the length of the base 464 at each end 486, 488. In this embodiment, the top 484 of the outside wall 468 is shorter in length than the top arm connection 474 of inside wall 466 and the front end 486 is substantially perpendicular to the bottom 490. The top 484 of the outside wall 468 has an upper protrusion 523 at the front end 486. Protrusion 523 forms the top riser 524, which is higher than the other risers 498. The higher top riser 524 substantially aligns with the higher top riser 522 of the inner stepped wall 466 to block a semi-trailer from override and avoid the semi-trailer from possibly landing on the arms 412 in the event of tipping or landing gear failure.

Like the inside stepped wall 466, the bottom tread 496 of the outside stepped wall 468 is angled and extends lower than the bottom 490 to form a hook or lip 489 which extends downwards to connect to the back cross support 462 forming a right angle around two sides of the back cross support 462. The plurality of treads 492 may be about 8" to 10" in length, each having a riser 498 of about 3" in height. At the back end 488, a bottom tread 496 is approximately 18" in length. However, as the skilled person in the art will understand, any length of tread and any height of riser may be used and depends on the acceptable height that a trailer may fall onto the stand 400 and the acceptable amount of tread to support a trailer if it were to land on the trailer stand 400.

Turning back to FIG. 34, the treads 472 and risers 477 of the inside stepped wall 466 and the treads 492 and risers 498 of the outside stepped wall 468 substantially align on each side of the base 464, forming open stages or steps 526. The bottom step 528 is substantially longer than the other steps 526. The steps 526 and bottom step 528 are open so that during rainy, snowy or icy weather conditions, no build-up of water, snow, or ice forms on the steps 526. While the example shown in FIG. 34 show the steps 300 to be open, the steps 300 may be closed with a top or treading that traverses the width and length of steps 526 for warmer, dryer climates, or for aesthetic purposes.

In the embodiment shown in FIG. 34, a bumper 530 is connected to each of the risers 477, 498 of inside stepped wall 466 and the outside stepped wall 468, respectively. The bumper 530 prevents metal-on-metal contact between the risers 477, 498 and the semi-trailer. The bumper 530 is shown in more detail in FIG. 35 and has a substantially rectangular shape. In this example, the bumper 530 may be made to a sufficient size and shape to absorb the contact from the semi-trailer. The bumper 530 may be made of laminate rubber or molded rubber. In the non-limiting example shown in FIG. 35, the bumper comprises two laminate rubber stacks 540 separated by a metal tube 542 therebetween. The bumper 530 is held together by a bumper bracket 544 on the outside of each stack 540. While one type of bumper is shown in FIGS. 34 and 35, it is understood that any type of bumper may be used, such as, but not limited to, a single molded rubber bumper.

The bumper 530 has boreholes 546 in the metal tube 542 which allow the bumper to be connected to the risers 477, 498 via mounting plates 532, 534, shown in more detail in FIGS. 36 and 37.

FIG. 36 shows a single mounting plate 532 for risers 477 and 498. The mounting plate 532 has a substantially rectangular upper portion 536 with a substantially rectangular lower portion 538. Lower portion 538 fits within the step 528 formed between the inside stepped wall 466 and the outside stepped wall 468. The upper portion 536 traverses the width of the gap between the risers 477 of the inside stepped wall 466 and the risers 498 of the outside stepped wall 468. The mounting plate 532 has boreholes 548 that align with boreholes 546 of the rubber bumper 530 to allow for connection by bolts and nuts (not shown). Alternatively, the rubber bumper 530 may be connected to the mounting plates 532 by adhesive or any suitable connecting means. The mounting plates 532 may be welded to the risers 477, 498 such that the upper portions 536 traverse the width of the base 264, from the inside stepped wall 266 to the outside stepped wall 268, thereby connecting the two stepped walls at each of the risers 477, 498. The portion of the bumper 530 that is attached to the upper portion 536 of the mounting plate 532 comes into contact with the front of the semi-trailer when the trailer stand 400 is positioned beneath the semi-trailer. When any of the bumpers 530 wear down due to contact with a semi-trailer, they may be removed from the mounting plate 532 and inverted, or they may be replaced.

FIG. 37 shows a single mounting plate 534 for the top risers 522, 524. The mounting plate 534 has a substantially rectangular upper portion 550 with a substantially rectangular lower portion 552. Lower portion 552 fits within the top step 526 formed between the inside stepped wall 466 and the outside stepped wall 468. The upper portion 552 is substantially taller than the upper portion 536 of mounting plate 532, and traverses the width of the gap between the top riser 522 of the inside stepped wall 466 and the top riser 524 of the outside stepped wall 468. The mounting plate 534 has boreholes 554 that align with boreholes 546 of the rubber bumper 530 to allow for connection by bolts and nuts (not shown). Alternatively, the rubber bumper 530 may be connected to the mounting plates 534 by adhesive or any suitable connecting means. The mounting plates 534 may be welded to the risers 522, 524 such that the upper portions 550 traverse the width of the base 264, from the inside stepped wall 266 to the outside stepped wall 268, thereby connecting the two stepped walls at each of the risers 522, 524. For the top risers 522, 524, more of the bumper 530 comes into contact with the front of the semi-trailer than the bumpers that are attached to the other risers 477, 498, since the upper portion 550 of mounting plate 534 is taller than that of mounting plate 532. When the bumpers 530 attached to mounting plate 534 wear down due to contact with the trailer, they may be replaced.

The pair of stepped assemblies 406 creates matched stepped landing areas 526, 528 on each side of the stand 400. While FIGS. 24-37 show a particular shape to the inside stepped wall 466 and outside stepped wall 468 to create the stepped landing assemblies 406, it is understood that any shape of the walls is feasible to create the stepped landing areas 526, 528 and to support a trailer in the event of a free-fall or a tip.

The stand 400 of FIGS. 24-37 functions in a similar manner to the stand 200 of FIGS. 16-23 when positioned beneath a semi-trailer. The underside of a semi-trailer may be between 40" to 50" off the ground. The height of the bottom step 528 from the ground is about 36" to 39". If the semi-trailer is higher than 40" off the ground, then the trailer stand 400, is positioned further under the semi-trailer 160, until it reaches the step 526 with the height that corresponds with the height of the semi-trailer off the ground, such that the bumpers 530 of each step 526 connect with the outer front wall of the semi-trailer. This configuration means that whichever step 526, 528 is positioned under the semi-trailer, the "catch-zone" is between about 2" and 3".

Step 528 of each stepped assembly 406 is substantially longer than steps 526 to accommodate if the trailer stand 400 is positioned on an angle to the semi-trailer 160. The approximate maximum angle the trailer stand 400 could be positioned in relation to the semi-trailer is about 60°. In the case of a drop or collapse of the semi-trailer onto the stand 400, one side of the trailer would drop onto the step 528 on one side, and be fully supported by the trailer stand 400, while the other side would be supported by the step 528 up to about 2″, which is considered a safe drop.

Even if the stand 400 were positioned incorrectly, such that the front wall of the trailer did not engage a bumper 530, there would be enough of a step underneath the trailer, that were it to fall or tip, that step or the step immediately below that step would catch the trailer, so that the maximum the trailer may fall would be 2″ to 6″.

The pair of stepped assemblies 406 are separated to accommodate the kingpin of the semi-trailer as the trailer stand 400 moves further under the semi-trailer, until it reaches the appropriate step.

The width of trailer stand, in this example, is determined by knowing the width of standard semi-trailers and forklifts and establishing the half-way point of where a forklift would be if it was inside the semi-trailer. Thus, the width of the trailer stand 400 may reach up to the half-way point of where a forklift would be if it were against one side of the inside of the semi-trailer. This way, if the landing gear of a semi-trailer were to collapse while a forklift were inside, the trailer stand 400 would be able to support the weight sufficiently as the semi-trailer comes down. In this manner, the trailer stand 400 would prevent the semi-trailer from tipping forward or to one side. However, the trailer stand 400 may be wider or narrower depending on the needs of the operators and the dimensions of the semi-trailers. In some embodiments, the trailer stand 400 has a width of about 60″. Because of the shape of the trailer stand 400, it is able to support up to about 100,000 lb of load.

While the embodiments of FIGS. 16 to 23 show the trailer stand 400 to have three steps 526 and an elongated bottom step 528, it is understood that the trailer stand 400 may have any number of steps of any length or width to accommodate a semi-trailer.

In some embodiments, trailer stands 200 and 400 may be manually placed beneath a semi-trailer. The trailer stands 200 and 400 may also be placed beneath a trailer using a forklift, yard jockey or by a vehicle via a trailer hitch.

Unless otherwise explained, all technical terms used herein have the same meaning as commonly understood by one of ordinary skill in the art to which this disclosure belongs. Although any methods and materials similar or equivalent to those described herein can be used in the practice for testing of the present invention, the typical materials and methods are described herein. In describing and claiming the present invention, the following terminology will be used.

It is also to be understood that the terminology used herein is for the purpose of describing particular aspects only and is not intended to be limiting. Patent applications, patents, and publications are cited herein to assist in understanding the aspects described. All such references cited herein are incorporated herein by reference in their entirety and for all purposes to the same extent as if each individual publication or patent or patent application was specifically and individually indicated to be incorporated by reference in its entirety for all purposes. To the extent publications and patents or patent applications incorporated by reference contradict the disclosure contained in the specification, the specification is intended to supersede and/or take precedence over any such contradictory material.

In understanding the scope of the present application, the articles "a", "an", "the", and "said" are intended to mean that there are one or more of the elements. Additionally, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

It will be understood that any aspects described as "comprising" certain components may also "consist of" or "consist essentially of," wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention.

It will be understood that any component defined herein as being included may be explicitly excluded from the claimed invention by way of proviso or negative limitation.

In addition, all ranges given herein include the end of the ranges and also any intermediate range points, whether explicitly stated or not.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The abbreviation, "e.g." is derived from the Latin exempli gratia, and is used herein to indicate a non-limiting example. Thus, the abbreviation "e.g." is synonymous with the term "for example." The word "or" is intended to include "and" unless the context clearly indicates otherwise.

What is claimed is:

1. A trailer stand for a semi-trailer comprising:
   a stepped assembly having a front end, a back end, a top, and a bottom, the top of the stepped assembly having a plurality of vertically-oriented steps, each step providing a landing area for an end of the semi-trailer;
   a leg assembly comprising a plurality of supporting legs, a front support, and a back support, wherein the front end of the stepped assembly is connected to the front support and the back end of the stepped assembly is connected to the back support; and
   a lifting frame having a first end, and a second end that is connected to the stepped assembly.

2. The trailer stand of claim 1, wherein the plurality of legs of the leg assembly comprises a front pair of legs and a back pair of legs, and wherein the front pair of legs is connected by the front support and the back pair of legs is connected by the back support.

3. The trailer stand of claim 1, wherein the lifting frame is pivotable about an axis of rotation on the front end of the stepped assembly.

4. The trailer stand of claim 3, wherein the lifting frame is secured to the stepped assembly at a desired angle to the stepped assembly about the axis of rotation.

5. The trailer stand of claim 2, wherein an underside of the front pair of legs and back pair of legs comprise bumpers that are in contact with a ground surface.

6. The trailer stand of claim 2, wherein the front pair of legs and back pair of legs are further connected by a bottom plate.

7. The trailer stand of claim 6, wherein an underside of the bottom plate is in contact with a ground surface.

8. The trailer stand of claim 1, wherein the first end of the lifting frame comprises a connector portion that is receivable by a shunt truck.

9. The trailer stand of claim 2, wherein the connector portion of the lifting frame comprises a kingpin.

10. A trailer stand for a semi-trailer, the trailer stand comprising:
- a leg assembly comprising a plurality of substantially vertical legs, a front support and a back support;
- a pair of stepped landing assemblies, each stepped landing assembly comprising:
  - a base;
  - an inside stepped side wall having a front end, a back end, a bottom and a top shaped to have a plurality of treads and risers; and
  - an outside stepped side wall having a front end, a back end, a bottom and a top shaped to have a plurality of treads substantially corresponding in length to the plurality of treads of the inside stepped side wall and a plurality of risers substantially corresponding in height to the plurality of risers of the inside stepped side wall,
  - wherein the inside stepped side wall and the outside stepped side wall are connected to sides of the base such that the treads and risers of the inside stepped side wall and the treads and risers of the outside step side wall substantially align on each side of the base forming steps, and wherein one end of the base sits atop, and is connected to, the front support and the other end of the base sits atop, and is connected to, the back support, such that the base traverses a gap between the front support and the back support; and a lifting frame comprising at least two arms connected by a top cross support, each arm of the lifting frame connected to one stepped landing assembly of the pair of stepped landing assemblies.

11. The trailer stand of claim 10, wherein the lifting frame comprises a connector portion for engaging a shunt truck.

12. The trailer stand of claim 11 wherein the connecting portion comprises a kingpin.

13. The trailer stand of claim 12, wherein the plurality of legs of the leg assembly comprises a front pair of legs and a back pair of legs, and wherein the front pair of legs is connected by the front support and the back pair of legs is connected by the back support.

14. The trailer stand of claim 12, wherein the kingpin is held by a kingpin plate connected at one end thereof to the top cross support of the lifting frame.

15. The trailer stand of claim 14, wherein the lifting frame further comprises a kingpin plate support and the kingpin plate is connected at a second end thereof to the kingpin plate support.

16. The trailer stand of claim 14, wherein the kingpin plate is attached to the lifting frame such that one end of the kingpin plate protrudes from the top cross support of the lifting frame.

17. The trailer stand of claim 16, wherein the one end of the kingpin plate that protrudes from the top cross support of the lifting frame is angled upward to aid in engaging the kingpin with a shunt truck.

18. The trailer stand of claim 13, wherein one leg of the pair of substantially vertical front legs and one leg of the pair of substantially vertical back legs is supported on a bottom plate, such that each leg is normal to the bottom plate.

19. A trailer stand for a semi-trailer comprising:
- a stepped assembly having a front end, a back end, a top, and a bottom, the top of the stepped assembly having a plurality of vertically-oriented steps, each step providing a landing area for an end of the semi-trailer; and
- a leg assembly having a plurality of supporting legs, a front support, and a back support, wherein the front end of the stepped assembly is connected to the front support and the back end of the stepped assembly is connected to the back support.

20. The trailer stand of claim 19, wherein the plurality of legs of the leg assembly includes a front pair of legs and a back pair of legs, and wherein the front pair of legs is connected by the front support and the back pair of legs connected by the back support.

* * * * *